United States Patent
Nelson et al.

(10) Patent No.: US 11,307,735 B2
(45) Date of Patent: Apr. 19, 2022

(54) CREATING AGENDAS FOR ELECTRONIC MEETINGS USING ARTIFICIAL INTELLIGENCE

(71) Applicants: Steven A. Nelson, San Jose, CA (US);
Hiroshi Kitada, Tuckahoe, NY (US);
Lana Wong, Belleville, NJ (US)

(72) Inventors: Steven A. Nelson, San Jose, CA (US);
Hiroshi Kitada, Tuckahoe, NY (US);
Lana Wong, Belleville, NJ (US)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/290,856

(22) Filed: Oct. 11, 2016

(65) Prior Publication Data
US 2018/0101281 A1 Apr. 12, 2018

(51) Int. Cl.
*G06F 3/0482* (2013.01)
*G06Q 10/10* (2012.01)
(Continued)

(52) U.S. Cl.
CPC ........ *G06F 3/0482* (2013.01); *G06F 3/04817* (2013.01); *G06N 5/022* (2013.01);
(Continued)

(58) Field of Classification Search
CPC ... G06F 3/0482; G06F 3/04817; G06N 5/022; H04L 65/403; G06Q 10/10; G06Q 10/1095; H04N 7/155
See application file for complete search history.

(56) References Cited

U.S. PATENT DOCUMENTS 5,572,728 A 11/1996 Tada et al.
5,907,324 A 5/1999 Larson et al.
(Continued)

FOREIGN PATENT DOCUMENTS

CN 103123700 5/2013
EP 3 336 701 A1 6/2018
(Continued)

OTHER PUBLICATIONS

European Patent Office, "Search Report" in application No. 16196514.0-1871, dated Jan. 30, 2017, 6 pages.
(Continued)

*Primary Examiner* — Hope C Sheffield
(74) *Attorney, Agent, or Firm* — Hickman Becker Bingham Ledesma LLP; Edward A. Becker

(57) ABSTRACT

Artificial intelligence is introduced into an electronic meeting context to perform various tasks before, during, and/or after electronic meetings. The tasks may include a wide variety of tasks, such as agenda creation, participant selection, real-time meeting management, meeting content supplementation, and post-meeting processing. The artificial intelligence may analyze a wide variety of data such as data pertaining to other electronic meetings, data pertaining to organizations and users, and other general information pertaining to any topic. Capability is also provided to create, manage, and enforce meeting rules templates that specify requirements and constraints for various aspects of electronic meetings.

20 Claims, 29 Drawing Sheets

(51) Int. Cl.
  *H04N 7/15*       (2006.01)
  *G06F 3/04817*    (2022.01)
  *G06N 5/02*       (2006.01)
  *H04L 65/403*     (2022.01)

(52) U.S. Cl.
  CPC ......... *G06Q 10/10* (2013.01); *G06Q 10/1095* (2013.01); *H04L 65/403* (2013.01); *H04N 7/155* (2013.01)

(56) References Cited

U.S. PATENT DOCUMENTS

| | | | |
|---|---|---|---|
| 6,377,288 B1 * | 4/2002 | Moran | G06F 3/04883 345/442 |
| 6,501,463 B1 | 12/2002 | Dahley | |
| 6,789,064 B2 | 9/2004 | Koh | |
| 7,089,278 B1 | 8/2006 | Churchill | |
| 7,634,546 B1 | 12/2009 | Strickholm et al. | |
| 7,640,506 B2 | 12/2009 | Pratley | |
| 7,679,518 B1 * | 3/2010 | Pabla | G06Q 10/109 340/573.1 |
| 7,693,736 B1 | 4/2010 | Chu | |
| 8,060,563 B2 | 11/2011 | Whynot | |
| 8,090,707 B1 | 1/2012 | Orttung | |
| 8,091,028 B2 | 1/2012 | Spielberg | |
| 8,214,748 B2 | 7/2012 | Srikanth | |
| 8,266,209 B2 | 9/2012 | Pegg | |
| 8,368,738 B2 | 2/2013 | Schindler | |
| 8,400,489 B2 | 3/2013 | Le Goff | |
| 8,510,646 B1 | 8/2013 | Young | |
| 8,578,463 B2 | 11/2013 | Kee | |
| 8,676,273 B1 | 3/2014 | Fujisaki | |
| 8,806,352 B2 | 8/2014 | Sitrick | |
| 8,826,147 B2 | 9/2014 | Sitrick | |
| 8,918,722 B2 | 12/2014 | Sitrick | |
| 8,918,724 B2 | 12/2014 | Sitrick | |
| 8,924,859 B2 | 12/2014 | Sitrick | |
| 9,087,032 B1 | 7/2015 | Killalea | |
| 9,195,965 B2 | 11/2015 | Sitrick | |
| 9,204,098 B1 | 12/2015 | Cunico | |
| 9,330,366 B2 | 5/2016 | Sitrick | |
| 9,450,758 B1 | 9/2016 | Allen | |
| 9,478,702 B2 | 10/2016 | Hwang | |
| 9,621,846 B2 | 4/2017 | Lee | |
| 9,648,061 B2 | 5/2017 | Cunico | |
| 9,769,139 B2 | 9/2017 | Chizhov | |
| 9,817,805 B1 | 11/2017 | Markman | |
| 10,009,393 B2 | 6/2018 | Tondepu | |
| 10,033,774 B2 | 7/2018 | Kolter | |
| 10,073,859 B2 | 9/2018 | Hull | |
| 10,114,810 B2 | 10/2018 | Raleigh et al. | |
| 10,353,997 B1 | 7/2019 | Tobias | |
| 10,402,485 B2 | 9/2019 | Sitrick | |
| 10,409,919 B2 | 9/2019 | Rubin | |
| 10,522,151 B2 | 12/2019 | Cartwright | |
| 11,048,865 B2 | 6/2021 | Tao | |
| 2002/0078088 A1 | 6/2002 | Kuruoglu | |
| 2003/0018659 A1 * | 1/2003 | Fuks | G06F 17/30646 715/230 |
| 2003/0187886 A1 | 10/2003 | Hull | |
| 2003/0191643 A1 | 10/2003 | Belenger | |
| 2003/0204474 A1 | 10/2003 | Capek | |
| 2003/0214528 A1 | 11/2003 | Pierce | |
| 2004/0044556 A1 | 3/2004 | Brady | |
| 2004/0139391 A1 | 7/2004 | Stumbo | |
| 2004/0141605 A1 | 7/2004 | Chen | |
| 2004/0230651 A1 | 11/2004 | Ivashin | |
| 2005/0027800 A1 | 2/2005 | Erickson | |
| 2005/0188016 A1 | 8/2005 | Vdaygiri | |
| 2005/0209848 A1 | 9/2005 | Ishii | |
| 2006/0031326 A1 | 2/2006 | Ovenden | |
| 2006/0047816 A1 | 3/2006 | Lawton | |
| 2006/0106872 A1 | 5/2006 | Leban | |
| 2006/0143558 A1 | 6/2006 | Albornoz | |
| 2006/0161446 A1 | 7/2006 | Fyfe | |
| 2006/0224430 A1 | 10/2006 | Butt | |
| 2006/0259755 A1 | 11/2006 | Kenoyer | |
| 2006/0282266 A1 | 12/2006 | Lopez-Barquilla | |
| 2007/0106724 A1 | 5/2007 | Gorti et al. | |
| 2007/0106931 A1 * | 5/2007 | Vartiainen | G06F 17/241 715/202 |
| 2007/0177062 A1 | 8/2007 | Sakon | |
| 2008/0015860 A1 | 1/2008 | Lane | |
| 2008/0022209 A1 * | 1/2008 | Lyle | G06Q 10/107 715/730 |
| 2008/0040187 A1 | 2/2008 | Carraher | |
| 2008/0168073 A1 | 7/2008 | Siegel | |
| 2008/0229216 A1 | 9/2008 | Bagley | |
| 2008/0320583 A1 | 12/2008 | Sharma | |
| 2009/0006161 A1 | 1/2009 | Chen | |
| 2009/0021486 A1 | 1/2009 | Chaudhri | |
| 2009/0094088 A1 | 4/2009 | Chen | |
| 2009/0199113 A1 | 8/2009 | McWhinnie | |
| 2009/0271438 A1 | 10/2009 | Agapi | |
| 2009/0298417 A1 | 12/2009 | Phillips | |
| 2010/0085415 A1 | 4/2010 | Rahman | |
| 2010/0153160 A1 | 6/2010 | Bezemer | |
| 2010/0198644 A1 | 8/2010 | Renfro | |
| 2010/0205541 A1 | 8/2010 | Rapaport | |
| 2010/0220172 A1 | 9/2010 | Michaelis | |
| 2010/0268534 A1 | 10/2010 | Kishan et al. | |
| 2010/0268656 A1 | 10/2010 | Teicher | |
| 2010/0278453 A1 | 11/2010 | King | |
| 2010/0309527 A1 | 12/2010 | Mandalapu | |
| 2010/0318399 A1 * | 12/2010 | Li | G06Q 10/109 705/7.18 |
| 2011/0087491 A1 | 4/2011 | Wittenstein | |
| 2011/0182508 A1 | 7/2011 | Ives | |
| 2011/0246172 A1 | 10/2011 | Liberman | |
| 2011/0282648 A1 | 11/2011 | Sarikaya | |
| 2012/0011428 A1 | 1/2012 | Chisholm | |
| 2012/0050197 A1 | 3/2012 | Kemmochi | |
| 2012/0102409 A1 | 4/2012 | Fan | |
| 2012/0110472 A1 | 5/2012 | Amrhein | |
| 2012/0166532 A1 | 6/2012 | Juan | |
| 2012/0253795 A1 | 10/2012 | Andrews | |
| 2012/0268553 A1 | 10/2012 | Talukder | |
| 2012/0271676 A1 | 10/2012 | Aravamudan | |
| 2012/0296914 A1 | 11/2012 | Romanov | |
| 2012/0297284 A1 | 11/2012 | Matthews | |
| 2013/0006693 A1 | 1/2013 | Haynes | |
| 2013/0007773 A1 | 1/2013 | Guilford | |
| 2013/0036117 A1 | 2/2013 | Fisher | |
| 2013/0063542 A1 | 3/2013 | Bhay et al. | |
| 2013/0073329 A1 | 3/2013 | Shoham | |
| 2013/0132480 A1 | 5/2013 | Tsuji | |
| 2013/0144603 A1 | 6/2013 | Lord | |
| 2013/0182007 A1 | 7/2013 | Syeda-Mahmood et al. | |
| 2013/0226557 A1 | 8/2013 | Uszkoreit | |
| 2013/0232150 A1 | 9/2013 | Gingras | |
| 2013/0246098 A1 | 9/2013 | Habboush | |
| 2013/0275164 A1 | 10/2013 | Gruber | |
| 2013/0275312 A1 | 10/2013 | Claman | |
| 2013/0282421 A1 | 10/2013 | Graff | |
| 2013/0290434 A1 | 10/2013 | Bank | |
| 2013/0325972 A1 | 12/2013 | Boston et al. | |
| 2014/0012574 A1 | 1/2014 | Pasupalak | |
| 2014/0012926 A1 | 1/2014 | Narayanan | |
| 2014/0055400 A1 | 2/2014 | Reuschel | |
| 2014/0067390 A1 | 3/2014 | Webb | |
| 2014/0082100 A1 | 3/2014 | Sammon et al. | |
| 2014/0108085 A1 * | 4/2014 | Henriksen | G06Q 10/1095 705/7.19 |
| 2014/0136627 A1 * | 5/2014 | Epstein | H04L 65/403 709/205 |
| 2014/0139426 A1 | 5/2014 | Kryze | |
| 2014/0149492 A1 | 5/2014 | Ananthanarayanan | |
| 2014/0149494 A1 | 5/2014 | Markley | |
| 2014/0149771 A1 | 5/2014 | Krishna | |
| 2014/0149857 A1 | 5/2014 | Vagell | |
| 2014/0164476 A1 | 6/2014 | Thomson | |
| 2014/0222853 A1 | 8/2014 | Massand | |
| 2014/0223334 A1 | 8/2014 | Jensen et al. | |
| 2014/0258393 A1 | 9/2014 | Bank | |

(56) References Cited

U.S. PATENT DOCUMENTS

| | | |
|---|---|---|
| 2014/0278377 A1 | 9/2014 | Peters et al. |
| 2014/0278629 A1 | 9/2014 | Stephenson |
| 2014/0320586 A1 | 10/2014 | Tan |
| 2014/0365203 A1 | 12/2014 | Waibel |
| 2014/0365918 A1 | 12/2014 | Caldwell et al. |
| 2015/0006144 A1 | 1/2015 | Uszkoreit |
| 2015/0039297 A1 | 2/2015 | Greer |
| 2015/0066505 A1 | 3/2015 | Baker |
| 2015/0067047 A1 | 3/2015 | Fu |
| 2015/0091940 A1 | 4/2015 | Emori |
| 2015/0106146 A1 | 4/2015 | Higaki |
| 2015/0120278 A1 | 4/2015 | Waibel |
| 2015/0121466 A1 | 4/2015 | Brands |
| 2015/0149182 A1* | 5/2015 | Kains ............... G10L 15/18 704/275 |
| 2015/0154183 A1 | 6/2015 | Kristjansson |
| 2015/0154291 A1 | 6/2015 | Shepherd |
| 2015/0170051 A1 | 6/2015 | Bufe, III et al. |
| 2015/0179186 A1 | 6/2015 | Swierk |
| 2015/0181020 A1 | 6/2015 | Fitzsimmons |
| 2015/0271206 A1 | 9/2015 | Schultz |
| 2015/0334138 A1 | 11/2015 | Conklin |
| 2015/0370769 A1 | 12/2015 | Pereira Filho |
| 2016/0070688 A1 | 3/2016 | Yao |
| 2016/0071065 A1 | 3/2016 | Ohashi |
| 2016/0085604 A1 | 3/2016 | Rajagopalan |
| 2016/0092419 A1 | 3/2016 | Farouki |
| 2016/0092578 A1* | 3/2016 | Ganani ............... G06Q 10/10 707/728 |
| 2016/0117624 A1 | 4/2016 | Flores |
| 2016/0124742 A1 | 5/2016 | Rangasamy |
| 2016/0147399 A1 | 5/2016 | Berajawala |
| 2016/0203127 A1 | 7/2016 | Uszkoreit |
| 2016/0249096 A1 | 8/2016 | Ortiz |
| 2016/0283473 A1 | 9/2016 | Heinze et al. |
| 2016/0283676 A1* | 9/2016 | Lyon ............... G06F 19/328 |
| 2016/0294964 A1 | 10/2016 | Brune |
| 2016/0307063 A1 | 10/2016 | Bright et al. |
| 2017/0099361 A1 | 4/2017 | Digilov |
| 2017/0116185 A1 | 4/2017 | Erickson |
| 2017/0132518 A1 | 5/2017 | Kitada |
| 2017/0134446 A1 | 5/2017 | Kitada |
| 2017/0154541 A1 | 6/2017 | King |
| 2017/0185836 A1 | 6/2017 | Okumra |
| 2017/0205987 A1 | 7/2017 | Martin |
| 2017/0212882 A1 | 7/2017 | Rollins |
| 2017/0213192 A1 | 7/2017 | Kitada |
| 2017/0213193 A1 | 7/2017 | Kitada |
| 2017/0255446 A1 | 9/2017 | Malatesha |
| 2017/0277784 A1 | 9/2017 | Hay |
| 2017/0286383 A1 | 10/2017 | Koul |
| 2017/0357643 A1 | 12/2017 | Kristjansson |
| 2018/0007100 A1 | 1/2018 | Krasadakis |
| 2018/0039606 A1 | 2/2018 | Lysenko |
| 2018/0039634 A1 | 2/2018 | Goldstein |
| 2018/0095951 A1 | 4/2018 | Takamiya |
| 2018/0101760 A1 | 4/2018 | Nelson |
| 2018/0101761 A1 | 4/2018 | Nelson |
| 2018/0101823 A1 | 4/2018 | Nelson |
| 2018/0101824 A1 | 4/2018 | Nelson |
| 2018/0176207 A1 | 6/2018 | Malatesha |
| 2018/0176267 A1 | 6/2018 | Malatesha |
| 2018/0176268 A1 | 6/2018 | Malatesha |
| 2018/0182052 A1 | 6/2018 | Panagos |
| 2018/0232705 A1 | 8/2018 | Baker |
| 2018/0246569 A1 | 8/2018 | Arakawa |
| 2018/0267950 A1 | 9/2018 | de Mello Brandao |
| 2018/0285059 A1 | 10/2018 | Zurek |
| 2018/0314882 A1 | 11/2018 | Yu |
| 2018/0315429 A1 | 11/2018 | Taple |
| 2018/0365657 A1 | 12/2018 | Kitada |
| 2018/0367483 A1 | 12/2018 | Rodriguez |
| 2019/0019022 A1 | 1/2019 | Marda |
| 2019/0028520 A1 | 1/2019 | Nawrocki |
| 2019/0108221 A1 | 4/2019 | Nelson |
| 2019/0108492 A1 | 4/2019 | Nelson |
| 2019/0108493 A1 | 4/2019 | Nelson |
| 2019/0108494 A1 | 4/2019 | Nelson |
| 2019/0108834 A1 | 4/2019 | Nelson |
| 2019/0156822 A1 | 5/2019 | Manuvinakurike |
| 2019/0189117 A1 | 6/2019 | Kumar |
| 2019/0272902 A1 | 9/2019 | Vozila |
| 2019/0273767 A1 | 9/2019 | Nelson |
| 2019/0295041 A1 | 9/2019 | Sim |
| 2019/0378076 A1 | 12/2019 | O'Gorman |
| 2020/0160954 A1 | 5/2020 | Lyman |
| 2020/0293604 A1 | 9/2020 | Nelson |
| 2020/0293605 A1 | 9/2020 | Nelson |
| 2020/0293606 A1 | 9/2020 | Nelson |
| 2020/0293607 A1 | 9/2020 | Nelson |
| 2020/0293608 A1 | 9/2020 | Nelson |
| 2020/0293616 A1 | 9/2020 | Nelson |
| 2021/0272071 A1 | 9/2021 | Nelson et al. |
| 2021/0357768 A1 | 11/2021 | Kitada et al. |

FOREIGN PATENT DOCUMENTS

| | | |
|---|---|---|
| JP | 07-182365 | 7/1995 |
| JP | 07-191690 | 7/1995 |
| JP | 08-316953 | 11/1996 |
| JP | H10-269232 | 10/1998 |
| JP | 2001/005874 | 1/2001 |
| JP | 2001175720 A | 6/2001 |
| JP | 2002-207753 | 7/2002 |
| JP | 2004112518 A | 4/2004 |
| JP | 2004-112518 | 8/2004 |
| JP | 2005/202596 | 7/2005 |
| JP | 2005-277462 | 10/2005 |
| JP | 2005346515 A | 12/2005 |
| JP | 2006-085440 | 3/2006 |
| JP | 2007-336344 | 12/2007 |
| JP | 2008-099330 | 4/2008 |
| JP | 2008-152527 | 7/2008 |
| JP | 2009/515253 | 4/2009 |
| JP | 2012/103891 | 5/2012 |
| JP | 2014-143668 | 8/2014 |
| JP | 2015-154315 | 8/2015 |
| JP | 2015535635 A | 12/2015 |
| JP | 2016/526216 | 9/2016 |
| JP | 2016173646 A | 9/2016 |
| JP | 2018/142059 | 9/2018 |
| WO | WO01/91033 A2 | 11/2001 |
| WO | WO 2014/084967 A1 | 6/2014 |
| WO | WO 2016/00010 A1 | 1/2016 |

OTHER PUBLICATIONS

Harrer et al., "The Scalable Adapter Design Pattern: Enabling Interoperability Between Educational Interoperability Between Educational Software Tools", IEEE, vol. 1, No. 2, Apr. 1, 2008, 14 pages.

Gamma et al., "Design Patterns" Design Patterns, dated Jan. 1, 1995, 7 pages.

European Patent Office, "Search Report" in applicatio No. 17207179.7-1222, dated Jan. 25, 2018, 9 pages.

European Patent Office, "Search Report" in application No. 16194599.3-1502, dated Apr. 3, 2017, 7 pages.

European Patent Office, "Search Report", in application No. 17206719.1-1224, dated May 4, 2018, 9 pages.

Tur et al., "The Calo Meeting Assistant System", IEEE Transactions on Audio, Speech and Language Processing, vol. 18, No. 6, dated Aug. 2010, 11pages.

Nelson, U.S. Appl. No. 15/728,368, filed Oct. 9, 2017, Final Office Action, dated Jun. 19, 2019.

Nelson, U.S. Appl. No. 15/728,367, filed Oct. 9, 2017, Final Office Action, dated May 3, 2019.

Nelson, U.S. Appl. No. 15/728,367, filed Oct. 9, 2017, Advisory Action, dated May 17, 2019.

Nelson, U.S. Appl. No. 15/290,860, filed Oct. 11, 2016, Notice of Allowance, dated May 21, 2019.

(56) References Cited

OTHER PUBLICATIONS

Nelson, U.S. Appl. No. 15/290,858, filed Oct. 11, 2016, Office Action, dated May 1, 2019.
Nelson, U.S. Appl. No. 15/290,855, filed Oct. 11, 2016, Advisory Action, dated Jun. 20, 2019.
Nelosn, U.S. Appl. No. 15/290,855, filed Oct. 11, 2016, Final Office Action, dated May 1, 2019.
Kitada, U.S. Appl. No. 16/112,361, filed Aug. 24, 2018, Notice of Allowance, dated Jun. 7, 2019.
Kitada, U.S. Appl. No. 14/992,278, filed Jan. 11, 2016, Office Action, dated Jul. 30, 2019.
Nelson, U.S. Appl. No. 15/910,878, filed Mar. 2, 2018, Office Action, dated Oct. 3, 2019.
Nelson, U.S. Appl. No. 15/728,368, filed Oct. 9, 2017, Notice of Allowance, dated Oct. 2, 2019.
Nelson, U.S. Appl. No. 15/728,367, filed Oct. 9, 2017, Notice of Allowance, dated Sep. 6, 2019.
Nelson, U.S. Appl. No. 15/290,855, filed Oct. 11, 2016, Notice of Allowance, dated Sep. 6, 2019.
The State Intellectual Property Office of P.R. China, "Search Report" in application No. 2016109782056, datted Aug. 28, 2019, 34 pages.
Olli Korjus, "Meeting Scheduling Assistant: Automatic Scheduling Between Heterogeneous Calendar Systems", dated Sep. 2012, pp. 1-115.
The State Intellectual Property Office of P.R. China, "The Notification of the First Office Action", in application No. 2016109747584, dated Jul. 3, 2019, 17 pages.
Nelson, U.S. Appl. No. 15/290,858, filed Oct. 11, 2016, Office Action, dated Mar. 30, 2020.
Nelson, U.S. Appl. No. 15/728,376, filed Oct. 9, 2017, Office Action, dated Mar. 27, 2020.
Nelson, U.S. Appl. No. 15/728,372, filed Oct. 9, 2017, Office Action, dated Mar. 6, 2020.
Nelson, U.S. Appl. No. 15/728,360, filed Oct. 9, 2017, Office Action, dated Mar. 23, 2020.
Nelson, U.S. Appl. No. 15/290,858, filed Oct. 11, 2016, Advisory Action, dated Feb. 13, 2020.
Kitada, U.S. Appl. No. 14/992,278, filed Jan. 11, 2016, Final Office Action, dated Feb. 10, 2020.
Nelson, U.S. Appl. No. 15/910,878, filed Mar. 2, 2018, Final Office Action, dated Jan. 9, 2020.
Nelson, U.S. Appl. No. 15/290,861, filed Oct. 11, 2016, Office Action, dated Dec. 19, 2019.
Nelson, U.S. Appl. No. 15/290,858, filed Oct. 11, 2016, Final Office Action, dated Nov. 18, 2019.
Nelson, U.S. Appl. No. 16/355,190, filed Mar. 15, 2019, Office Action, dated Jul. 28, 2020.
Nelson, U.S. Appl. No. 16/355,176, filed Mar. 15, 2019, Office Action, dated Jul. 28, 2020.
Nelson, U.S. Appl. No. 16/355,160, filed Mar. 15, 2020, Office Action, dated Jun. 26, 2020.
Nelson, U.S. Appl. No. 16/355,151, filed Mar. 15, 2019, Office Action, dated Jul. 1, 2020.
Nelson, U.S. Appl. No. 15/728,376, filed Oct. 9, 2017, Final Office Action, dated Jul. 27, 2020.
Nelson, U.S. Appl. No. 15/728,372, filed Oct. 9, 2017, Final Office Action, dated Jun. 30, 2020.
Nelson, U.S. Appl. No. 15/728,360, filed Oct. 9, 2017, Final Office Action, dated Jul. 28, 2020.
Nelson, U.S. Appl. No. 15/290,861, filed Oct. 11, 2016, Advisory Action, filed Jun. 26, 2020.
European Patent Office, "Search Report" in application No. 20161731.3-1222, dated Jun. 9, 2020, 9 pages.
Nelson, U.S. Appl. No. 16/355,132, filed Mar. 15, 2019, Final Office Action, dated Nov. 4, 2020.
Nelson, U.S. Appl. No. 15/728,372, filed Oct. 9, 2017, Notice of Allowance, dated Nov. 6, 2020.
Nelson, U.S. Appl. No. 15/290,858, filed Oct. 11, 2016, Advisory Action, dated Feb. 3, 2021.
Nelson, U.S. Appl. No. 16/355,190, filed Mar. 15, 2019, Final Office Action, dated Jan. 13, 2021.
Nelson, U.S. Appl. No. 16/355,190, filed Mar. 15, 2019, Advisory Action, dated Mar. 10, 2021.
Nelson, U.S. Appl. No. 16/355,176, filed Mar. 15, 2019, Final Office Action, dated Jan. 13, 2021.
Nelson, U.S. Appl. No. 16/355,160, filed Mar. 15, 2019, Office Action, dated Jan. 22, 2021.
Nelson, U.S. Appl. No. 16/355,151, filed Mar. 15, 2019, Final Office Action, dated Jan. 8, 2021.
Nelson, U.S. Appl. No. 16/355,145, filed Mar. 15, 2019, Final Office Action, dated Mar. 16, 2021.
Nelson, U.S. Appl. No. 16/355,132, filed Mar. 15, 2019, Office Action, dated Mar. 24, 2021.
Nelson, U.S. Appl. No. 15/728,376, filed Oct. 9, 2017, Interview Summary, dated Mar. 25, 2021.
Nelson, U.S. Appl. No. 15/728,360, filed Oct. 9, 2017, Notice of Allowance, dated Feb. 10, 2021.
Thorisson et al., "Whiteboards: Scheduling Blackboards for Semantic Routing of Messages and Streams", Workshop on Modular Construction of Human Like Intelligence, dated Jul. 10, 2005, pp. 8-15.
European Patent Office, "Search Report" in application No. 18196734.0-1230, dated Feb. 21, 2019, 9 pages.
European Patent Office, "Search Report" in application No. 17194726.0-1222, dated Jan. 16, 2018, 7 pages.
European Patent Office, "Search Report" in Application No. 17192809.6-1958, dated Dec. 6, 2017, 9 pages.
Nelson, U.S. Appl. No. 15/728,367, filed Oct. 9, 2017, Office Action, dated Jan. 24, 2019.
Malatesha, U.S. Appl. No. 15/384,187, filed Dec. 19, 2016, Notice of Allowance, dated Jan. 4, 2019.
Kitada, U.S. Appl. No. 16/112,361, filed Aug. 24, 2018, Office Action, dated Jan. 28, 2019.
Kitada, U.S. Appl. No. 14/992,278, filed Jan. 11, 2016, Final Office Action, dated Jan. 15, 2019.
Kitada, U.S. Appl. No. 14/992,273, filed Jan. 11, 2016, Notice of Allowance, dated Dec. 27, 2016.
Kitada, U.S. Appl. No. 15/477,276, filed Apr. 3, 2017, Ex Parte Quaye, dated Apr. 20, 2018.
Kitada, U.S. Appl. No. 15/477,240, filed Apr. 3, 2018, Notice of Allowance, dated May 1, 2018.
Nelson, U.S. Appl. No. 16/355,160, filed Mar. 15, 2019, Final Office Action, dated Oct. 7, 2020.
Nelson, U.S. Appl. No. 16/355,145, filed Mar. 15, 2019, Office Action, dated Sep. 14, 2020.
Nelson, U.S. Appl. No. 15/728,372, filed Oct. 9, 2017, Interview Summary, dated Sep. 24, 2020.
Nelson, U.S. Appl. No. 15/728,360, filed Oct. 9, 2017, Interview Summary, dated Oct. 7, 2020.
Kitada, U.S. Appl. No. 14/992,278, filed Jan. 11, 2016, Office Action, dated Aug. 26, 2020.
Wikipedia, the Free Encyclopedia, "Watson (Computer", https://en.wikipedia.org/wiki/Watson_(computer), last viewed on Feb. 23, 2016, 16 pages.
U.S. Appl. No. 14/992,273, filed Jan. 11, 2016, Office Action, dated Jul. 29, 2016.
Malatesha, U.S. Appl. No. 15/384,187, filed Dec. 19, 2016, Office Action, dated Aug. 10, 2018.
Malatesha, U.S. Appl. No. 15/384,184, filed Dec. 19, 2016, Notice of Allowance, dated Oct. 4, 2018.
Kitada, U.S. Appl. No. 15/477,276, filed Apr. 3, 2017, Office Action, dated Aug. 29, 2018.
Kitada, U.S. Appl. No. 14/992,278, filed Jan. 11, 2016, Office Action, dated Aug. 27, 2018.
Nelson, U.S. Appl. No. 15/290,860, filed Oct. 11, 2016, Office Action, dated Nov. 16, 2018.
Nelson, U.S. Appl. No. 15/290,855, filed Oct. 11, 2016, Office Action, dated Oct. 18, 2018.
Malatesha, U.S. Appl. No. 15/384,181, filed Dec. 19, 2016, Office Action, dated Nov. 2, 2018.
Kitada, U.S. Appl. No. 15/477,276, filed Apr. 3, 2017, Notice of Allowance, dated Dec. 5, 2018.

(56) References Cited

OTHER PUBLICATIONS

Steitz et al., "Managing and Communicating Operational Workflow: Designing and Implementing an Electronic Outpatient Whiteboard", Appl Clin Inform. 7(1), p. 59-68, dated Feb. 3, 2016.

Kitada, U.S. Appl. No. 15/477,276, filed Apr. 3, 2017, Office Action, dated Dec. 1, 2017.

Kitada, U.S. Appl. No. 15/477,240, filed Apr. 3, 2017, Office Action, dated Dec. 1, 2017.

Nelson, U.S. Appl. No. 15/728,368, filed Oct. 9, 2017, Office Action, dated Feb. 25, 2019.

Malatesha, U.S. Appl. No. 15/348,181, filed Dec. 19, 2016, Notice of Allowance, dated Mar. 21, 2019.

Nelson, U.S. Appl. No. 16/355,132, filed Mar. 15, 2019, Office Action, dated Jun. 2, 2020.

Nelson, U.S. Appl. No. 15/910,878, filed Mar. 2, 2018, Notice of Allowance, dated Apr. 16, 2020.

Nelson, U.S. Appl. No. 15/290,861, filed Oct. 11, 2016, Final Office Action, dated Apr. 23, 2020.

Kitada, U.S. Appl. No. 14/992,278, filed Jan. 11, 2016, Advisory Action, dated May 21, 2020.

European Patent Office, "Search Report" in application No. 20162756.9-1222, dated Jun. 4, 2020, 10 pages.

European Patent Office, "Search Report" in application No. 20159759.8-1222, dated May 19, 2020, 10 pages.

European Patent Office, "Search Report" in application No. 18 196 7340.0-1230, dated May 7, 2020, 6 pages.

Erol, Bema et al., "An Overview ofTechnologiesfore-Meetingand e-Lecture", IEEE, dated 2005, 6 pages.

Aiken, Milam et al., "Automatic Translation in Mutilingual Electronic Meetings", Translation Journal, vol. 13., No. 3, dated Jul. 2009, 9 pages.

Marreiros et al., "Modeling Group Decision Meeting Participants with an Agent-Based Approach," https://www.gecad.isep.ipp.pt/report0307/Papers/AIDSJournals/CRL%20-%20revista.pdf, dated 2007, 7 pages.

\* cited by examiner

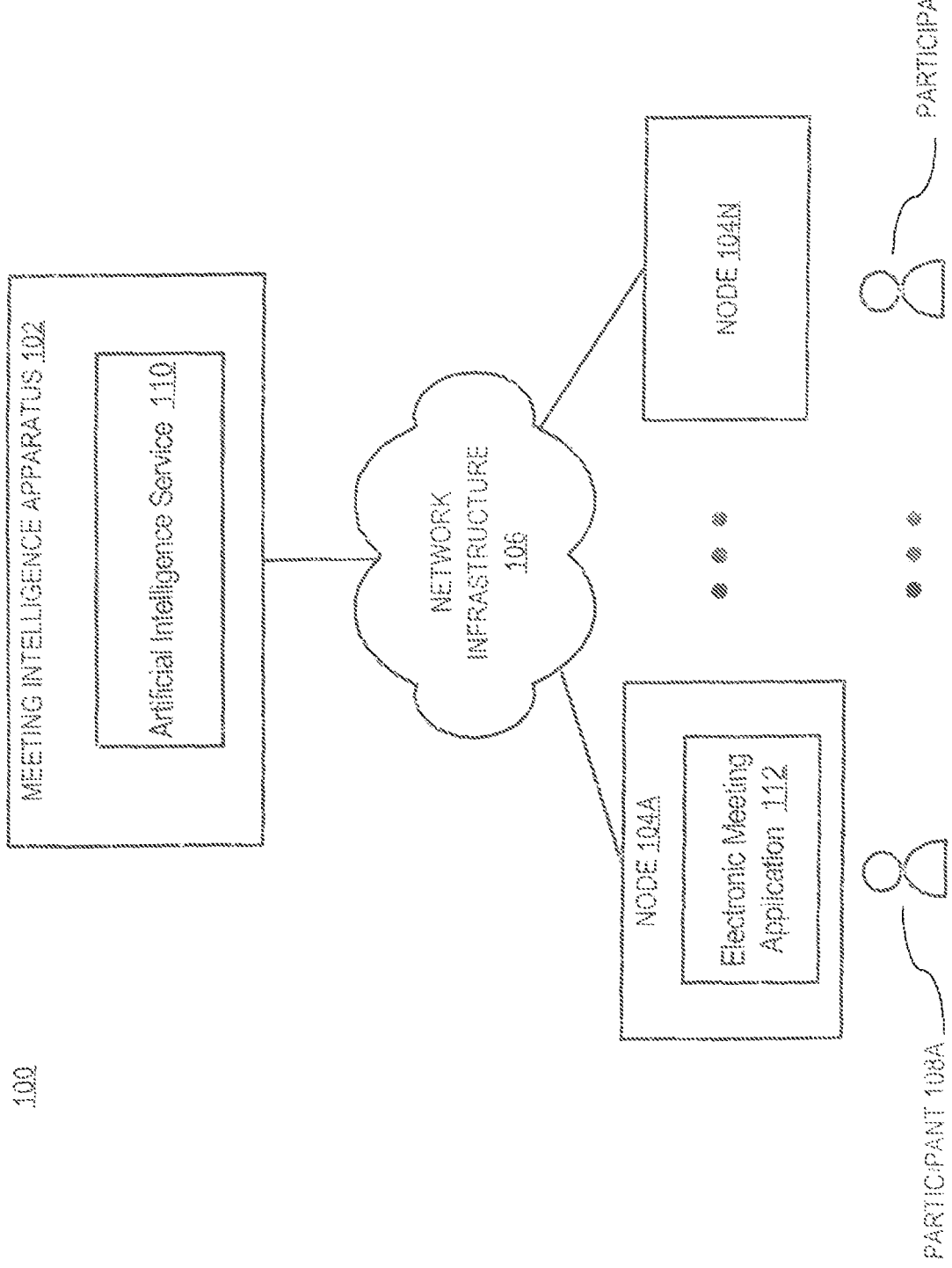

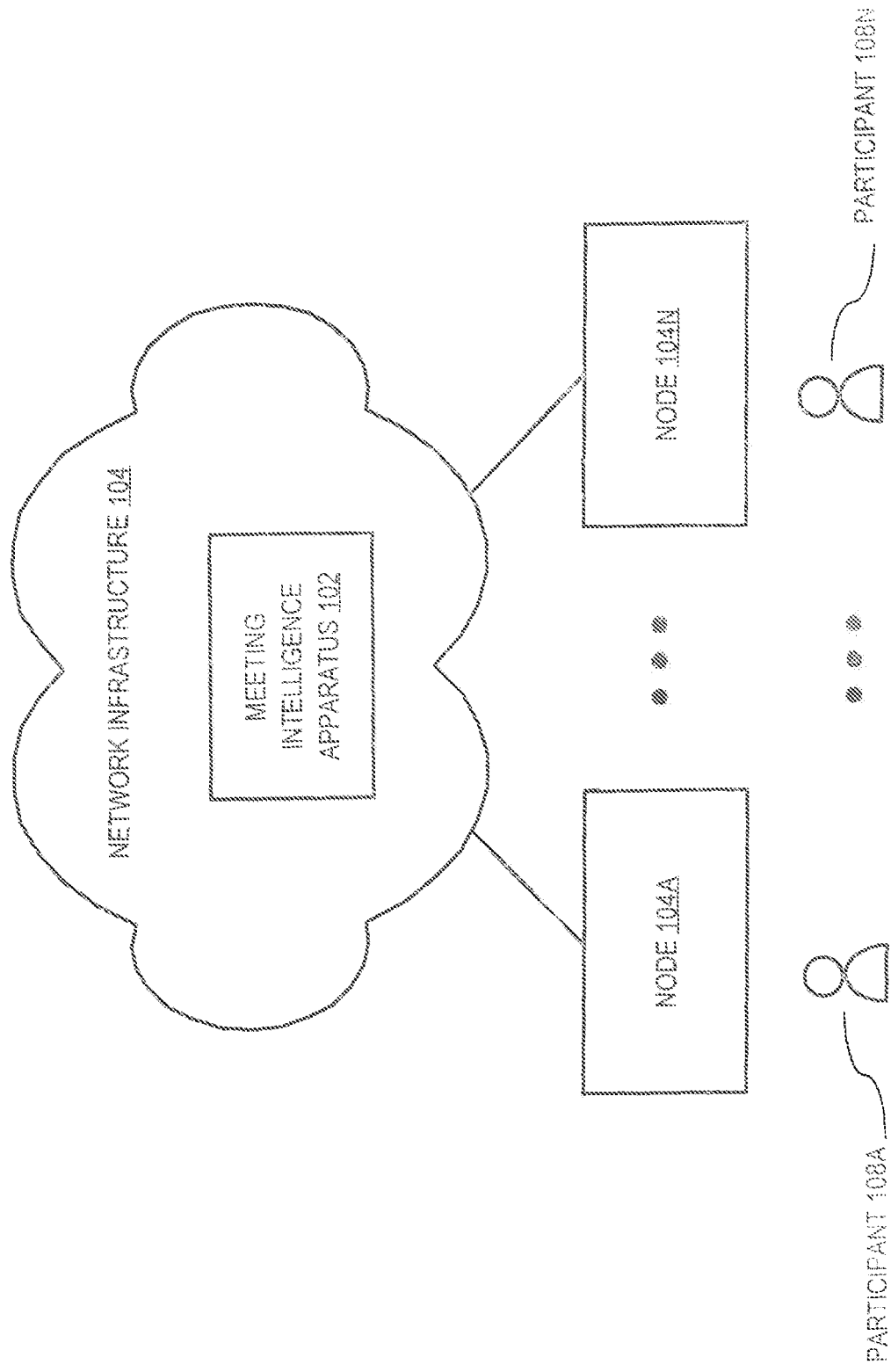

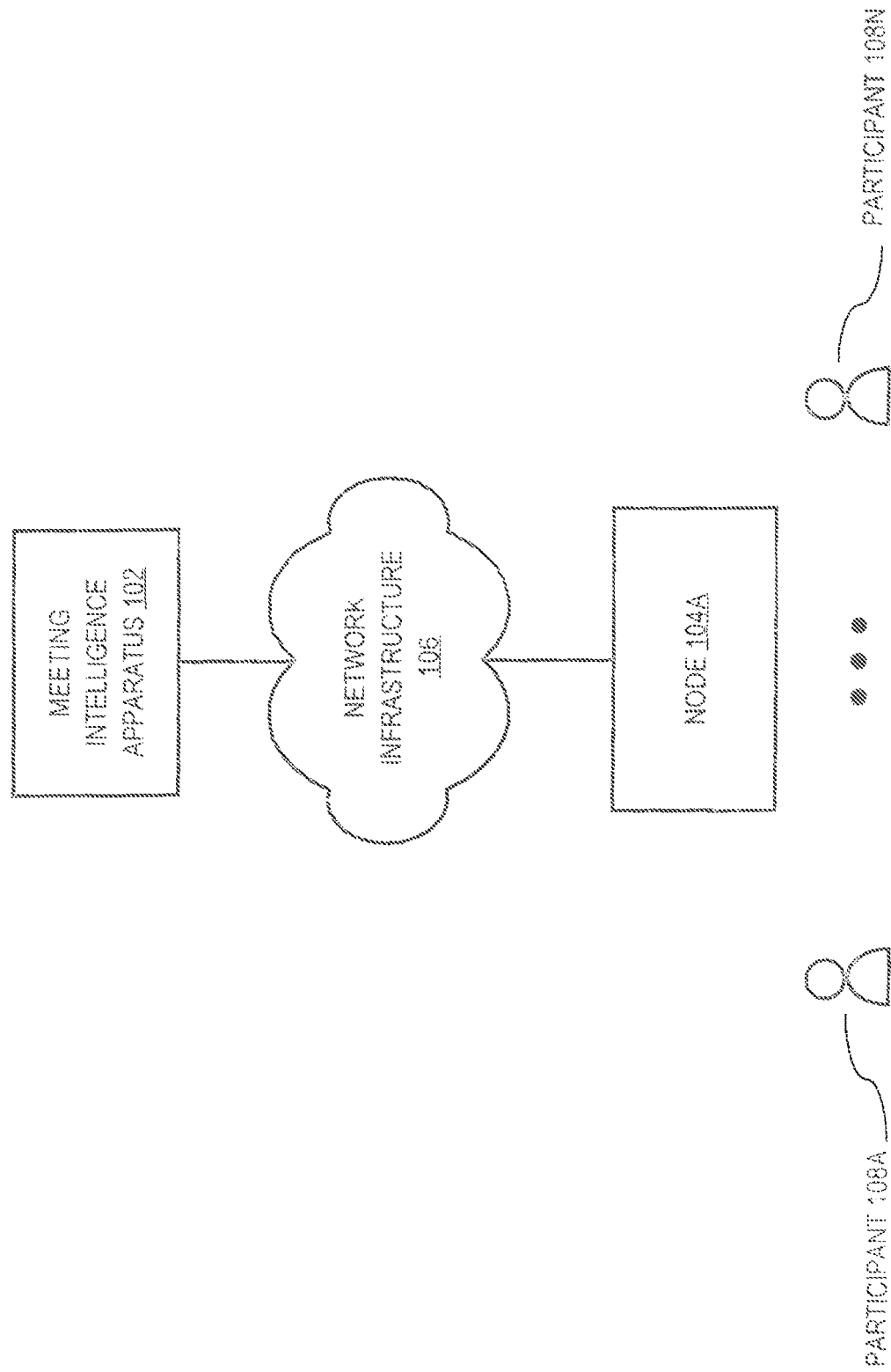

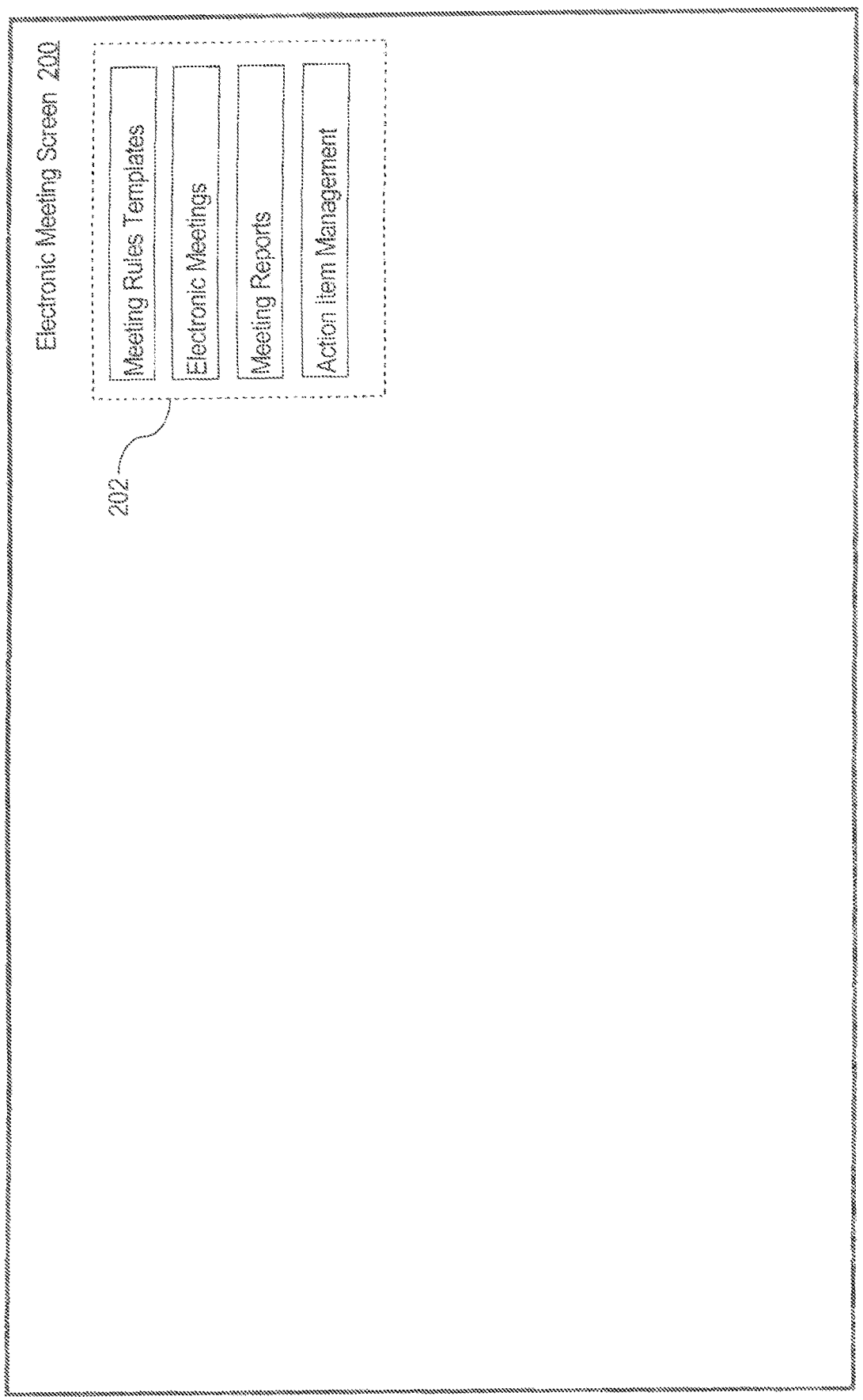

FIG. 2B

Meeting Rules Templates Screen 204

Select a Meeting Rules Template:

By Department:
Legal
 -Compliance
 -Litigation
 -Open Source Licensing
 -Standards
Engineering
 -Requirements Review
 -Preliminary Design Specification Review
 -Detailed Design Specification Review
 -Code Review
 -Integration Planning
 -Test Review
Software Quality Assurance (SQA)
 -Code Review
 -Test Verification
Finance
 -Quarter End Meeting
 -Year-End Meeting
Management
 -Board of Directors

By Topic:
Code Review - Engineering
Code Review - SQA
Compliance
Detailed Design Specification Review
Board of Directors
Financial Review
Integration Planning
Litigation
Open Source Licensing
Preliminary Design Specification Review
PX350 - Product Release
Quarter End Meeting
Requirements Review
Standards
Test Review
Test Verification
Year End Meeting Search for a Meeting Rules Template: ⎯ 206

[Edit] [Delete] [New] [Back]

Meeting Rules Templates Screen 204

Board of Directors Meeting Rules

Data Inputs:  Q4 Financials
 Sales Projections Report

Maximum Number of Meeting Participants:  10

Minimum Number of Board Members Required:  4

Designated Decision Maker Required:  Yes

Required Agenda Items:  Yes
 Action Items from Prior Meeting:  Yes
 Financial Review:  Yes
 Short Term Strategic Planning:  Yes
 Long Term Strategic Planning:  Yes Maximum Amount of Time Per Topic:  15 minutes Procedural Rules for Meeting:  Roberts Rules of Order Meeting Minutes Required:  Yes
 Specify Start and End Time:  Yes
 Identify Board Members in Meeting:  Yes
 Record Voting Results for All Motions:  Yes

210 —

[ Add ]  [ Edit ]  [ Delete ]  [ Save ]  [ Back ]

FIG. 2E

Electronic Meeting Management Screen 230

Existing Meetings: 232

Pluto Project:
- Detailed Design Review 9/1/16 [View] [Join]
- First Code Review Meeting 10/1/16 [View] [Join]
- Integration Testing Meeting 10/10/16 [View] [Join]

Legal Department:
- Litigation Team Meeting 9/1/16 [View] [Join]
- Compliance Review Meeting 9/3/16 [View] [Join]

Finance Department:
- Q2 Review Meeting 8/25/16 [View] [Join]
- Q3 Planning Meeting 9/1/16 [View] [Join]

Management:
- Q2 Board Meeting 9/5/16 [View] [Join]

[Back]

New Meeting: 234

| | |
|---|---|
| Meeting Name: | Second Code Review Meeting |
| Meeting Owner: | |
| Meeting Subject: | Pluto Project |
| Meeting Type: | Code Review |
| Select Meeting Rules Template: | Engineering: Code Review |
| Date & Time: | 10am, 10/1/2016 |
| Duration: | 1 hr |
| Location: | Venus Conference Room |

Meeting Agenda 236    Meeting Participants 238

[Save]    [Cancel]

FIG. 2G

Electronic Meeting Screen 230

New Meeting: 234

| Meeting Name: | Second Code Review Meeting |
| Meeting Owner: | |
| Meeting Subject: | Pluto Project |
| Meeting Type: | Code Review |
| Select Meeting Rules Template: | Engineering: Code Review |
| Date & Time: | 10am, 10/1/2016 |
| Duration: | 1 hr |
| Location: | Venus Conference Room |

Create Meeting Agenda 236

Select Meeting Participants 238

Save    Cancel

Suggestions for Meeting Owner: 239

| Accept | Reject | Suggestion | Additional Information |
|---|---|---|---|
| ☐ | ☐ | Bob H. (98%) | Owner of prior code review meeting for the Pluto project |
| ☐ | ☐ | Susan G. (87%) | Member of Pluto project team and owner of code review meetings for other projects |

Continue    Back

FIG. 2H

Agenda Creation Screen 250

Meeting Name: Second Code Review Meeting

Agenda Information

User-Specified Agenda Items: 254

- Additional Software Requirements from Vendor
- Graphical User Interface Update
- Software Integration Planning Suggested Agenda Items: 256

☐ Uncompleted Agenda Items From Prior Meeting(s)

☐ Action Items from Prior Meeting(s)

☐ Agenda Items Based Upon Meeting Rules Template

☐ Other

258

[Save] [Back]

FIG. 21

Agenda Creation Screen 250

Meeting Name: Second Code Review Meeting          Agenda Information

252

User-Specified Agenda Items: 254

- Additional Software Requirements from Vendor
- Graphical User Interface Update
- Software Integration Planning Suggested Agenda Items: 256

☒ Uncompleted Agenda Items From Prior Meeting(s)
  ☐ Driver code for DMA board (99%)
  ☐ Software Testing Schedule (99%)

☒ Action Items from Prior Meeting(s)
  ☐ Verify requirements for Sat link - John E. (99%)
  ☐ Investigate problems with DMA board - Susan R. (99%)

☒ Agenda Items Based Upon Meeting Rules Template
  ☐ Milestones Status Review (99%)

☒ Other
  ☐ Software Testing Schedule (92%)

258

Save     Back

FIG. 2J

Meeting Name: Second Code Review Meeting     Participant Selection Screen 260

Participant Information

User-Specified Meeting Participants: 264

Add Contacts 266
- ☐ Joe B.
- ☐ Susan R.
- ☐ Taryn K.
- ☐ Alex J.
- ☐ John E.
- ☐ Jake S.
- ☐ Charles W.

Suggested Meeting Participants: 268

| Participant | | Additional Information |
|---|---|---|
| ☐ Taryn K. | (98%) | Attended First Code Review Meeting and was designated decision maker |
| ☐ Alex J. | (88%) | Attended First Code Review meeting |
| ☐ John E. | (88%) | Subject Matter Expert (SME) in encryption <more> |
| ☐ Jake S. | (72%) | Lead software developer on Pluto project |
| ☐ Charles W. | (68%) | Member of software quality assurance team |

270
[ Save ]  [ Back ]

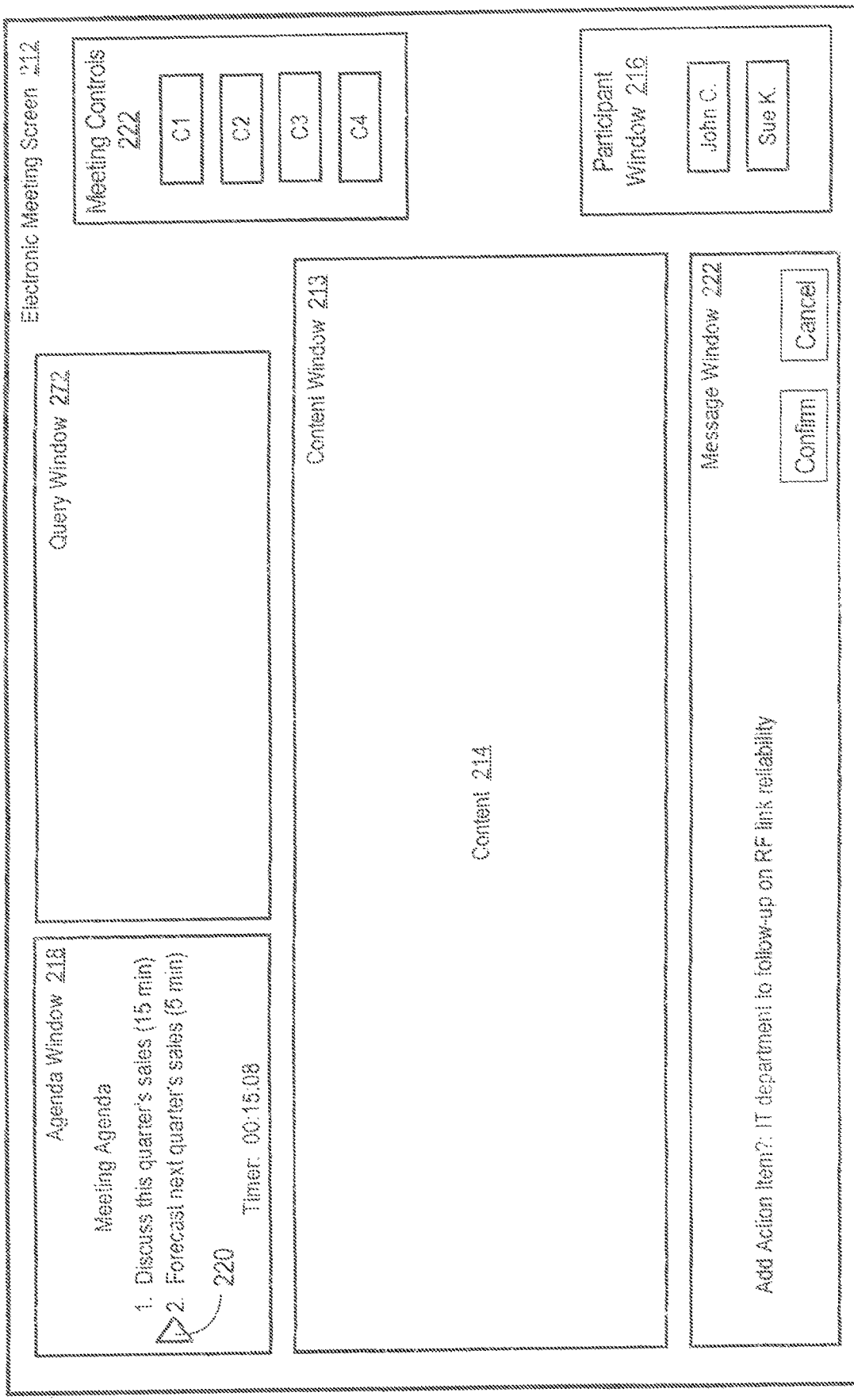

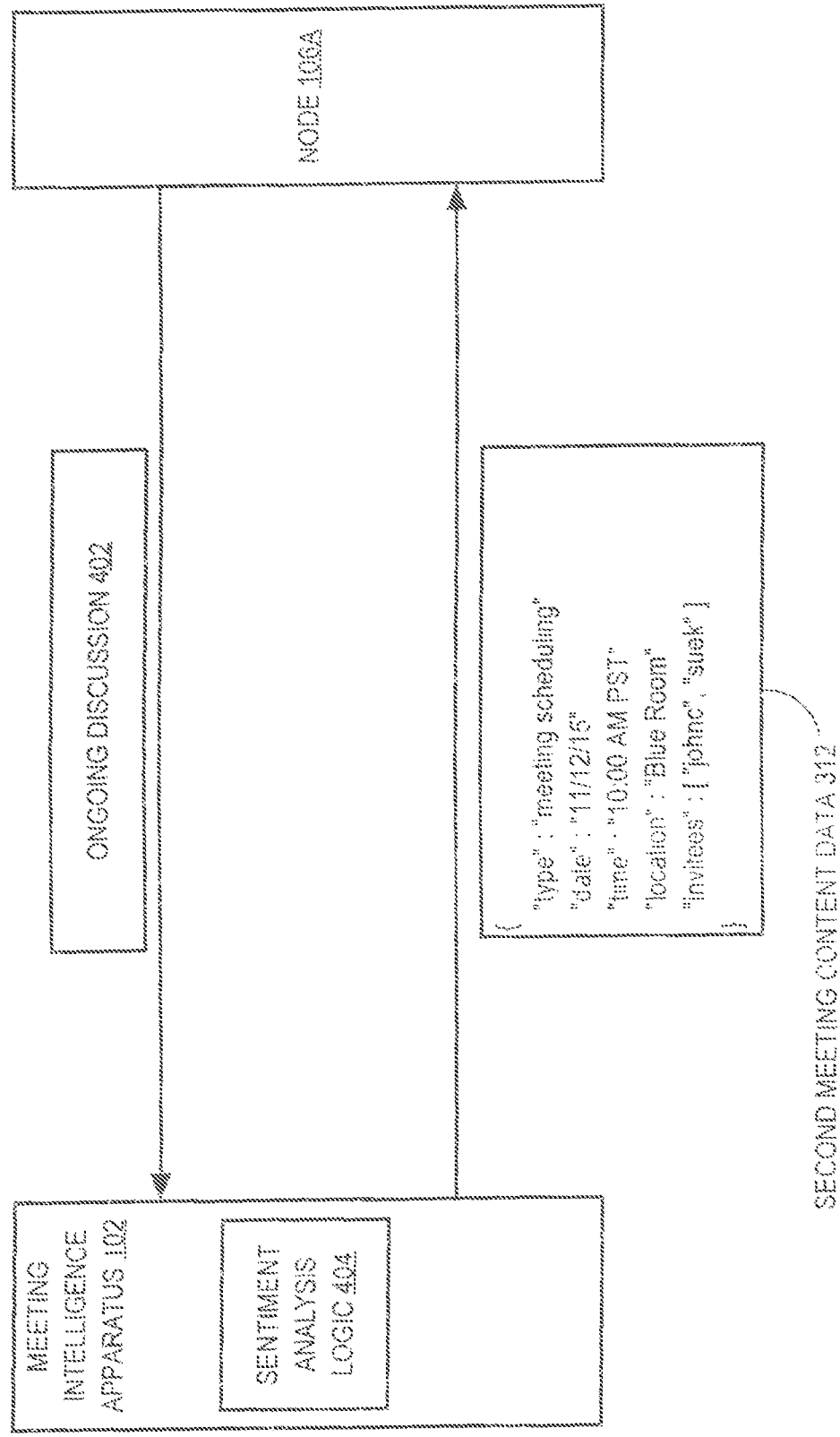

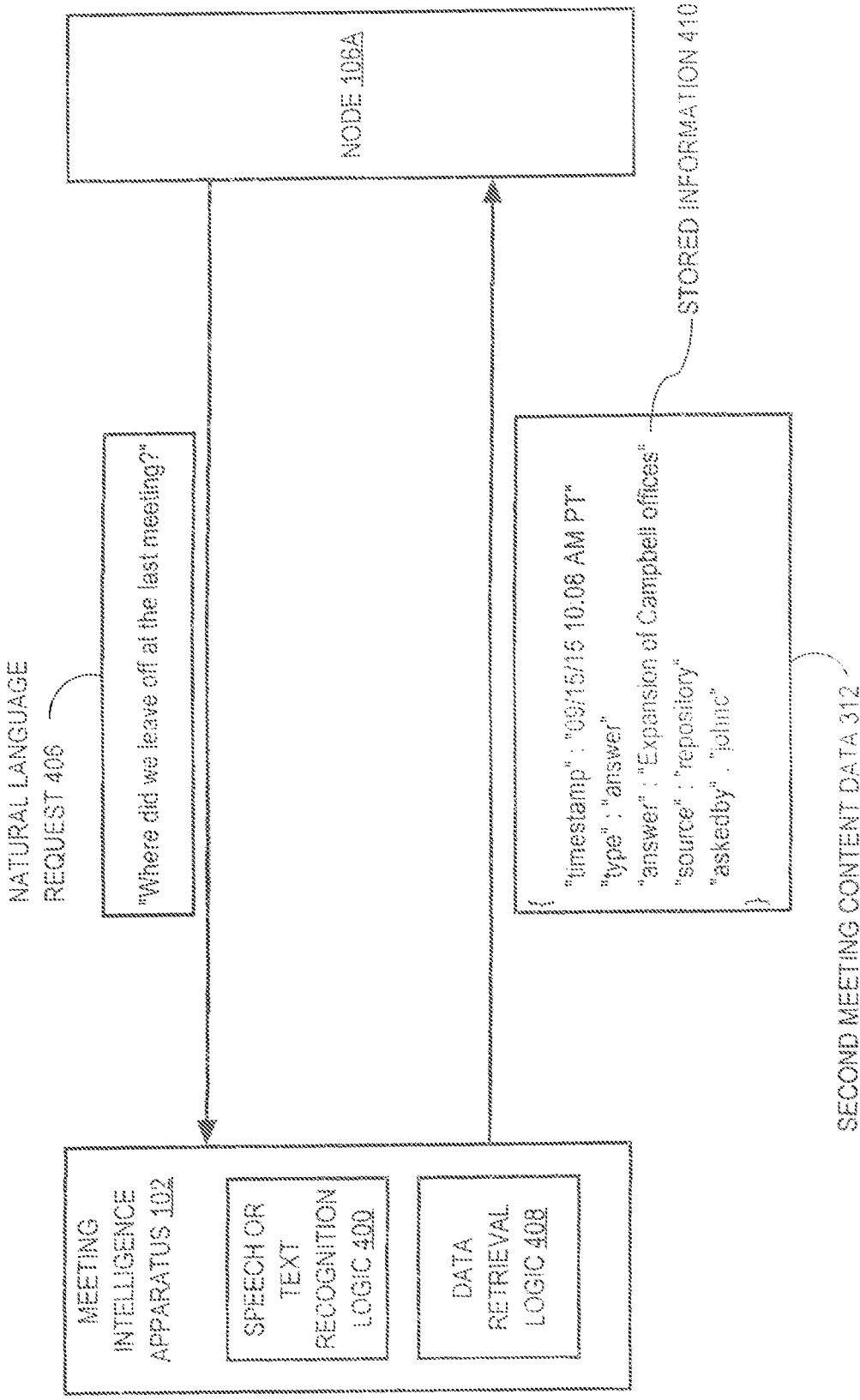

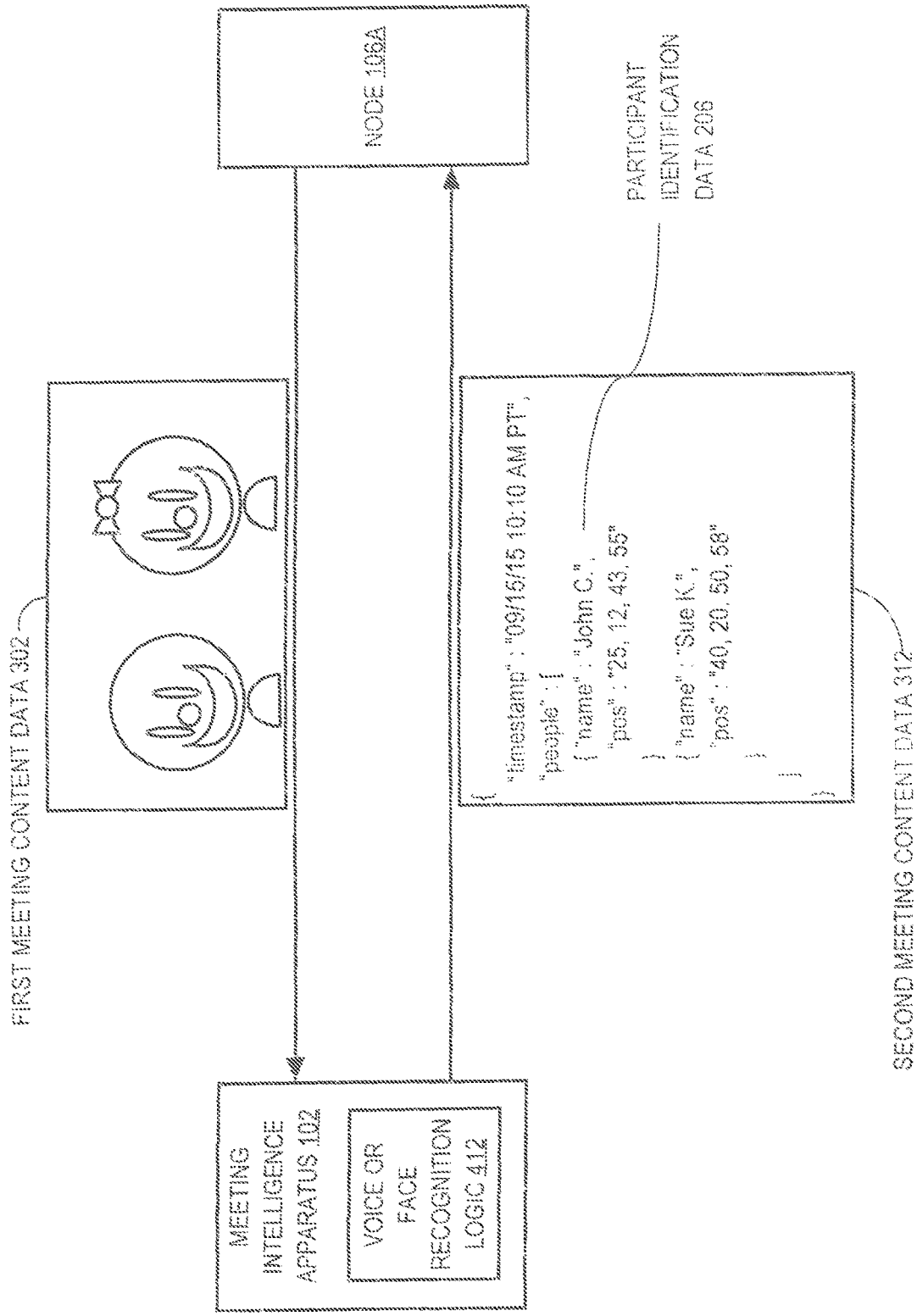

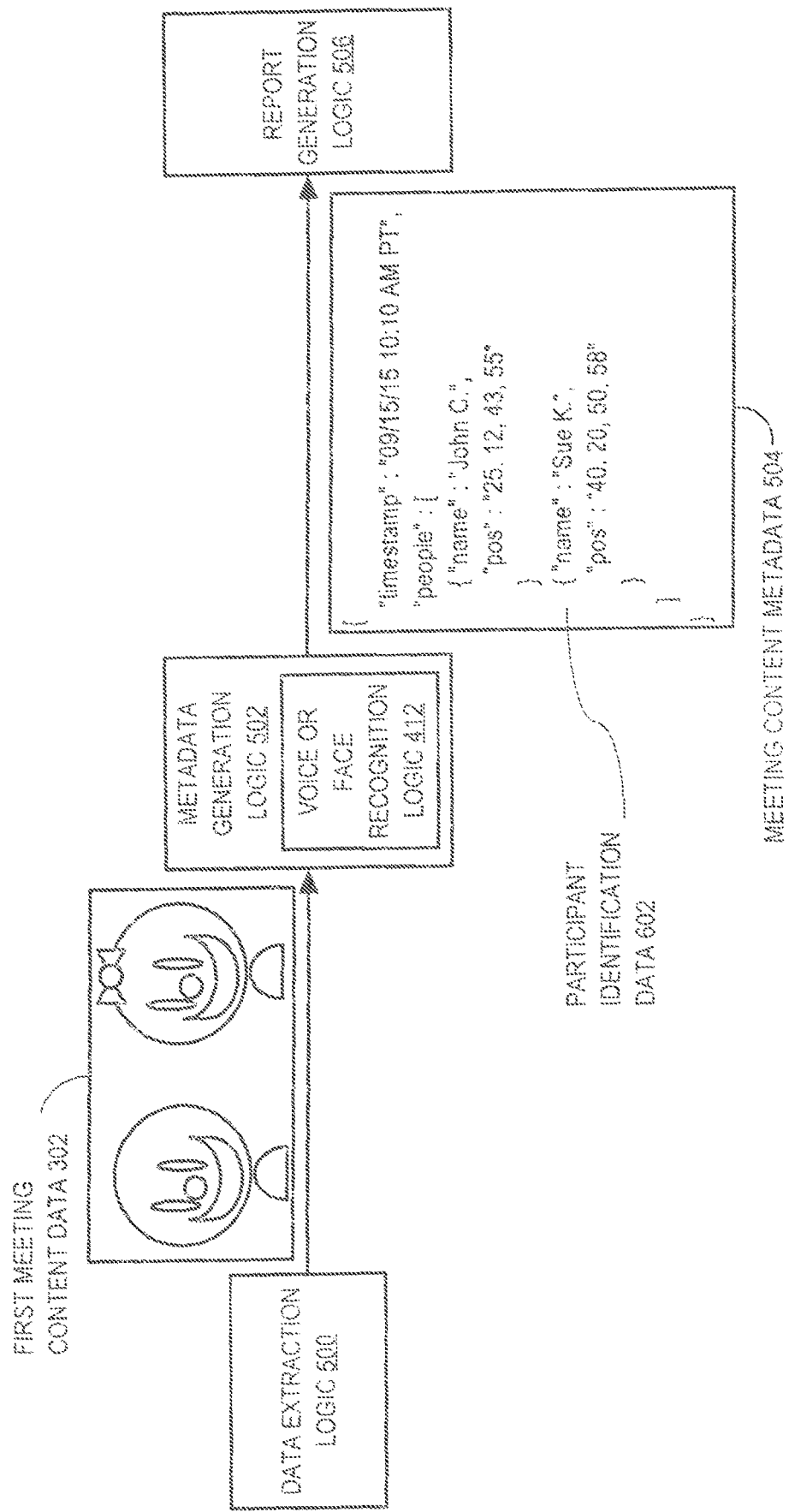

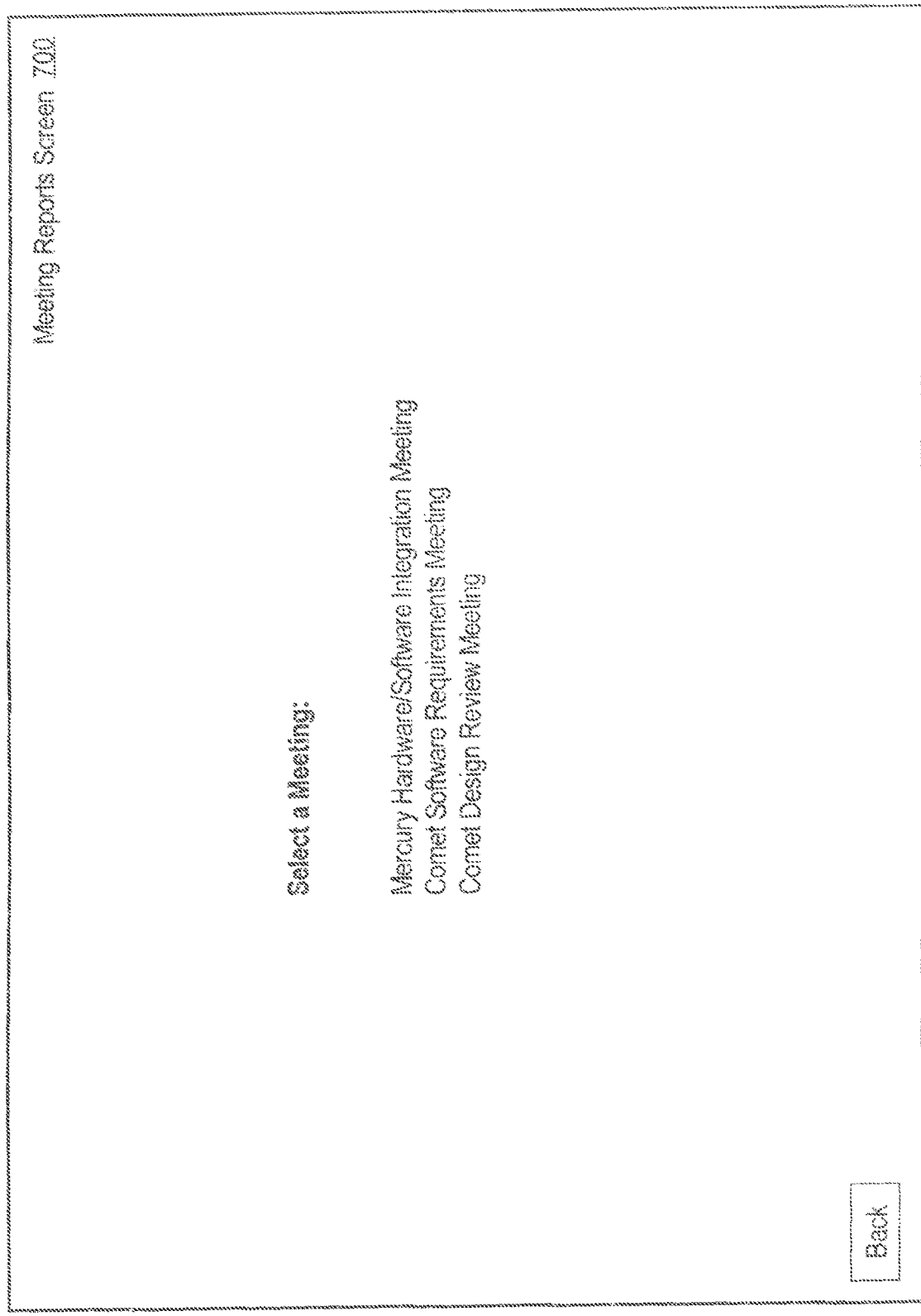

FIG. 7B

Meeting Results Screen 710

Agenda Items (percentage of time) 712

1 - 25%
2 - 75%

1: Create schedule by Tuesday
2: Get feedback from Marketing

Meeting Efficiency: 86    714

All Meetings   This Meeting

Low ———————————— High

Meeting Summary:
Meeting Name: Comet Design Review Meeting
Date: September 15, 2015   Time: 10:00 - 10:20 AM
Location: Campbell, CA
Attendees: John C., Sue K., Mike B.
Agenda: MA_091515.pdf Transcripts: [English]

Action Items:
1) Create schedule by Tuesday
2) Get feedback from marketing

Documents:
1) Whiteboard Notes
2) Draft Schedule

[Back]

FIG. 7C

Meeting Participant Profile for Sue K.

Select a Meeting:

+ Mercury Hardware/Software Integration Meeting
+ Comet Software Requirements Meeting
− Comet Design Review Meeting
   Date: September 15, 2015
   Total Participation Time: 00:12:38
     Agenda Item: "Create schedule by Tuesday": 00:09:21
     Agenda Item: "Get feedback from Marketing": 00:03:17
   Participation Index: 63/100
   Action Item Completion Rate: 1/2
   Role: Active Presenter
   Sentiments:
     Cheerful      89
     Confused     24
     Defensive     87
     Argumentative 84
     Pensive       48
     Confident     27

Participant Analysis Report 720

Aggregate Statistics for Sue K.: 722
  Number of Meetings: 12
  Participation Index: 48/100
  Action Item Completion Rate: 8/11
  Sentiment Scores: (0-100)
    Cheerful      98
    Confused     12
    Defensive     92
    Argumentative 89
    Pensive       50
    Confident     29

Aggregate Statistics for All Participants:
  By Participation Rate:
    James W.   99
    Lucy J.     92
    ⋮
    Sue K.      48
    David R.    21
    ⋮

By Action Item Completion Rate: 724
    Richard B.   98
    Sally R.     94
    ⋮
    Sue K.      73
    ⋮
    Arden U.    12

[ Back ]

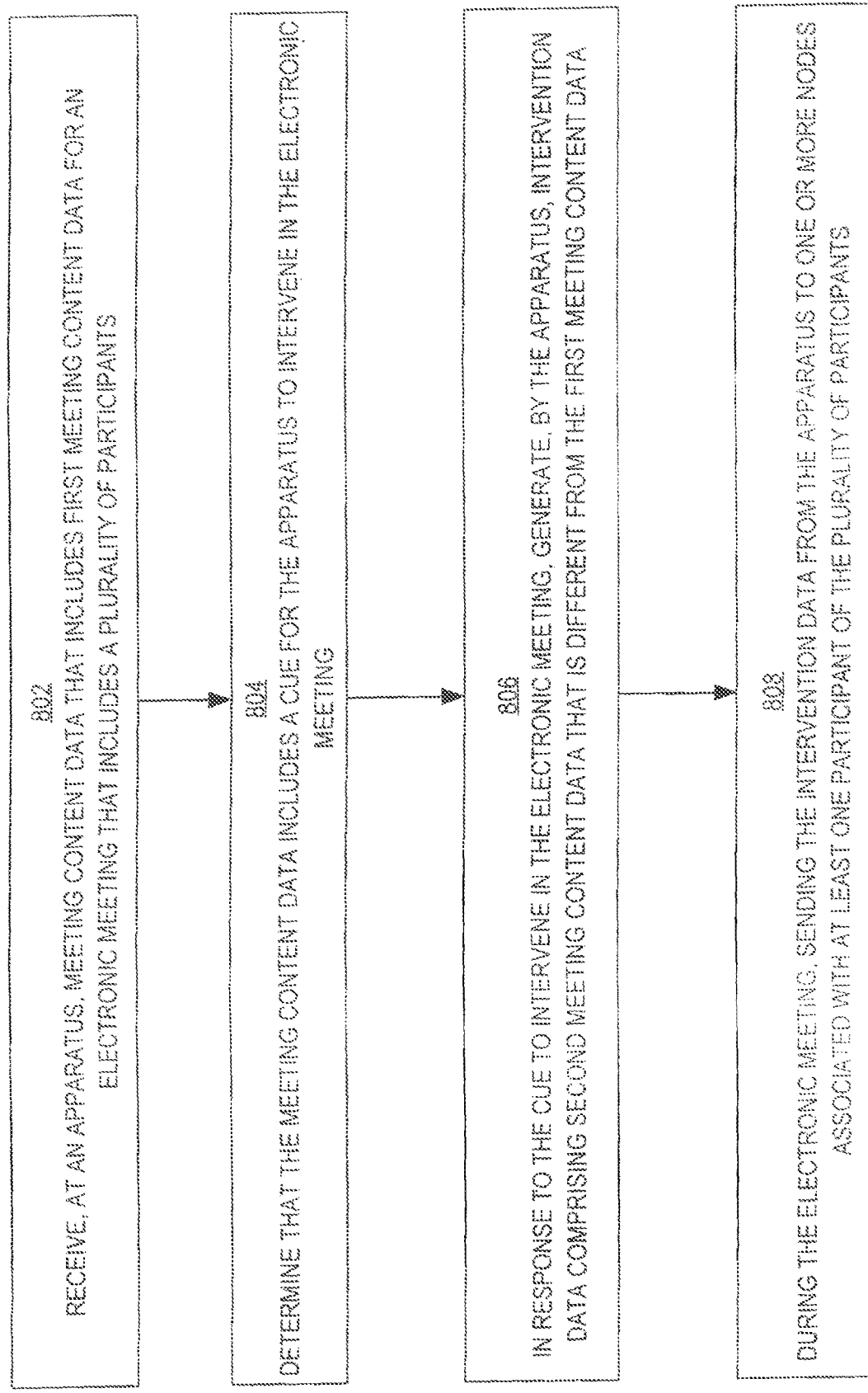

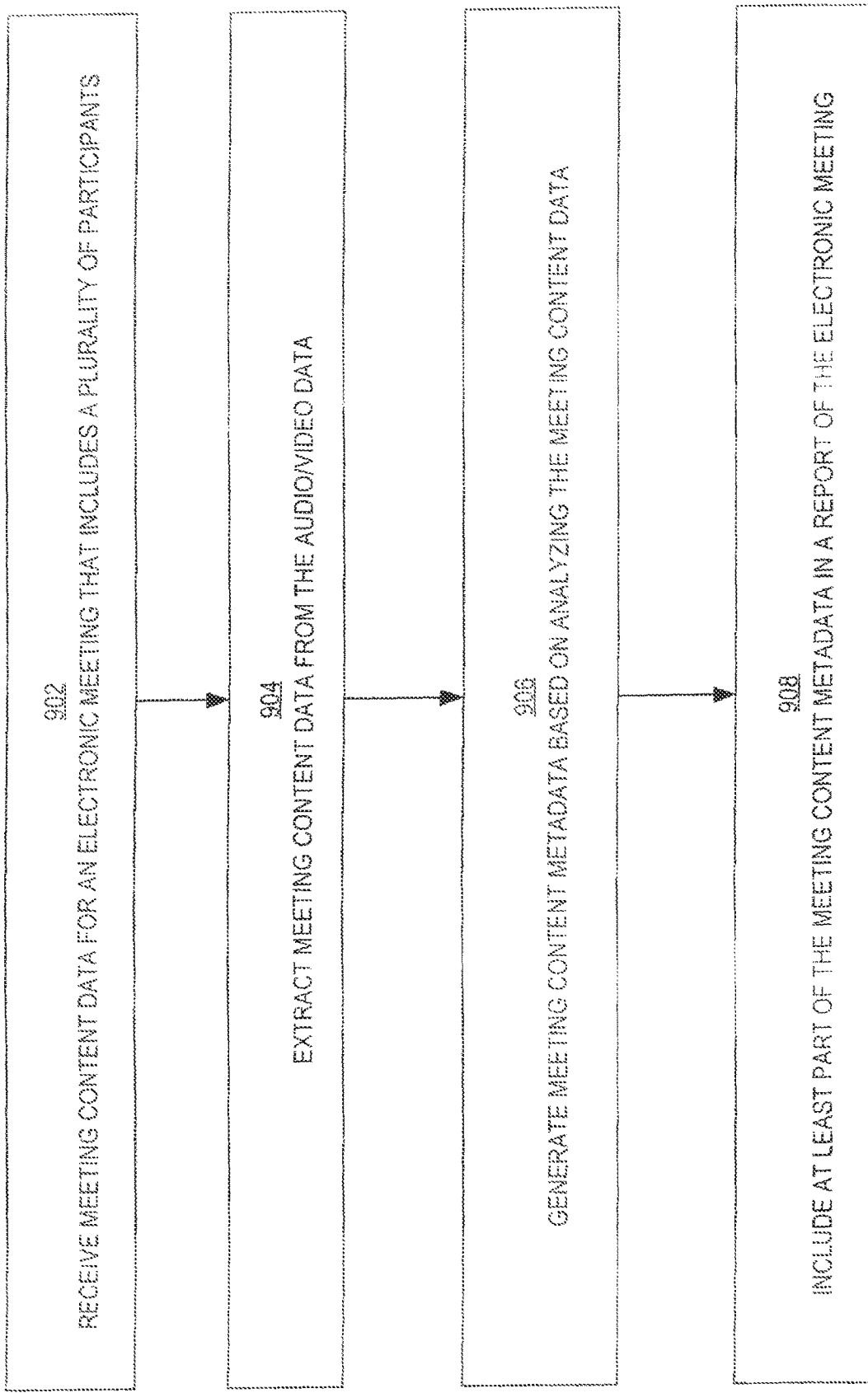

CREATING AGENDAS FOR ELECTRONIC MEETINGS USING ARTIFICIAL INTELLIGENCE

Related Application Data

This application is related to U.S. patent application Ser. No. 14/992,273 entitled "Electronic Meeting Intelligence", filed Jan. 11, 2016, and Ser. No. 14/992,278 entitled "Electronic Meeting Intelligence", filed Jan. 11, 2016, and U.S. patent application Ser. No. 15/290,855 entitled "Managing Electronic Meetings Using Artificial Intelligence and Meeting Rules Templates", filed Oct. 11, 2016, and U.S. patent application Ser. No. 15/290,858 entitled "Selecting Meeting Participants for Electronic Meetings Using Artificial Intelligence", filed Oct. 11, 2016, and U.S. patent application Ser. No. 15/290,860, entitled "Real-Time (Intra-Meeting) Processing Using Artificial Intelligence", filed Oct. 11, 2016, and U.S. patent application Ser. No. 15/290,861, entitled "Post-Meeting Processing Using Artificial Intelligence", filed Oct. 11, 2016, the contents all of which are incorporated by reference in their entirety for all purposes as if fully set forth herein.

FIELD

Embodiments relate to electronic meetings conducted over computing networks.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A meeting is typically an effective vehicle for coordinating the successful accomplishment of a common goal shared by multiple people. However, a meeting can also devolve into a counterproductive use of time in the absence of proper organization of the meeting itself. For example, too much time may be devoted to a particular topic that involves a small subset of meeting attendees, and this may result in wasted time for the remaining attendees. Such circumstances may be avoided through the use of a person serving as a meeting moderator, but personal biases may affect the neutrality of the person serving as the meeting moderator. Such circumstances may also be avoided through adequate preparation for the meeting, but it may be impossible to foresee all the possible issues that may arise during the meeting.

Another way for a meeting to result in wasted time is by failing to fully reap the benefits provided by the meeting. For example, transcribing the meeting, scheduling an additional meeting, analyzing meeting participation, and/or researching an issue that was contended during the meeting may be tedious follow-up actions that are neglected after the meeting. Even if the follow-up actions are performed, the process of performing them may be slow and cost-prohibitive.

Thus, it is desirable and beneficial to perform the administrative duties related to a meeting using an approach without the aforementioned shortcomings.

SUMMARY

An apparatus includes one or more processors and one or more non-transitory computer-readable media storing instructions which, when processed by the one or more processors cause an electronic meeting process executing on the apparatus to receive, over one or more communications networks from an artificial intelligence service executing external to the apparatus, a notification of a request for a new agenda item for an electronic meeting. The artificial intelligence service generated the notification in response to an analysis of audio/video data for the electronic meeting. The electronic meeting process executing on the apparatus receives, over the one or more communications networks from the artificial intelligence service, executing external to the apparatus, missing information for the new agenda item. The artificial intelligence service determined the missing information for the new agenda item by analyzing one or more other agenda items that are similar to the new agenda item. The electronic meeting process executing on the apparatus displays, on a user interface in association with the new agenda item, the missing information for the new agenda item. The approach may also be implemented by one or more non-transitory computer-readable media storing instructions which, when processed by one or more processors, causes the functionality to be performed. The approach may also be implemented by one or more computer-implemented methods.

BRIEF DESCRIPTION OF THE DRAWINGS

In the drawings:

FIGS. 1A-C depict example computer architectures upon which embodiments may be implemented.

FIG. 2A depicts an example electronic meeting screen displayed by an electronic meeting application at a node.

FIG. 2B depicts an example meeting rules templates screen displayed in response to a user selecting the "Meeting Rules Templates" option from options in FIG. 2A.

FIG. 2C depicts a meeting rules templates screen that displays the contents of the "Board of Directors" meeting rules template selected by a user from the meeting rules templates screen in FIG. 2B.

FIG. 2E depicts an electronic meeting management screen displayed by an electronic meeting application in response to a user selecting a control from meeting controls.

FIG. 2G depicts an electronic meeting management screen with a pop-up window that provides suggestions for missing meeting information, which in the present example is the missing meeting owner.

FIG. 2H depicts an agenda creation screen generated in response to a user selecting Meeting Agenda control from electronic meeting management screen.

FIG. 2I depicts suggested agenda items for each category of suggested agenda items depicted in FIG. 2H.

FIG. 2J depicts a participant selection screen generated in response to a user selecting Meeting Participants control from electronic meeting management screen.

FIG. 2K depicts a natural language query via query window of an electronic meeting screen that allows a user to enter a natural language query.

FIG. 4B is a block diagram that depicts an arrangement for performing sentiment analysis with respect to an ongoing discussion.

FIG. 4C is a block diagram that depicts an arrangement for retrieving requested information using natural language queries.

FIG. 4D is a block diagram that depicts an arrangement for supplementing meeting content with participant identification data.

FIG. 6A is a block diagram that depicts an arrangement for generating meeting content metadata that includes participant identification data.

FIG. 7A depicts an example meeting reports screen that provides access to meeting results data for a plurality of electronic meetings.

FIG. 7B depicts an example meeting results screen for the Comet Design Review Meeting.

FIG. 7C depicts an example participant analysis report.

FIG. 8 is a flow diagram that depicts an approach for generating intervention data.

FIG. 9 is a flow diagram that depicts an approach for generating a report.

Figure 2D:
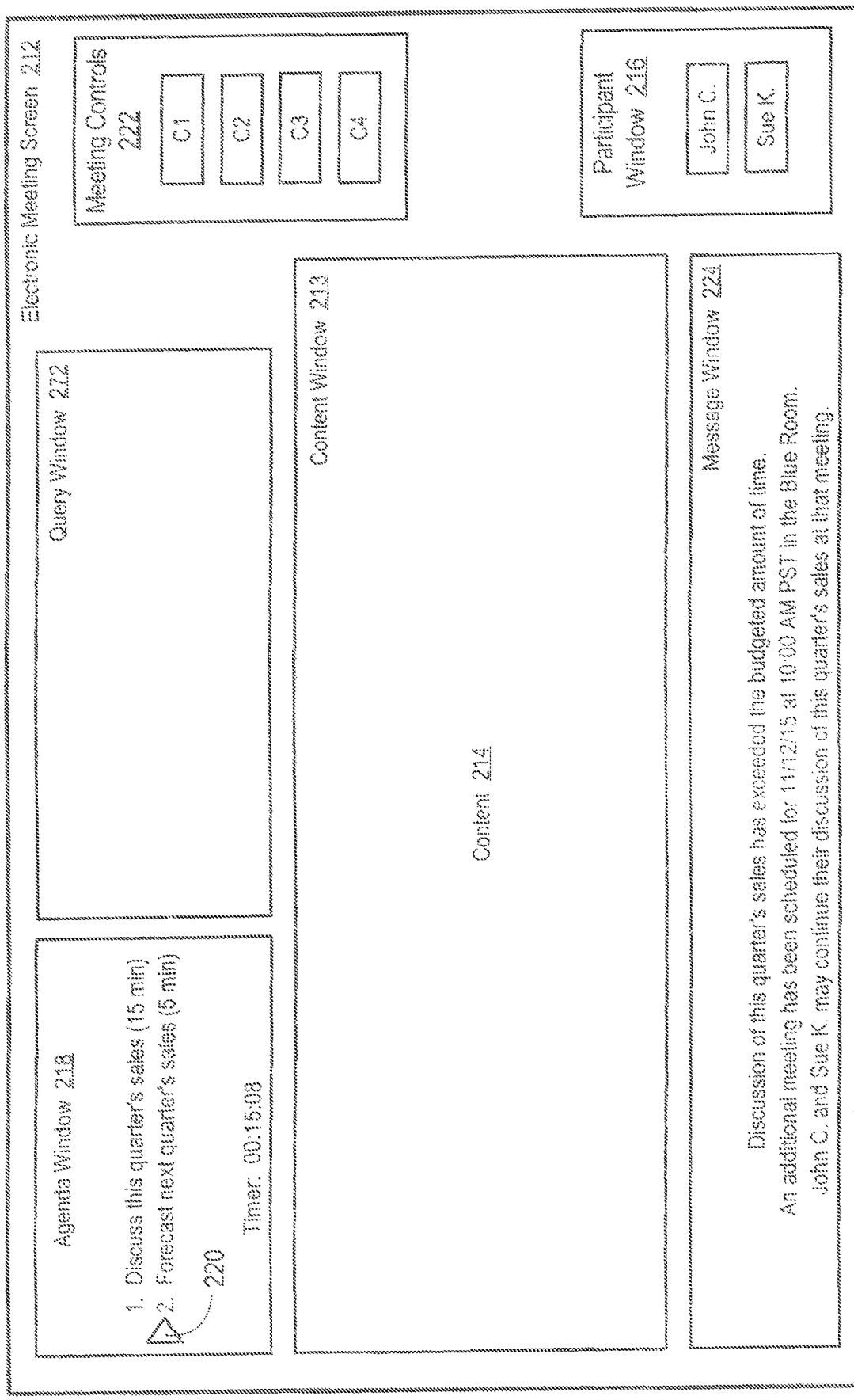
FIG. 2D depicts an electronic meeting screen displayed by an electronic meeting application in response to a user selecting the "Electronic Meetings" option from options in FIG. 2A.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" may be used to differentiate elements, but the modifiers do not necessarily indicate any particular order.

I. Overview
II. Architecture
   A. Meeting Intelligence Apparatus
   B. Network Infrastructure
   C. Participant Nodes
III. Meeting Rules Templates
IV. Electronic Meetings
   A. Meeting Creation
   B. Meeting Agenda Creation
   C. Meeting Participant Selection
      i. Suggested Meeting Participants
      ii. Subject Matter Experts (SMEs)
      iii. Meeting Rules Templates
      iv. Relevance Scores
      v. Additional information
V. Real-Time Processing
   A. Meeting Management
      i. Agenda Management
      ii. Points of Agreement, Action Items and New Meeting Requests
      iii. Sentiment Analysis
   B. Information Retrieval
   C. Meeting Content Supplementation
   D. Meeting Content Metadata Generation
VI. Post-Meeting Processing
   A. Meeting Content Analysis
   B. Meeting Results
   C. Participant Analysis
   D. Action Item Management
VII. Process Overview
   A. Generating Intervention Data
   B. Generating Reports
VIII. Implementation Examples I. Overview Artificial intelligence is introduced into an electronic meeting context to perform various tasks before, during, and/or after electronic meetings. The tasks may include a wide variety of tasks, such as agenda creation, participant selection, real-time meeting management, meeting content supplementation, and post-meeting processing. The artificial intelligence may analyze a wide variety of data such as data pertaining to other electronic meetings, data pertaining to organizations and users, and other general information pertaining to any topic. Capability is also provided to create, manage, and enforce meeting rules templates that specify requirements and constraints for various aspects of electronic meetings. The approaches described herein improve the efficiency of electronic meetings, enforce electronic meeting rules and policies, allow decisions to be made more quickly, and provide higher confidence in the usefulness of electronic meetings.

II. Architecture

FIGS. 1A-C depict example computer architectures upon which embodiments may be implemented. FIGS. 1A-C include various examples of an arrangement 100 that supports electronic meetings. Arrangement 100 includes a meeting intelligence apparatus 102 and one or more nodes 104A-N, communicatively coupled via network infrastructure 106. Nodes 104A-N are associated with a plurality of electronic meeting participants 108A-N, also referred to herein as "participants." Some elements depicted in FIG. 1A are not depicted in other figures for purposes of explanation, but these elements may be included in the elements of the other figures.

Electronic meetings supported by arrangement 100 may be any type of electronic meetings conducted in any form using any computing platform. Examples of electronic meetings include, without limitation, audioconferencing sessions, videoconferencing sessions, desktop sharing sessions, any combination of the foregoing, and/or any other electronic meetings involving the sharing of data between network infrastructure 106 and at least one node 104A. Participants 108A-N may be located in physically-disparate locations or co-located in the same physical location. For example, FIGS. 1A-B depict arrangement 100 in which participants 108A-N are located in different physical locations, yet participant in an electronic meeting via network infrastructure 106. FIG. 1C depicts arrangement 100 in which participants 108A-N are located in physical proximity to each other such that they may communicate with each other without network infrastructure 106. However, network infrastructure 106 may enable participants 108A-N to interact with meeting intelligence apparatus 102, which receives input data from and/or sends output data to node 104A. Embodiments are also applicable to electronic meetings in which some participants 108A-N are in physically-disparate locations and some are co-located at the same physical location.

In an embodiment, arrangement 100 involves a network of computers. A "computer" may be one or more physical computers, virtual computers, and/or computing devices. A computer may be a client and/or a server. Any reference to "a computer" herein may mean one or more computers, unless expressly stated otherwise. Each of the logical and/or functional units depicted in any of the figures or described herein may be implemented using any of the techniques further described herein in connection with FIG. 10.

A. Meeting Intelligence Apparatus

In an embodiment, meeting intelligence apparatus 102 is implemented by one or more computing devices configured with artificial intelligence. The one or more computing devices may be special-purpose computing devices dedicated to providing artificial intelligence to electronic meetings, or generic computing devices executing one or more artificial intelligence services, such as artificial intelligence service 110 (FIG. 1A), which provide artificial intelligence to electronic meetings. Thus, meeting intelligence apparatus 102 may be implemented using any combination of computer hardware, computer software, and/or computer firmware. Examples of artificial intelligence service 110 include, without limitation, IBM Watson and other question answering (QA) systems/services. Meeting intelligence apparatus 102 may always be available (e.g., involve continuously running processes) or may be available on demand (e.g., be powered on when needed). Meeting intelligence apparatus 102 may be replicated over multiple computing devices such that at any point in time, at least one computing device can provide meeting intelligence services.

Meeting intelligence apparatus 102 may access meeting content data as if it were a node associated with a participant in an electronic meeting. Thus, meeting intelligence apparatus 102 may access any meeting content data that is transmitted from any of the one or more nodes 104A-N involved in an electronic meeting. For example, meeting intelligence apparatus 102 may monitor, collect, and/or analyze all data transmissions during an electronic meeting. Meeting intelligence apparatus 102 may analyze meeting content data using any of a number of tools, such as speech or text recognition, voice or face identification, sentiment analysis, object detection, gestural analysis, thermal imaging, etc. Based on analyzing the meeting content data and/or in response to requests, for example, from electronic meeting applications, meeting intelligence apparatus 102, either alone or in combination with one or more electronic meeting applications, performs any of a number of automated tasks, including performing one or more actions with respect to an electronic meeting, such as creating an electronic meeting, providing a translation, responding to an information request, determining suggested agenda items and suggested meeting participants, performing various types of real-time processing with respect to an electronic meeting, such as managing the flow of an electronic meeting, processing agenda items, creating actions items, etc., and various post-meeting processing, such as generating a report, etc.

Meeting intelligence apparatus 102 may be located at a number of different locations relative to network infrastructure 106. Referring to FIGS. 1A and 1C, meeting intelligence apparatus 102 is located outside network infrastructure 106. Referring to FIG. 1B, meeting intelligence apparatus 102 is collocated with at least some of network infrastructure 106. Artificial intelligence service 110 may include one or more application program interfaces (APIs) that may be used by electronic meeting applications to access functionality provided by artificial intelligence service 110.

In an embodiment, meeting intelligence apparatus 102 is communicatively coupled to a meeting data repository (not depicted). The meeting data repository may be part of meeting intelligence apparatus 102, or may be located separate from meeting intelligence apparatus 102. The meeting data repository may be a database, data structure, a configuration file, and/or any other system that stores data related to one or more electronic meetings. Like meeting intelligence apparatus 102, the meeting data repository may be located at different locations relative to network infrastructure 106, for example, on one or more computing devices internal or external to network infrastructure 106. The meeting data repository stores data pertaining to any number of electronic meetings, and may include data for prior electronic meetings, current electronic meetings, and future electronic meetings. Examples of data for prior, current and future electronic meetings include, without limitation, meeting agendas, meeting participant information, meeting invitation information, meeting transcripts, minutes and notes, action items, etc., as well as results data that includes the results of analyzing any of the foregoing types of data. Meeting data may be collected and stored by meeting intelligence apparatus 102, nodes 104A-N, or both. This allows meeting intelligence apparatus 102 to provide the services of a librarian for meeting-related data, as well as the other functionality described herein. Electronic meeting data may also be generated, stored and managed by other entities, such as other processes.

In an embodiment, meeting intelligence apparatus 102 is communicatively coupled to any of a number of external data sources (not shown), such as websites, other data available via the World Wide Web, databases managed by Salesforce, Oracle, SAP, Workday, or any entity other than the entity managing meeting intelligence apparatus 102. Meeting intelligence apparatus 102 may be communicatively coupled to the external data sources via network infrastructure 106. The external data sources may provide meeting intelligence apparatus 102 with access to any of a variety of data, meeting-related or otherwise.

B. Network Infrastructure

Network infrastructure 106 may include any number and type of wired or wireless networks, such as local area networks (LANs), wide area networks (WANs), the Internet, etc. Network infrastructure 106 may also include one or more computing devices, such as one or more server computers, load-balancing computers, cloud-based computers, data centers, storage devices, and/or any other special-purpose computing devices. For example, network infrastructure 106 may include a Unified Communication System (UCS) Service Platform by Ricoh Company Ltd., and/or any other computer(s) that manage(s) electronic meetings.

C. Participant Nodes

Each node of the one or more nodes 104A-N is associated with one or more participants 108A-N. Each participant is a person who participates in an electronic meeting. Each node processes data transmission between network infrastructure 106 and at least one participant. Multiple nodes 104A-N may be communicatively coupled with each other using any of a number of different configurations. For example, multiple nodes may be communicatively coupled with each other via a centralized server or via a peer-to-peer network.

In an embodiment, a node includes a computing device that executes an electronic meeting application 112. As used herein, the term "application" refers to any type of process. The node may include a special-purpose computing, such as Ricoh UCS P3500, or a general-purpose computer that executes a special-purpose application, such as Ricoh UCS App. The node may also include any of a number of input/output mechanisms, such as a camera, a microphone, and an electronic whiteboard. For example, the node may include a smartphone with GPS capability, a camera, a microphone, an accelerometer, a touchscreen, etc. Example implementations of a node include, without limitation, a desktop computer, a laptop computer, a workstation, a tablet computing device, a personal digital assistant, an interactive whiteboard (IWB) appliance, a mobile phone, or other mobile computing device. The input/output mechanisms may include a participant interface, such as a graphical user interface (GUI). Electronic meeting applications may create and manage data that supports electronic meetings, and the data may be stored locally on nodes 104A-N, or remotely, depending upon a particular implementation. Electronic meeting application 112 is implemented by one or more processes that allow a corresponding node to participate in electronic meetings. Electronic meeting application 112 is configured to interact with one or more other electronic meeting applications on other computing devices and/or one or more electronic meeting managers or servers to participate in electronic meetings. Electronic meeting application 112 is also configured to access functionality provided by artificial intelligence service 110, via one or more APIs provided by artificial intelligence service 110, to incorporate artificial intelligence into various aspects of electronic meetings, as described in more detail hereinafter.

III. Meeting Rules Templates

According to one embodiment, functionality is provided to create and manage meeting rules templates for electronic meetings. A meeting rules template specifies a set of rules to be applied to any aspect of an electronic meeting, i.e., before, during, and after an electronic meeting. As used herein, the term "rule" refers to a requirement and/or a constraint. For example, a meeting rules template may define items that are required to be included on an agenda, participants that are required in an electronic meeting, that a decision maker must be designated, one or more aspects of how an electronic meeting is conducted, e.g., via time limits, etc., procedural rules that govern an electronic meeting, and items to be included in meeting results. Meeting rules templates may also specify data inputs for an electronic meeting, such as data streams, electronic documents, etc. Meeting rules template functionality may be implemented, for example, by an electronic meeting application executing on a node 104A-N.

Meeting rules may be specified by an organization, e.g., via bylaws, or by entities external to organizations, such as governmental, judicial or law enforcement entities. One non-limiting example is organizational rules or bylaws that require at least a specified number of participants attend an electronic meeting to satisfy a quorum requirement for voting purposes. The participants may include regular members, board members, voting members, etc. Another example is a time constraint (minimum or maximum) for discussion of a particular agenda item. Yet another example is a requirement that documentation for an electronic meeting, such as meeting minutes, include specified information, such as start and end times, the names of board members in attendance, decisions that were made on action items, etc. Requirements and constraints may also specify that a particular meeting procedure be used to conduct an electronic meeting. One non-limiting example of a meeting procedure is Roberts Rules of Order.

As described in more detail hereinafter, according to one embodiment, an electronic meeting application allows a user to designate one or more meeting rules templates for an electronic meeting. The electronic meeting application, in conjunction with meeting intelligence apparatus 102, enforces the rules specified by the designated meeting rules templates before, during, and after electronic meetings. This may include, for example, ensuring that an agenda for an electronic meeting contains required items, that required participants are included in an electronic meeting, that required data inputs are provided, that the electronic meeting is conducted in accordance with the requirements and constraints, and that meeting results satisfy the requirements and constraints specified by a meeting rules template.

FIG. 2A depicts an example electronic meeting screen 200 displayed by an electronic meeting application at a node. Electronic meeting screen 200 includes controls 202 for accessing meeting rules templates, electronic meetings, meeting reports and action items. Electronic meeting screen 200 may represent an initial meeting screen that is displayed after an electronic meeting application is invoked on a node 104A-N.

FIG. 2B depicts an example meeting rules templates screen 204 displayed in response to a user selecting the "Meeting Rules Templates" option from controls 202 in FIG. 2A. Meeting rules templates screen 204 allows a user to view, edit and delete existing meeting rules templates, and create new meeting rules templates. Meeting rules templates screen 204 depicts existing meeting rules templates displayed by department, within a business organization, and by topic. In the example depicted in FIG. 2B, the departments include Legal, Engineering, Software Quality Assurance (SQA), Finance and Management, with one or more identified meeting rules templates for each department. The particular departments included in FIG. 2B are provided for explanation purposes, and the organization of meeting rules templates may vary depending upon a particular implementation. For example, meeting rules templates may be organized and displayed by any type of logical entity.

In the example depicted in FIG. 2B, a user may select an existing meeting rules template and then edit or delete the selected meeting rules template by selecting an "Edit" control or a "Delete" control, respectively, from controls 206. According to one embodiment, permissions may be used to control which users have the authority to edit or delete a meeting rules template. For example, permissions data may be maintained for meeting rules templates, where the permissions data specifies users who are authorized to edit and delete particular meeting rules templates. This may be useful for meeting rules templates, such as the "Board of Directors" meeting rules template that may contain sensitive information. A user may also create a new meeting rules template by selecting a "New" control from controls 206. According to one embodiment, an electronic meeting application may include a wizard that provides step-by-step assistance for users to create new meeting rules templates. This may include, for example, providing commonly-used rules with controls that allow a user to select and de-select individual rules, as well as add custom rules. A "Back" control allows a user to return to the electronic meeting screen 200 of FIG. 2B. A search tool 208 is also provided to allow a user to search for existing rules templates, for example, by keyword.

FIG. 2C depicts meeting rules templates screen 204 that displays the "Board of Directors" meeting rules template for the "Management" department selected by a user from the meeting rules templates screen 204 in FIG. 2B. The Board of Directors meeting rules template specifies rules that must be satisfied before, during, and after Board of Directors meetings. These rules specify that a Board of Directors meeting may have a maximum number of 10 meeting participants, a minimum number of four board members are required, a designated decision maker is required, certain agenda items are required, including a financial review, short term strategic planning, and long term strategic planning, and a maximum amount of time of 15 minutes may be spent on each agenda item. The rules also specify that Board of Directors meetings must be conducted in accordance with Roberts Rules of Order and meeting minutes must be generated that include a start and end time of the meeting, a list of the Board members in attendance, and the results of votes on all motions. The rules further specify that Board of Directors meetings must include as data inputs, Q4 Financials and a Sales Projection Report. The particular data inputs may vary, depending upon the requirements of a particular meeting.

The meeting rules depicted in FIG. 2C are provided for explanation purposes, and meeting rules may vary, depending upon a particular implementation. Controls 210 allow a user to add, edit or delete rules, save rules, or return to the meeting rules templates screen 204 of FIG. 2B by selecting the "Back" option.

Meeting rules may be manually created by users, for example, by an administrator or end user. According to one embodiment, meeting rules may be created with the assistance of meeting intelligence apparatus 102. For example, when creating a new rule, via the "Add" control from controls 210, the meeting rules templates screen 204 may provide an option that allows a user to enter query terms for a particular type of meeting for which the user is interested in defining meeting rules. Meeting intelligence apparatus 102 processes the query terms and presents results that include example meeting rules that may be appropriate for the particular type of meeting. The example meeting rules may be obtained, for example, based upon industry-specific practices, or "best practices." For example, the widely-accepted "best practices" for a particular type of engineering meeting may include a small number of participants, e.g., less than five, and that input from all meeting participants is required.

IV. Electronic Meetings

According to one embodiment, an electronic meeting application executing on a node 104A-N includes functionality that allows user to manage electronic meetings. FIG. 2D depicts an electronic meeting screen 212 displayed by an electronic meeting application in response to a user selecting the "Electronic Meetings" option from controls 202 in FIG. 2A. Electronic meeting screen 212 may be implemented, for example, by one or more Web pages which, when processed on a computing device, cause electronic meeting screen 212 to be displayed on the computing device.

Electronic meeting screen 212 includes a content window 213 that includes content 214 for a current electronic meeting, which may represent a videoconferencing session, a desktop sharing session, a messaging session, an audio conferencing session, etc. Electronic meeting screen 212 also includes a participant window 216 that identifies participants of the current electronic meeting, and an agenda window 218 that displays an agenda for the current electronic meeting. Agenda window 218 includes a visual indicator 220 that identifies a current agenda item and a timer that indicates the time remaining for the current agenda item. The management of agenda items using meeting intelligence apparatus 102 is discussed in more detail hereinafter. Electronic meeting screen 212 also includes meeting controls 222 that provide access to various functionality with respect to the current electronic meeting. As described in more detail hereinafter, this includes functionality pertaining to electronic meeting management, content, agendas, and participants. A message window 224 provides messages generated with the assistance of meeting intelligence apparatus, which is also described in more detail hereinafter. Electronic meeting screen 212 may include additional elements or fewer elements depending upon a particular implementation, and embodiments are not limited to the example depicted in FIG. 2D.

FIG. 2E depicts an electronic meeting management screen 230 displayed by an electronic meeting application in response to a user selecting a control from meeting controls 222. Electronic meeting management screen 230 includes an existing meeting portion 232 that displays information and provides controls to view and join existing electronic meetings, and a new meeting portion 234 that includes controls that allow a user to create a new electronic meeting. According to one embodiment, permissions may be used to control the ability for users to view and/or join an electronic meeting. Permissions may be implemented in a wide variety of ways that may vary depending upon a particular implementation. For example, in response to a user selecting the "Join" option for a particular electronic meeting via existing meeting portion 232, a request to join the particular electronic meeting may be generated and transmitted to the organizer of the electronic meeting. In response to the meeting organizer approving the request, the user is may be notified that their request has been granted and the user is allowed to join the particular electronic meeting. As an alternative, this process may be automated based upon a user's permissions. For example, the permissions of the user requesting to join the particular meeting are compared to permissions specified for the particular electronic meeting and the user is allowed to join the particular electronic meeting if the user has the necessary permissions. The use of permissions in the foregoing examples is helpful for controlling access to electronic meetings that may include sensitive or confidential information. Electronic meeting management screen 230 includes a "Back" control to return to electronic meeting screen 200.

In the example depicted in FIG. 2E, existing meetings portion 232 depicts existing electronic meetings for logical entities within a business organization that include a Pluto Project, a Legal Department, a Finance Department, and Management, with corresponding controls to view or join any of these electronic meetings. Embodiments are not limited to these example logical entities, and any type of logical entities may be used. A user may select the view control to view information for a particular existing electronic meeting.

Figure 2F:
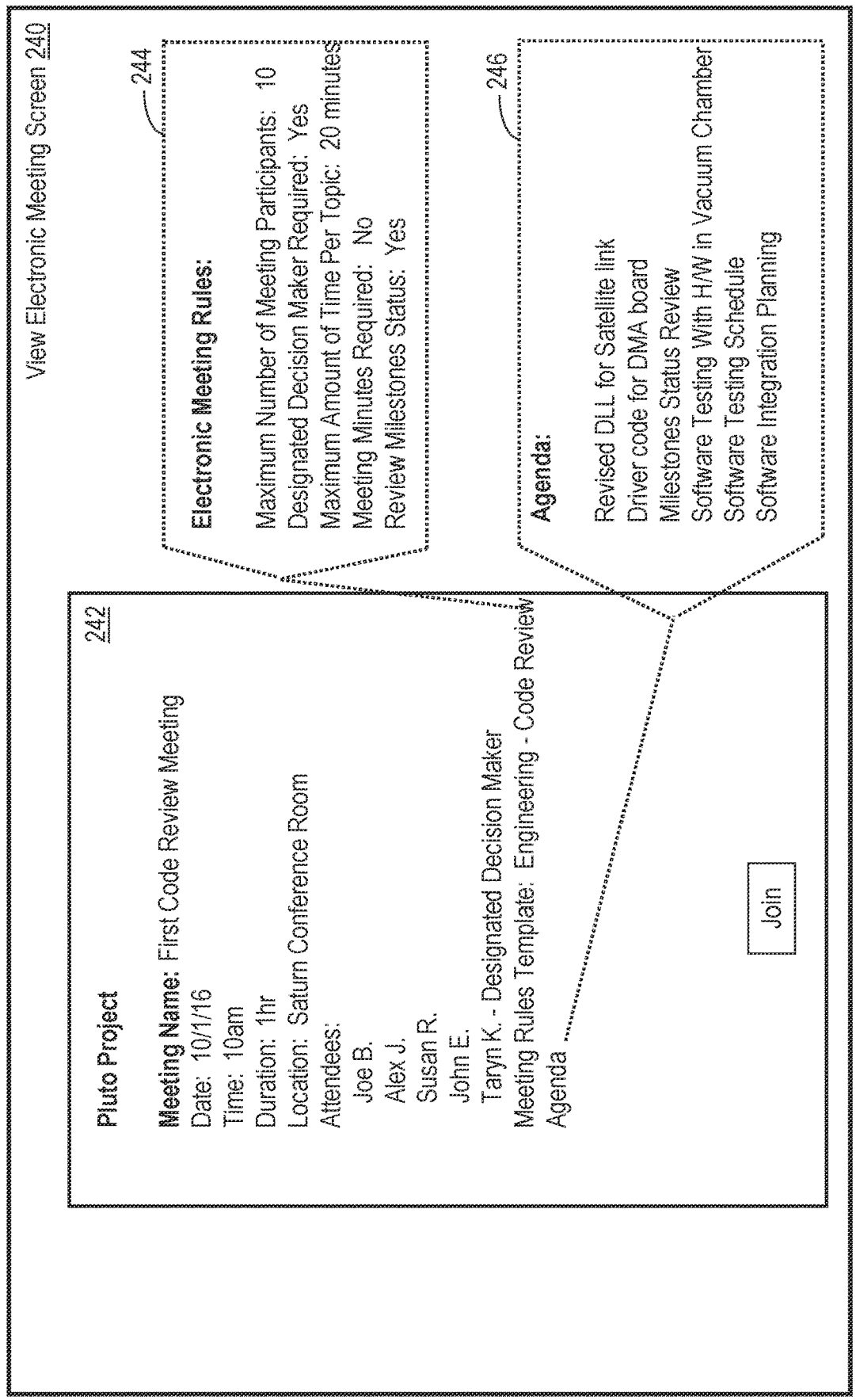
FIG. 2F depicts a view electronic meeting screen displayed in response to a user selecting the "View" option for the Code Review Meeting for the Pluto Project displayed in existing meetings portion.

FIG. 2F depicts a view electronic meeting screen 240 displayed in response to a user selecting the "View" option for the Code Review Meeting for the Pluto Project displayed in existing meetings portion 232. In the example depicted in FIG. 2F, view electronic meeting screen 240 displays information 242 for the Code Review Meeting for the Pluto Project, including date, time duration, location and attendees. The information 242 also includes electronic meeting rules 244 and an agenda 246. As described in more detail hereinafter, electronic meeting rules 244 and agenda 246 may be generated with the assistance of artificial intelligence provided by meeting intelligence apparatus 102. In the example depicted in FIG. 2F, electronic meeting rules 244 are defined by a particular meeting rules template, namely, the Engineering—Code Review meeting rules template depicted in FIG. 2B. This meeting rules template specifies a maximum number of 10 participants, that the meeting must include a designated decision maker, a maximum of 20 minutes may be spent on each topic, and no meeting minutes are required.

Agenda 246 specifies topics to be addressed during the electronic meeting and includes a revised dynamic linked library (DLL) for the satellite link, driver code for the direct memory access (DMA) board, a milestone status review, software testing with hardware (h/w) in the vacuum chamber, the software testing schedule, and software integration planning. A user who has the necessary permissions, such as the owner or host of the Code Review Meeting for the Pluto Project, may edit the information 242 for the electronic meeting. For example, a user may select the "Duration" attribute and change the value from 1 hour to 45 minutes. Information 242 also includes a control that allows a user to join the electronic meeting. Selecting the "Join" option, either from view electronic meeting screen 240, or the electronic meeting management screen 230 (FIG. 2E), causes a request for the user to join the meeting to be sent to the meeting owner for processing.

A. Meeting Creation

Electronic meetings may be created manually by users, or may be created with the assistance of artificial intelligence provided by meeting intelligence apparatus 102. Returning to FIG. 2E, new meeting portion 234 includes controls that allow a user to specify, for a new electronic meeting, a meeting name, a meeting owner, a meeting subject, and a meeting type. The controls also allow a user to select one or more meeting rules templates, a date and time, and a location for the new electronic meeting. The location may correspond to the physical location of a computing device of the electronic meeting owner or host. A single meeting rules template is depicted in FIG. 2E for purposes of explanation, but electronic meetings may have any number of corresponding meeting rules templates. Embodiments are not limited to the information depicted in FIG. 2E, and new meeting portion 234 may allow a user to specify other information for new electronic meetings, depending upon a particular implementation.

According to one embodiment, missing information for new meetings may be provided by meeting intelligence apparatus 102 based upon an analysis of various types of data. In the example depicted in FIG. 2E, a meeting owner was not specified. Meeting intelligence apparatus 102 may determine, based upon an analysis of prior meetings for the Pluto project, such as a first code review meeting, that Bob. H is a good candidate to be the meeting owner of the second code review meeting, and the meeting owner field may be automatically populated with Bob H. Other information may be considered in making the determination, such as other types of meetings for the same project, code review meetings for other projects, assigned responsibilities of project members, etc.

Missing information for a new meeting may be provided or indicated to the electronic meeting application executing on node 104A-N and automatically included in new meeting information. Missing information may be presented in a manner to visually indicate that the information was automatically provided, for example, via highlighting, coloring, special effects, etc., and a user may be given an opportunity to accept, reject, or edit the missing information that was automatically provided. Meeting intelligence apparatus 102 may also provide multiple candidates for missing information.

In the prior example, meeting intelligence apparatus 102 may determine that both Bob H. and another person Susan G. are good candidates to be the meeting owner of the second code review meeting. The two candidates may be presented as suggestions for designation as the meeting owner, and a user given an opportunity to select one, both, or none of the choices, unless the electronic meeting application does not allow multiple meeting owners, in which case only one of Bob H. and Susan G. may be selected as the meeting owner. Suggestions may be presented in ranked order, based upon a confidence score, and the confidence score for each choice may be displayed to provide additional information to the user making the selection.

FIG. 2G depicts electronic meeting management screen 230 with a pop-up window 239 that provides suggestions for missing meeting information, which in the present example is the missing meeting owner. In this example it is presumed that the creator of the new electronic meeting did not specify a meeting owner. The suggestions for the meeting owner are determined by the electronic meeting application in conjunction with meeting intelligence apparatus 102. In this example, the suggested meeting owners Bob H. and Susan G. are displayed in pop-up window 239, and controls are provided to accept or reject one or both of the suggested meeting owners, along with controls for saving the information for the new electronic meeting, or canceling and not saving the information. A confidence score generated by meeting intelligence apparatus 102 is optionally displayed for each suggestion. The confidence score represents a likelihood that the corresponding suggestion will be selected by the user.

Additional information is optionally provided with the suggestions to aid the user in making a selection of one, both or none of the suggested meeting owners. The additional information may be information that meeting intelligence apparatus 102 considered in making the suggestions, or may be other information that is deemed likely to be helpful to users in considering the suggested missing information, i.e., the missing meeting owner in the present example. As depicted in FIG. 2G, the additional information for Bob H. indicates that Bob H. was the owner of prior code review meetings for the Pluto project, making him a candidate for the meeting owner. Susan G. is a member of the Pluto project team and was the owner of code review meetings for other projects, which combined makes Susan G. a candidate for the meeting owner of the second code review meeting for the Pluto project. This example illustrates how cognitive computing may be useful in providing suggestions for missing information for a new electronic meeting. This approach may be applied to any missing information, depending upon a particular implementation.

Electronic meetings may also be automatically created during electronic meetings by an electronic meeting application executing on a node, in conjunction with meeting intelligence apparatus 102. According to one embodiment, meeting intelligence apparatus 102 detects, during an electronic meeting, one or more cues that indicate that a new meeting should be created. For example, meeting intelligence apparatus 102 may detect, in meeting content data, an explicit command, such as a natural language request, from a meeting participant to create a new meeting. Meeting intelligence apparatus 102 may be configured to recognize particular commands and formats, e.g., "SystemOne: create new meeting."

Meeting intelligence apparatus 102 may also be configured to create new meetings based upon implicit commands. Implicit commands or requests are statements made during an electronic meeting that indicate a desire for a new meeting, even though the statements may not include an explicit specified command or request for a new meeting. For example, meeting intelligence apparatus 102 may detect, in meeting content data, statements made as part of a conversation to indicate that another meeting may be useful in discussing a particular topic. Examples of such statements include "It would be good to discuss this in a separate meeting" and "Let's setup another meeting to discuss this further." These statements can be characterized as representing an implied request for a new electronic meeting. Cognitive computing functionality provided by meeting intelligence apparatus 102 may be used to analyze statements made during an electronic meeting to determine whether an implicit command or request for a new electronic meeting has been made during an electronic meeting. Meeting intelligence apparatus 102 may then inform the electronic meeting application that a new electronic meeting should be created, as described in more detail hereinafter.

Meeting intelligence apparatus 102 may be further configured to create a new electronic meeting based upon sentiment analysis of a current electronic meeting that indicates that a new meeting may be appropriate or helpful in a particular situation. For example, sentiment analysis of a current electronic meeting may indicate that significant disagreement and/or hostility exists between participants in a meeting. Sentiment analysis may use various cues that occur in speech during an electronic meeting, such as tone of voice, volume of voice, velocity of speech, lack of pauses in speech, profanity, sounds such as grunts, exhalation of air, etc. The use of sentiment analysis is described in more detail hereinafter.

In response to determining that a new meeting is appropriate, based upon an explicit command, an implicit command, or sentiment analysis, meeting intelligence apparatus 102 may directly instruct an electronic meeting application to request a new meeting, or include an instruction or request in meeting content data or meeting metadata that is provided to the electronic meeting application. In response to receiving an instruction or request, the electronic meeting application may provide a visual and/or audible notification to indicate a new meeting request. The electronic meeting application may display information for the new electronic meeting determined from information in the current electronic meeting. For example, the electronic meeting application, in conjunction with meeting intelligence apparatus 102, may determine information for the new electronic meeting based upon information in the current electronic meeting. For example, a statement may be made during the current electronic meeting, "We should have a separate meeting for this next Tuesday," and a proposed date and time would be included with the information for the new electronic meeting. The electronic meeting application may, in conjunction with meeting intelligence apparatus 102, query a user for additional information about the new electronic meeting, for example, information that is deemed to be missing for the new electronic meeting.

B. Meeting Agenda Creation

Electronic meeting agendas may be created manually by users and may be created with the assistance of artificial intelligence provided by meeting intelligence apparatus 102. According to one embodiment, meeting intelligence apparatus 102 participates in the creation of electronic meeting agendas by providing suggested items to be included on an electronic meeting agenda. The electronic meeting application may request that meeting intelligence apparatus 102 provide suggested agenda items for an electronic meeting. The request for suggested agenda items may include data that specifies a plurality of attributes of the new electronic meeting. For example, a request for suggested agenda items may include any of the data specified by a user in new meeting portion 234 of electronic meeting management screen 230. In response to this request, meeting intelligence apparatus 102 analyzes various types of information and provides suggested agenda items to the electronic meeting application, which displays the suggested items for a user, and allows a user to select suggested items to be included in an electronic meeting agenda.

Returning to FIG. 2E, new meeting portion 234 includes a Meeting Agenda control 236 that allows a user to create a meeting agenda for a new electronic meeting. FIG. 2H depicts an agenda creation screen 250 generated in response to a user selecting Meeting Agenda control 236 from electronic meeting management screen 230. For example, in response to a user selecting Meeting Agenda control 236 from electronic meeting management screen 230, the electronic meeting application may cause agenda creation screen 250 to be generated and displayed.

Agenda creation screen 250 includes agenda information 252 for the new electronic meeting, which in this example is the second code review meeting for the Pluto project. Agenda information 252 includes user-specified agenda items 254 that may be manually specified by a user. User-specified agenda items 254 may be specified, for example, as a list of agenda items that a user wishes to be included on the meeting agenda for the new electronic meeting. In the example depicted in FIG. 2H, user-specified agenda items 254 include three agenda items: Additional Software Requirements from Vendor, Graphical User Interface Update, and Software Integration Planning. These agenda items may be specified by a user typing the agenda items into user-specified agenda items 254, or by copying and pasting information from other applications. User-specified agenda items 254 may be added, edited, and deleted, and the changes saved via selection of the Save control 258.

Agenda information 252 also includes suggested agenda items 256 that are generated with the assistance of meeting intelligence apparatus 102. Suggested agenda items 256 may be automatically generated and displayed in response to a user selecting Meeting Agenda control 236 when agenda creation screen 250 is displayed. Alternatively, agenda creation screen 250 may include a control for requesting the generation and display of suggested agenda items 256. A user may switch between user-specified agenda items 254 and suggested agenda items 256 by selecting each corresponding area on agenda creation screen 250, for example, by using a selection device such as a mouse.

Suggested agenda items 256 are topics for discussion that are determined to be relevant and appropriate for a particular new electronic meeting. The topics may be topics that have been scheduled for discussion, or actually discussed, in other electronic meetings, or they may be new topics. For example, suggested agenda items 259 may include topics that appear in multiple electronic documents related to the subject matter of a new electronic meeting. To generate suggested agenda items 256, meeting intelligence apparatus 102 may analyze agendas of other prior or current electronic meetings, minutes or other written records of other electronic meetings, other documentation, or any other information. This may include information for the same entity associated with the electronic meeting, other entities, or information for a particular industry or context. Examples of information analyzed by meeting intelligence apparatus 102 includes, without limitation, meeting agendas or other documents for other electronic meetings of the same meeting type for the same project, of the same meeting type for other projects within an entity, such as a business or other organization, of a different, but related meeting type, for the same project, or for other projects, etc. this may include, for example, search for electronic documents that mention the current project, which in the present example is the Pluto Project. Other examples include, without limitation, meeting agendas for other organizations within the same industry or context. Information beyond meeting agendas may also be evaluated. Examples of other information include, without limitation, specifications, memoranda, and other documents.

Suggested agenda items 256 may be organized and presented to a user in any manner that may vary depending upon a particular implementation. For a large number of suggested agenda items 256, visually organizing the suggested agenda items on a user interface may provide a more favorable user experience than merely listing all available suggested agenda items 256. FIG. 2H depicts categories of suggested agenda items 256: Uncompleted Agenda Items From Prior Meeting(s), Action Items From Prior Meeting(s), Agenda Items Based Upon Meeting Rules Template, and Other. Each of the categories may be selected to view the particular agenda items within each category.

FIG. 2I depicts suggested agenda items for each category of suggested agenda items depicted in FIG. 2H. Organizing suggested agenda items by category may be more useful to some users than listing suggesting agenda items in random order, although embodiments are not limited to organizing suggested agenda items 256 by category, and other approaches may be used such as alphabetical order, etc.

Agenda items in the Uncompleted Agenda Items and Action Items From Prior Meeting(s) categories may be determined by meeting intelligence apparatus 102 first identifying one or more prior electronic meetings that are related to the current electronic meeting, and then analyzing electronic documents associated with the identified one or more prior electronic meetings. Meeting intelligence apparatus 102 may identify the one or more prior electronic meetings, which in this example is the First Code Review Meeting, based upon a reference to the First Code Review Meeting in documentation associated with the current electronic meeting, i.e., the Second Code Review Meeting, or any other attributes of the current meeting. For example, the agenda for the current electronic meeting may explicitly reference the prior electronic meeting. As another example, the one or more prior electronic meetings may be referenced by a schedule or plan. For example, both the one or more prior electronic meetings and the current electronic meeting may be included on a project schedule.

Once the one or more prior electronic meetings have been identified, electronic documents for the one or more prior electronic meetings, such as the agenda and/or meeting minutes of the prior meeting, are analyzed to determine the agenda items from the one or more prior electronic meetings that were not completed, as well as action items that were created during the one or more prior electronic meetings. For example, meeting intelligence apparatus 102 may examine meeting minutes from the First Code Review Meeting to identify agenda items from that were not completed, as well as action items created during that meeting. Those identified agenda items are added to the Uncompleted Agenda Items From Prior Meeting(s) and Action Items From Prior Meeting(s) categories. In the example depicted in FIG. 2I, the "Driver code for DMA board" and "Software Testing Schedule" agenda items were uncompleted from the First Code Review Meeting, and the "Verify requirements for Satlink—John E." and "Investigate problems with DMA board—Susan R." action items were assigned during or after the First Code Review Meeting.

Agenda items in the Agenda Items Based Upon Meeting Rules Template category may be determined by meeting intelligence apparatus 102 analyzing one or more meeting rules templates specified for the new electronic meeting. In the present example, meeting intelligence apparatus 102 determines that the "Milestones Status Review" agenda item is required by the Engineering—Code Review meeting rules template. Meeting intelligence apparatus 102 therefore uses the "Milestones Status Review" agenda item as a suggested agenda item. According to one embodiment, agenda items required by a meeting rules template are not provided as suggested agenda items that may be selected or not selected by a user. Instead, the agenda items that are required by a meeting rules template are automatically added to the agenda for the current electronic meeting. This ensures that required agenda items specified by a meeting rules template are included on the agenda, and also reduces the number of suggested agenda items that must be reviewed by a user.

Agenda items in the Other category may be determined by meeting intelligence apparatus 102 analyzing a plurality of data items to identify suggested agenda items that are relevant to the new electronic meeting. The plurality of data items analyzed by meeting intelligence apparatus 102 may include any type of data items that may vary depending upon a particular implementation. Relevance may be determined using a wide variety of algorithms and heuristics that may vary depending upon a particular implementation. According to one embodiment, meeting intelligence apparatus 102 is configured to analyze a plurality of data items to identify typical agenda items for the meeting type of the new electronic meeting. In the present example, this includes determining typical agenda items for code review meetings. This may include determining the typical agenda items for code review meetings within the same organization, or searching beyond the current organization to other organizations. The search may be conducted within the same context, industry, etc., or may extend to other contexts, industries, etc. According to one embodiment, meeting intelligence apparatus 102 identifies electronic documents related to one or more topics or subjects of the new electronic meeting and then analyzes the identified electronic documents to determine one or more suggested agenda items for the Other category. In the present example, meeting intelligence apparatus 102 determines that the "Software Testing Schedule" agenda item is typical for code review meetings and is therefore included as a suggested agenda item. Other criteria besides meeting type may be used to identify suggested agenda items. For example, the meeting subject may be used as a criterion to identify suggested agenda items. In the present example, meeting intelligence apparatus may search the plurality of data items to identify data items related to the Pluto Project, and determine suggested agenda items based upon the data items related to the Pluto Project.

According to one embodiment, relevance scores may optionally be determined and displayed for suggested agenda items 256. Relevance scores may be separately determined for each of the suggested agenda items 256 based upon various factors. As depicted in FIG. 2I, relevance scores for suggested agenda items in the Uncompleted Agenda Items From Prior Meeting(s) and Action Items From Prior Meeting(s) categories are relatively high, which is attributable to a high correlation between the suggested agenda items and one or more attributes of the new electronic meeting. For example, the high correlation may be between the suggested agenda items and one or more subjects or meeting types of the electronic meeting. This may result in a user being more likely to select the suggested agenda items for the new electronic meeting. Similarly, relevance scores for suggested agenda items in the Agenda Items Based Upon Meeting Rules Templates are also relatively high since these agenda items are required by the one or more meeting rules templates specified for the new electronic meeting and are therefore determined to be highly correlated to one or more attributes of the new electronic meeting. In contrast, a relevance score of 92% is determined and displayed for the suggested agenda item "Software Testing Schedule." This relevance score is lower than the relevance scores for the Uncompleted Agenda Items From Prior Meeting(s) and Action Items From Prior Meeting(s) categories since the "Software Test Schedule" was not an uncompleted agenda item or an action item from a prior meeting, but is nevertheless determined to have a high relevance score based upon, for example, 1) the meeting type of the new electronic meeting being a code review meeting; and 2) an analysis of agendas for other code review meetings showed that a software test schedule is a common agenda item for code review meeting.

Suggested agenda items may be displayed in a generalized form to identify the topics for discussion, while allowing a user to edit and tailor the suggested agenda items for a particular electronic meeting. Controls, in the form of checkboxes, are provided to allow a user to select and deselect individual agenda items. Selecting a particular agenda item causes the particular agenda item to be included in the agenda for the new electronic meeting. According to one embodiment, agenda creation screen 250 provides the capability for users to edit suggested agenda items 256, for example, by selecting a particular suggested agenda item using a pointing device such as a mouse, and then edit the text of the particular suggested agenda item. This may be useful, for example, to specify changes or clarifications to an agenda item, which is commonly done on the context of electronic meetings. Once the user has completed editing (if applicable) and selecting suggested agenda items 256, a selection of the "Save" control from controls 258 causes the agenda information 252 for the new electronic meeting to be saved. Selecting of the "Back" control from controls 258 causes control to be returned to the electronic meeting management screen 230.

C. Meeting Participant Selection

Electronic meeting participants may be selected manually by users and according to one embodiment, the selection of meeting participants is assisted by artificial intelligence provided by meeting intelligence apparatus 102. Meeting intelligence apparatus 102 participates in the selection of electronic meeting participants by providing suggested meeting participants for an electronic meeting. In addition, as described in more detail hereinafter, constraints and requirements for meeting participants specified by a meeting rules template designated for an electronic meeting may be enforced by electronic meeting applications.

The electronic meeting application may request that meeting intelligence apparatus 102 provide suggested meeting participants for an electronic meeting. The request for suggested meeting participants may include data that specifies a plurality of attributes of the electronic meeting. For example, a request for suggested agenda items may include any of the data specified by a user in new meeting portion 234 of electronic meeting management screen 230. In response to this request, meeting intelligence apparatus 102 analyzes various types of information and provides suggested meeting participants to the electronic meeting application, which displays the suggested meeting participants for a user, and allows a user to select suggested meeting participants to be included in an electronic meeting.

Returning to FIG. 2E, new meeting portion 234 includes a Meeting Participants control 238 that allows a user to select participants for a new electronic meeting. FIG. 2J depicts a participant selection screen 260 generated in response to a user selecting Meeting Participants control 238 from electronic meeting management screen 230. Participant selection screen 260 includes participant information 262 for the new electronic meeting, which in this example is the second code review meeting for the Pluto project. Participant information 262 includes user-specified meeting participants 264 that may be manually specified by a user, for example, from a list of contacts or one or more address books. An Add Contacts control 266 allows a user to access various sources of contacts, including organization-based contacts, personal contacts, social media contacts, etc., to provide additional contacts.

Participant information 262 also includes suggested meeting participants 268 that are determined, at least in part, with the assistance of meeting intelligence apparatus 102. As depicted in FIG. 2J, several suggested meeting participants 268 are displayed and controls, in the form of checkboxes, are provided to allow a user to individually select suggested meeting participants 268 to be included in the electronic meeting. Controls 270 allow a user to save the selections of meeting participants via a "Save" control from controls 270, or return to electronic meeting management screen 230 via a "Back" control from controls 270. Saving selections of meeting participants via a "Save" control from controls 270 may invoke other functionality, for example, an electronic meeting application to generate and transmit meeting invitations to the meeting participants. According to one embodiment, controls are provided to designate a meeting participant as a decision maker for the electronic meeting. The designation of a meeting participant as a decision maker may be used during the electronic meeting to manage the electronic meeting, as described in more detail hereinafter.

i. Suggested Meeting Participants

Suggested meeting participants 268 may be determined based upon a wide variety of information and criteria. According to one embodiment, information for other electronic meetings, such as agendas, transcripts, meeting minutes, etc., are analyzed to determine suggested meeting participants 268 for the current electronic meeting. For example, attendees of the prior First Code Review meeting for the Pluto Project may be included in suggested meeting participants 268 for the current electronic meeting, i.e., the Second Code Review Meeting for the Pluto Project, based upon their attendance at the prior electronic meeting. As another example, other members of the same team, project, department, group, technology or business area, etc., may be identified as suggested meeting participants 268. Suggested meeting participants 268 may also be determined based upon position, title, and/or responsibilities with an organization. For example, a team leader or decision maker for the Pluto Project may be included as one of the suggested meeting participants 268. Prior participation of participants in other electronic meetings may also be considered, for example, based upon records of other electronic meetings, such as transcripts, meeting minutes, or other post-meeting processing, as described in more detail hereinafter. For example, positive participation or contributions to other electronic meetings may be a positive factor in including a participant as a suggested meeting participants 268. Participants outside of an organization may also be included in suggested meeting participants 268, for example, as SMEs, as described in more detail hereinafter. Suggested meeting participants 268 may be displayed on participant selection screen 260 in different ways, depending upon a particular implementation. For example, suggested meeting participants 268 may be arranged on participant selection screen 260 based upon relevance scores (described in more detail hereinafter), the level of participation in one or more prior electronic meetings, position or role within an organization or with respect to the electronic meeting or a subject of the electronic meeting.

ii. Subject Matter Experts (SMEs)

Suggested meeting participants 268 may be determined based upon attributes of an electronic meeting. The attributes may be any type of attributes for an electronic meeting and may include, for example, a meeting subject, meeting type, meeting location, agenda items, etc. According to one embodiment, participants determined to be highly correlated to the attributes for an electronic meeting are selected as suggested meeting participants. For example, suppose that the agenda for the Second Code Review Meeting includes an agenda item pertaining to encryption. Suggested meeting participants 268 may include a suggested meeting participant who is a Subject Matter Expert (SME) in encryption, based upon the Second Code Review meeting including an agenda item pertaining to encryption. In the example depicted in FIG. 2J, "John E." is identified as a SME based upon his expertise in the area of encryption and is included in suggested meeting participants 268. The identification of an SME may be made based upon an analysis of electronic documents and other information that show that John E is a SME in encryption. Example information that may be considered includes, without limitation, resumes, academic credentials, academic papers, employee records, organization charts, presentation materials, information from other meetings, such as agendas and meeting minutes, project and product documentation, etc. SMEs may be internal or external to an organization, depending upon a particular implementation. For example, some areas of technology, medicine, etc., may be very specific and have relatively few SMEs, and it is possible that some organizations may not have an SME available for a particular area. In these situations, including SMEs that are external to an organization provides additional options for the meeting organizer.

In situations where multiple SMEs are identified for a particular subject matter, all of the identified SMEs may be included as suggested meeting participants and differentiated by their respective relevance scores and additional information, which are described in more detail hereinafter. For example, a SME with prior experience on the project that is the subject of the electronic meeting may be given a higher relevance score than another SME with equivalent background an experience, but without specific prior experience on the project. Similarly, the participation level of each SME in prior electronic meetings may be a factor in determining a relevance score. According to an embodiment, a search tool is provided to allow users to search for meeting participants. The search tool allows a user to specify one or more attributes of desired meeting participants. Meeting intelligence apparatus 102 performs a search and provides search results that satisfy the one or more attributes specified by the user. For example, a user may enter, as attributes, one or more keywords associated with a particular subject or topic, such as "encryption," and participants associated with the subject "encryption" are presented to the user. The user may specify as search criteria other information, such as name, background, etc. The search tool may be implemented via one or more windows, e.g., on participant selection screen 260.

iii. Meeting Rules Templates

Suggested meeting participants 268 may be determined based upon one or more meeting rules templates specified for an electronic meeting. As previously described herein, a meeting rules template specifies a set of requirements and/or constraints that may be applied to any aspect of an electronic meeting, before, during, and after an electronic meeting. The requirements and/or constraints may pertain to meeting participants. For example, a meeting rules template may specify that a particular person, a person with a specified level of authority, a decision maker, or a minimum and/or a maximum number of participants must attend an electronic meeting.

According to one embodiment, suggested meeting participants 268 include meeting participants that are determined to satisfy one or more requirements and/or constraints specified by one or more meeting rules templates designated for an electronic meeting. For example, a particular meeting rules template may require that a Chief Executive Officer (CEO) attend a Board of Directors meeting. In this example suggested meeting participants 268 would include the CEO of the organization for the electronic meeting. As another example, a particular meeting rules template may require that corporate legal counsel be included in a litigation settlement meeting. In this example, one of the organization's corporate legal counsel may be included in suggested meeting participants 268. As yet another example, a particular meeting rules template may require that a representative of a Human Resources (HR) department within an organization attend an employee disciplinary meeting. These are just a few examples of particular participants that are required to attend electronic meetings to satisfy one or more requirements and/or constraints specified by one or more meeting rules templates for an electronic meeting, and embodiments are not limited to these examples. According to one embodiment, particular participants that are required to satisfy requirements or constraints for an electronic meeting may be automatically pre-selected. For example, suppose that a particular member of a team is required to participate in an electronic meeting. The electronic meeting application includes the particular member of the team in suggested meeting participants 268 and pre-selects the particular member. De-selecting the particular member would cause a message to be displayed notifying the user that the particular member is required by the meeting rules template designated for the electronic meeting.

Suggested meeting participants 268 may include multiple suggested meeting participants for a single requirement or constraint specified by a meeting rules template, or for multiple requirements and constraints specified by a meeting rules template. For example, a meeting rules template for a Board of Directors meeting may require that both at least a minimum number of Board members attend the electronic meeting to satisfy a quorum requirement for voting purposes, and also that the Chairman of the Board be one of the meeting attendees. Suggested meeting participants 268 that are required to satisfy one or more requirements and/or constraints specified by one or more meeting rules templates for an electronic meeting may be conspicuously identified to users. For example, such suggested meeting participants 268 may be displayed with an indication that they are required, and/or displayed using different colors, special effects, etc.

According to one embodiment, an electronic meeting application is configured to enforce one or more constraints or requirements specified by a meeting rules templates designated for an electronic meeting. Enforcement of constraints or requirements may occur at different times during meeting participant selection, depending upon a particular implementation. For example, constraints may be enforced after a user has selected meeting participants and selected the Save control 270. This may include, for example, determining whether a total number of meeting participants selected by a user satisfies one or more constraints, such as a maximum number of meeting participants, specified by a meeting rules template designated for the electronic meeting. In response to determining that the total number of meeting participants selected by a user exceeds a maximum number of meeting participants specified by the meeting rules template, the user may be notified, via the graphical user interface, that the requirement has not been satisfied, and provide an opportunity for the user to remedy the error, for example, by de-selecting one or more meeting participants.

iv. Relevance Scores

According to one embodiment, a relevance score is calculated and displayed for each suggested meeting participant 268. The relevance score indicates a relevance of the suggested meeting participant to the electronic meeting, and the relevance score may be helpful to a user in deciding whether to select a particular suggested meeting participant for inclusion in an electronic meeting. Relevance scores may be considered in the presentation of suggested meeting participants 268 to a user. For example, suggested meeting participants 268 may be ordered on participant selection screen 260 based upon relevance scores, e.g., from highest (most relevant) to lowest (least relevant).

In the example depicted in FIG. 2J, the relevance scores are depicted in parentheses, i.e., "(98%)" on a scale of 0-100%, where 0% represents a lowest level of relevance, or no relevance, between a particular suggested participant and an electronic meeting, and 100% represents a high level of relevance, or complete relevance between a particular suggested participant and an electronic meeting. The 0-100% scale depicted in FIG. 2J is provided as an example implementation. Embodiments are not limited to this example and any scoring methodology may be used.

Relevance scores may be calculated based upon a wide variety of factors and information, such as one or more of, a meeting rules template specified for an electronic meeting, one or more attributes of the electronic meeting, such as meeting type, meeting subject, meeting location, and agenda items, as well as any other information that might indicate a relevance between a suggested participant and an electronic meeting, such as participation and contributions made during prior electronic meetings. For example, participation in a prior electronic meeting of the same meeting type and for the same meeting subject would increase the relevance score for a particular suggested meeting participant 268. A determination that the particular suggested meeting participant 268 participated in the prior electronic meeting would further increase the relevance score for the particular suggested meeting participant 268. This may be determined, for example, by an analysis of records for other electronic meetings, such as meeting minutes, transcripts, etc. Information external to an organization may be considered in determining relevance scores, for example, via the Internet. Examples of such information include, without limitation, educational background, professional credentials, work experience, published books, papers, studies and articles, other career achievements, documents related to conferences, documents related to standards organizations and public organizations, government documents, school curriculums, social media data, such as posts, etc. According to one embodiment, the availability of a suggested participant may be determined, e.g., via a participant's calendar, and indicated via participant selection screen 260. For example, a visual indication may be provided on participant selection screen 260 to indicate that a particular participant is not available at the scheduled date and time for an electronic meeting. This allows the meeting organizer to consider re-scheduling an electronic meeting for a meeting participant whose participation is considered to be important.

v. Additional Information

According to one embodiment, additional information is determined and displayed with suggested meeting participants 268 to aid users in deciding whether to select a particular suggested meeting participant for inclusion in an electronic meeting. The additional information may include any information about the suggested participant, including information used in calculating a relevance score. Examples of additional information include, without limitation, information about a suggested meeting participant, such as information about their educational background, professional credentials, work experience, published books, papers, studies, articles, achievements, contributions, roles and positions within organizations, including participation in projects and meetings, key quotes from other electronic meetings, etc.

For example, as depicted in FIG. 2J, the additional information for suggested meeting participant "Taryn K." specifies that this participant attended a prior electronic meeting that is relevant to the current electronic meeting, i.e., the First Code Review meeting for the Pluto Project. The additional information for suggested participant "Taryn K." also specifies that this participant was a designated decision maker in the First Code Review meeting for the Pluto Project. Both of these items of additional information may be helpful to a user in deciding whether to select suggested meeting participant "Taryn K." for inclusion in the current electronic meeting, i.e., the Second Code Review Meeting for the Pluto Project. These items of additional information may also have contributed to suggested meeting participant "Taryn K." having a very relevance score of 98%, i.e., based upon the facts that "Taryn K." both attended the First Code Review meeting for the Pluto Project and was the designated decision maker in that meeting.

In some situations, a large amount of additional information may be available for suggested meeting participants. According to one embodiment, controls are provided on participant selection screen 260 to access further additional information. In FIG. 2J, an example control is "<more>" which, when selected, provides access to further additional information for suggested meeting participant "John E." The additional information may be displayed, for example, in a pop-up box or overlaid window and may include, for example, any of the information described above, such as key quotes from prior meetings, etc.

IV. Real-Time Processing

According to one embodiment, artificial intelligence is used to manage various aspects of electronic meetings. For example, meeting intelligence apparatus 102 may intervene during electronic meetings to provide any of a variety of intervention data, such as visual indications, messages in message window 224, participant information, recommendation information, and/or any other data that meeting intelligence apparatus 102 transmits during an electronic meeting.

Figure 3:
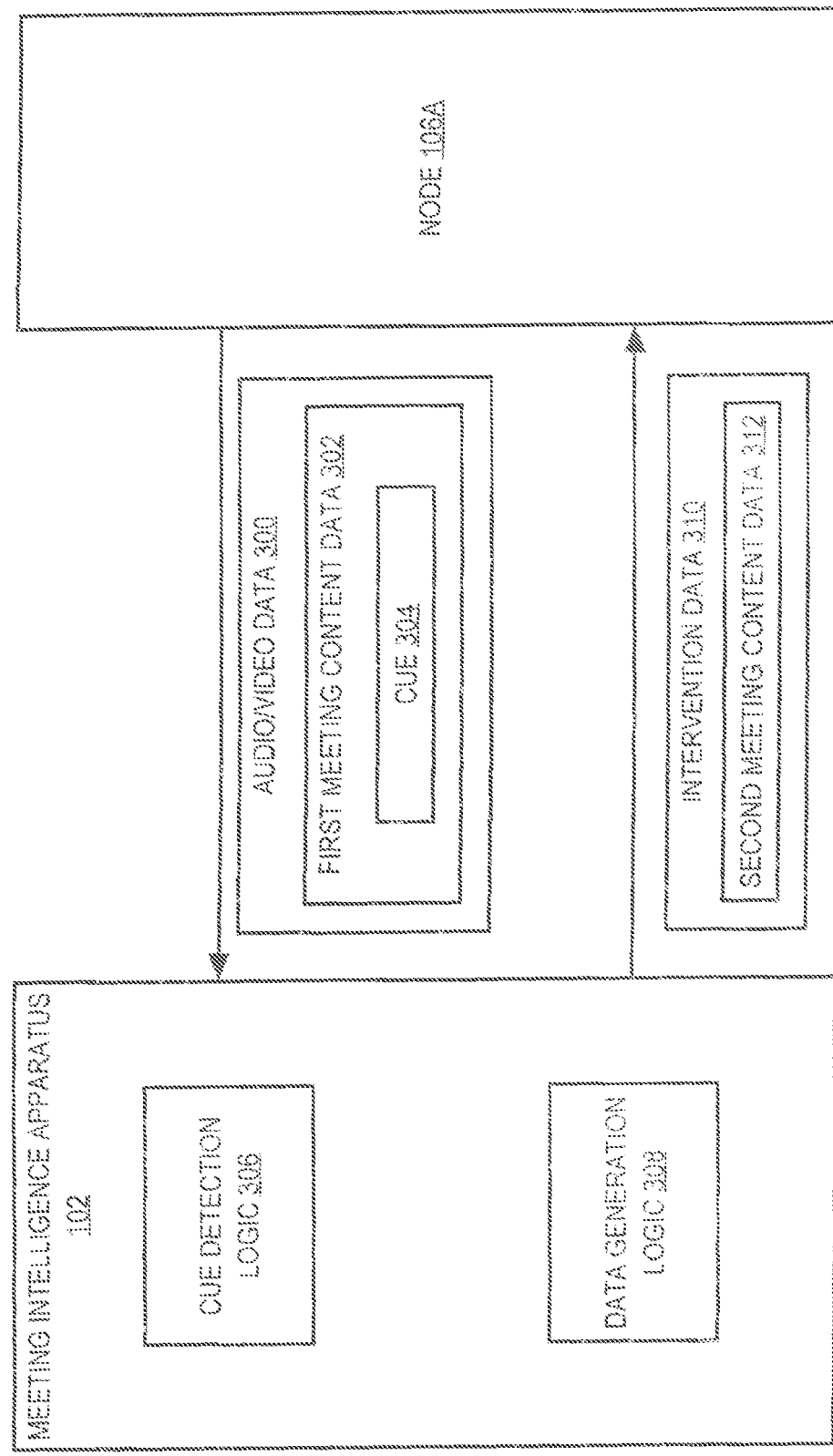
FIG. 3 is a block diagram that depicts an arrangement for generating intervention data.

FIG. 3 is a block diagram that depicts an arrangement for generating intervention data. Referring to FIG. 3, meeting intelligence apparatus 102 receives audio/video data 300 from node 104A. Audio/video data 300 may be one or more data packets, a data stream, and/or any other form of data that includes audio and/or video information related to an electronic meeting. In the example depicted in FIG. 3, audio/video data 300 includes first meeting content data 302 which, in turn, includes cue 304. Cue 304 may take many forms that may vary depending upon a particular implementation. Examples of cue 304 include, without limitation, one or more keywords, tones, sentiments, facial recognitions, etc., that can be discerned from audio/video data 300. Other examples of cue 304 include whiteboard sketches and/or gestures that may not be part of audio/video data 300.

Meeting intelligence apparatus 102 includes cue detection logic 306, which analyzes audio/video data 300 to determine whether audio/video data 300 includes cue 304. Cue detection logic 306 may analyze audio/video data 300 on a continuous basis, or on a periodic basis, depending upon a particular implementation. Meeting intelligence apparatus 102 also includes data generation logic 308, which generates intervention data 310 if audio/video data 300 includes cue 304. Meeting intelligence apparatus 102 transmits intervention data 310 to node 104A during and/or after an electronic meeting. Intervention data 310 includes second meeting content data 312 that may supplement or replace first meeting content data 302, as described in more detail hereinafter. Intervention data may also Meeting intelligence apparatus 102 may can intervene in an electronic meeting in a wide variety of ways. Non-limiting examples include intervening to manage meeting flow, to provide information retrieval services, and/or to supplement meeting content.

A. Meeting Management

According to one embodiment, artificial intelligence is used to assist with managing various aspects of electronic meetings. This may include a wide variety of functionality that may vary depending upon a particular implementation. Example functionality includes, without limitation, agenda management, points of agreement, action items, new meeting requests, and sentiment analysis. The use of speech and/or text recognition provides a more favorable user experience by allowing users to manage various aspects of electronic meetings using voice commands and/or text commands.

i. Agenda Management

According to one embodiment, artificial intelligence is used to provide agenda management functionality during electronic meetings. Agenda management functionality may include a wide variety of functionality that may vary depending upon a particular implementation. Example functionality includes, without limitation, enforcing time constraints for agenda items, changing designated amounts of time for agenda items, changing, deleting and adding agenda items, including providing missing or supplemental information for agenda items, and agenda navigation.

Figure 4A:
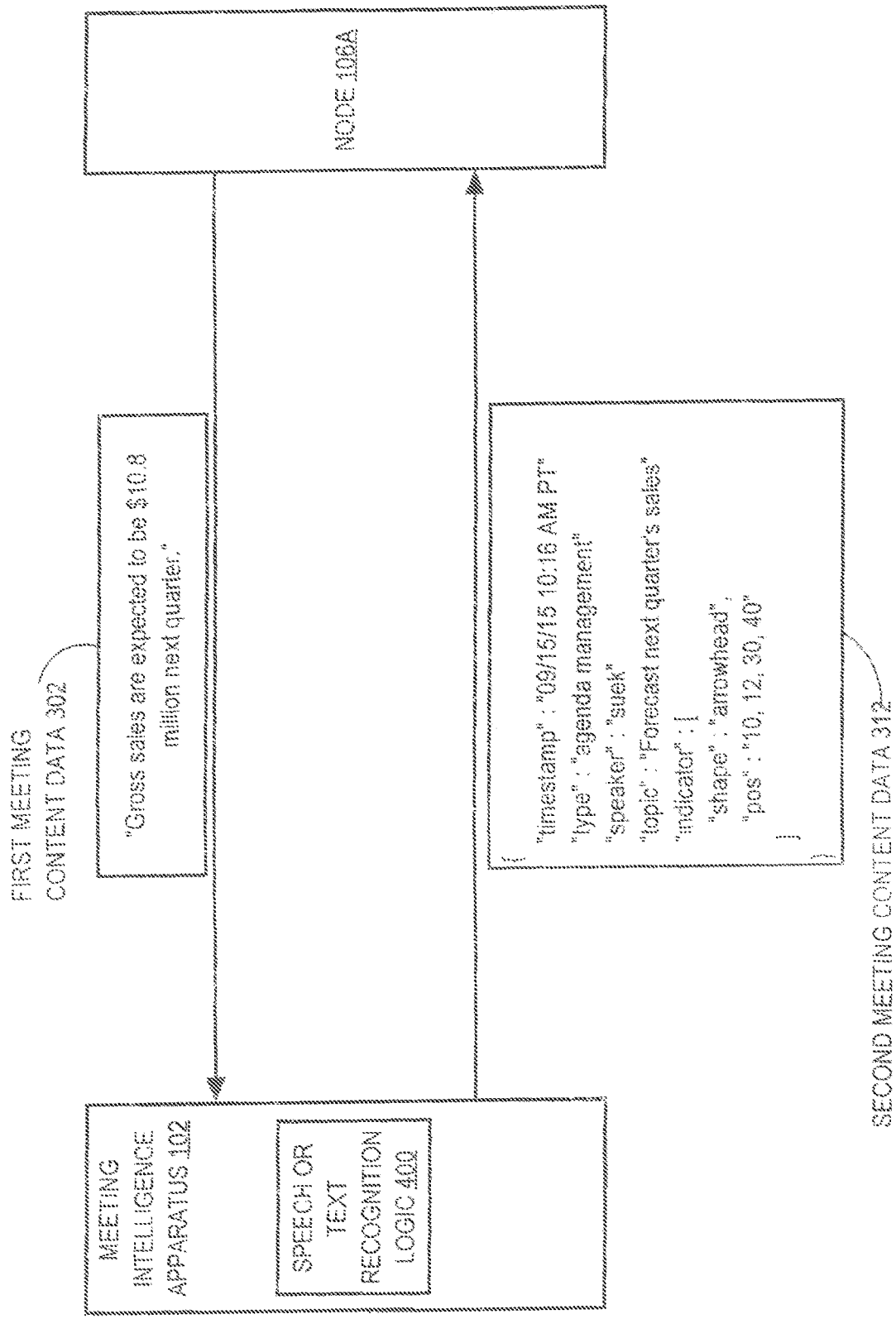
FIG. 4A is a block diagram that depicts an arrangement in which meeting intelligence apparatus includes speech or text recognition logic that processes first meeting content data to determine one or more corresponding agenda topics.

FIG. 4A is a block diagram that depicts an arrangement in which meeting intelligence apparatus 102 includes speech or text recognition logic 400 that processes first meeting content data 302 to determine one or more corresponding agenda topics. In the example depicted in FIG. 4A, first meeting content data 302 includes the speech or text statement "Gross sales are expected to be $10.8 million next quarter." A participant associated with node 104A may have caused first meeting content data 302 to be generated by speaking, writing, typing, or displaying the statement. Speech or text recognition logic 400 may process first meeting content data 302 by parsing to detect keywords that are mapped to a meeting agenda. In the present example, speech or text recognition logic 400 detects the keywords "next quarter." These keywords are a cue 304 for meeting intelligence apparatus 102 to generate intervention data 310 that indicates a corresponding agenda topic. The intervention data 310 may be used by the electronic meeting application to determine a correspondence between a current point in an electronic meeting and a meeting agenda. This correspondence is used to provide agenda management functionality, including tracking the current agenda topic. In the example of FIG. 4A, second meeting content data 312 specifies, among other information, the position of visual indicator 220, or a current agenda item, using JavaScript Object Notation (JSON). Thus, one or more electronic meeting applications that process the JSON will display visual indicator 220 at the specified position in the meeting agenda during an electronic meeting.

A determined correspondence between a current point in an electronic meeting and a meeting agenda may be used to monitor the progress of an electronic meeting and enforce time constraints with respect to individual agenda items, groups of agenda items, and/or an entire electronic meeting. This may include tracking the amount of time spent on agenda items and providing one or more indications to meeting participants. For example, in addition to the timer provided in agenda window 218 (FIG. 2D), a visual and/or audible indication may be provided when an amount of time designated for an agenda item, group of agenda items, or an entire electronic meeting, is nearing expiration or has expired. If the timer value exceeds the specified time limit, the electronic meeting application may cause a message to be displayed in message window 224. The message may also be spoken by the electronic meeting application. The message may indicate, for example, the that time limit for the current agenda item has expired and the electronic meeting will be progressing to the next agenda item. Additionally or alternatively, the electronic meeting application may move a visual indication to a different agenda topic. Speech and text recognition may also be used to ensure that all agenda items and action items are addressed during an electronic meeting, which may include discussion, deferral, etc.

As previously described herein, agenda items may be designated as requiring a decision, for example via one or more meeting rules templates, or via user-designation. According to one embodiment, an electronic meeting application ensures that a decision is made for all agenda items requiring a decision during an electronic meeting. If a user attempts to navigate to another agenda item or action item before a decision has been made on a current agenda item, the electronic meeting application may display a message in message window 224, or speak the message, indicating that the current agenda item or action item requires a decision. This may include preventing navigation to other agenda items or action items until the current agenda item is addressed. A meeting owner may be permitted to override this functionality and move to another agenda item or action item.

Speech and text recognition may be used to recognize agenda-related commands, such commands to add time to agenda items and agenda navigation commands. For example, the command "add time", followed by a specified amount of time, adds a specified amount of time to the current agenda item. The command "add time to" followed by an agenda item and a specified amount of time, adds the specified amount of time to the specified agenda item, which may be a different agenda item than the current agenda item. Another example is the command "completed," "done," or "defer," followed by "next agenda item," to change the status of the current agenda item and move to the next agenda item. For example, in response to "defer, jump to X," the current agenda item is deferred, also referred to as "parked," and the new current agenda item becomes X. Various other agenda navigation commands may be used, depending upon a particular implementation.

Another example of agenda-related commands are commands to delete, change or add (new) agenda items. Agenda items may be identified by name or other means, such as code, reference number, symbol, etc. For example, the command "delete" followed by a particular agenda item causes the particular agenda item to be deleted from the agenda. As another example, the command "change agenda item X to X'" causes the agenda item X to be changed to X'. As yet another example, the command "add agenda item Y" or "new agenda item Y" causes a new agenda item Y to be added to the agenda. The user may specify, for example, by speaking, writing, etc., attributes of a new agenda item, such as name, date, responsible person, etc. Agenda-related commands may also include commands to change the order of agenda items in an agenda. For example, the command "Agenda item X, move to top" causes agenda item X to be moved to the top of the agenda. Similarly, the command "Agenda item X, move to bottom" causes agenda item X to be moved to the bottom of the agenda.

According to one embodiment, meeting intelligence apparatus 102 provides the capability to detect that information is missing for a new agenda item and provide a notification to an electronic meeting application. According to this embodiment, meeting intelligence apparatus 102 detects that not all of the information required for a new agenda item has been specified. This may be performed, for example, by meeting intelligence apparatus 102 analyzing first meeting content data 302 to detect a command to create a new agenda item, along with some attribute information for the new agenda item. Referring to the prior example, meeting intelligence apparatus 102 may detect, in first meeting content data 302, the command, "new agenda item Y," along with attribute data for new agenda item Y, such as a description of the new agenda item. This command may have been spoken, written or selected by a meeting participant, as indicated by the first meeting content data 302.

Meeting intelligence apparatus 102 recognizes, using artificial intelligence such as artificial intelligence service 110, that some information for the new agenda item is missing, such as a responsible person. This may be determined, for example, based upon a set of requirements that specifies information required for agenda items. For example, a requirement may exist that all new agenda items, or agenda items of this type, have an assigned responsible person. Alternatively, this may be determined based upon information specified for agenda items for the same electronic meeting or other electronic meetings. For example, Meeting intelligence apparatus 102 may examine records for other electronic meetings to identify information provided with agenda items for those electronic meetings and determine that most or all of those agenda items included a responsible person.

Once a determination has been made that a new agenda item is missing particular information, Meeting intelligence apparatus 102 may automatically determine the missing information, for example, by examining information for other agenda items for the current electronic meeting, or for other electronic meetings. This may include identifying agenda items that are similar to the new agenda item and then examining the information specified for those similar agenda items. The missing information may then be provided to the electronic meeting application for processing. The electronic meeting application may notify the meeting participants that information is missing for the new agenda item, for example, by displaying a message in message window 224. The electronic meeting application may automatically use the information provided by Meeting intelligence apparatus 102 to address the missing information and notify the meeting participants via message window 224. Alternatively, the electronic meeting application may query a meeting participant to provide the missing information. The information provided by Meeting intelligence apparatus 102 may be provided meeting participants as suggested information for completing the missing information.

Consider the following example. Suppose that a new agenda item is created without a responsible person. Meeting intelligence apparatus 102 determines that a responsible person is missing for the new agenda item and analyzes agendas for other electronic meetings to identify agenda items that are similar to the new agenda item. Various algorithms, such as distance algorithms, may be used to identify other similar agenda items, e.g., other agenda items that are within a specified distance of the new agenda item. The responsible person designated for the other agenda item that is most similar to the new agenda item is identified and provided to the electronic meeting application. In the present example, "Alice C." is the responsible person for the other agenda item that is most similar to the new agenda item.

The electronic meeting application may automatically designate the responsible person determined by meeting intelligence apparatus 102 for the new agenda item and notify the meeting participants via message window 224. An example message is "New agenda item X is missing a responsible person, Alice C. has been automatically designated." The electronic meeting application may provide controls to allow a meeting participant to confirm or change the responsible person. This may also be done via voice commands. Alternatively, the information provided by meeting intelligence apparatus 102 may be displayed as a suggestion, along with controls to accept or change the suggestion. For example, the electronic meeting application may display a message via message window 224 such as, "New agenda item X is missing a responsible person. Suggestion: Alice C." In situations where the information provided by meeting intelligence apparatus 102 includes multiple suggested responsible persons, then the multiple suggested responsible persons may all be listed, and controls provided for a user to select one of the responsible persons. Alternatively, a user may simply speak the name of the responsible person to be designated for the new agenda item.

According to one embodiment, artificial intelligence may provide supplemental information for new agenda items. For example, in the prior example in which the new agenda item is missing a responsible person and Alice C. is provided as a suggestion, the suggestion may include additional information about Alice C. that might be helpful to a meeting participant deciding whether to accept or change the suggestion. In this example, this may include information about Alice C, such as "New agenda item X is missing a responsible person. Suggestion: Alice C. (responsible person on agenda items X1 and X2)." Supplemental information may pertain to other aspects of a new agenda item. For example, additional information about the subject of a new agenda item may be displayed.

As demonstrated by the foregoing examples and embodiments, artificial intelligence may be used to aid in various aspects of agenda management and provide a more useful experience. Information provided by meeting intelligence apparatus 102, such as recognized commands, missing and supplemental agenda information, etc., may be automatically provided by meeting intelligence apparatus 102 to an electronic meeting application. Alternatively, this information may be provided in response to requests from electronic meeting applications.

Changes to agenda items and new agenda items may be recorded in meeting records, such as meeting minutes or transcripts, and used during the creation of other meeting agendas, as previously described herein. The approach described above for new agenda items may be used for existing agenda items. For example, suppose that an existing agenda item is missing information. A user may be queried to supply the missing information for the existing agenda item. Alternatively, the missing information may be provided or suggested by meeting intelligence apparatus 102 as previously described herein. Meeting intelligence apparatus 102 may transmit, to an electronic meeting application, data indicating that required information is missing for a new agenda item. In response to receiving this data, the electronic meeting application notifies meeting participants, for example, via a message in message window 224, an audible indication, or both, that additional information is required for the new agenda item.

According to one embodiment, the aforementioned approaches may be used to create new agenda items for electronic meetings that have no agenda. For example, meeting intelligence apparatus 102 may recognize a "create agenda" command and provide a notification to an electronic meeting application to create an agenda for the current electronic meeting. Agenda items may then be added to the agenda as previously described herein.

ii. Points of Agreement, Action Items and New Meeting Requests

Action items are an important aspect of many electronic meetings. According to one embodiment, an electronic meeting application, in conjunction with meeting intelligence apparatus 102, is configured to recognize commands pertaining to action items for an electronic meeting. For example, meeting intelligence apparatus 102 may recognize a spoken or written command "add action item X," and in response to this command, add action item X to a meeting record for the current electronic meeting. Explicit commands to establish action items may be pre-specified and meeting intelligence apparatus 102 may be configured to detect the pre-specified commands in first meeting content data 302.

According to an embodiment, meeting intelligence apparatus 102 is configured to recognize implicit requests for action items. Implicit requests for action items may be recognized based upon an analysis of first meeting content data 302. The analysis may identify words that although do not constitute an explicit request for an action item, indicate a desire by one or more meeting participants to create an action item. For example, a meeting participant may state, during a current electronic meeting, "Let's ask the IT department to follow-up on RF link reliability." While this phrase may not include pre-specified keywords for creating an action item, based upon the use of artificial intelligence, meeting intelligence apparatus 102 determines that there exists an intent by one or more meeting participants is to create an action item. In response to identifying an explicit or implicit request for an action item, the electronic meeting application and/or meeting intelligence apparatus 102 may automatically create a new action item for the electronic meeting, which may include adding the action item to an electronic record for the electronic meeting. The electronic meeting application may display, for example, on electronic meeting screen 212, a visual confirmation for the meeting participants indicating that the action item was added for the current electronic meeting.

For explicit and implicit requests, the electronic meeting application may display detected words or phrases and provide controls for a meeting participant to confirm the request for an action item. This may be helpful to avoid creating action items based upon implicit requests where the meeting participants did not actually intend to create an action item. Confirmation may be provided verbally or detected via speech or text recognition logic 400. FIG. 2F depicts a message window 224 displayed on electronic meeting screen 212 that includes a proposed action item determined by meeting intelligence apparatus 102 analyzing first meeting content data 302, along with controls for confirming or canceling the proposed action item. In this example, an explicit command was not used to create a new action item. Instead, meeting intelligence apparatus 102 identified an implicit request to create a new action item from the statement made by a meeting participant, "Let's ask the IT department to follow-up on RF link reliability."

There are times during some electronic meetings where certain decisions, conclusions, stipulations, or points of agreement are established by the meeting participants and it is desirable to document this information, in association with the current electronic meeting. According to one embodiment, an electronic meeting application, in conjunction with meeting intelligence apparatus 102, is configured to recognize decisions, conclusions, stipulations, or points of agreement based upon explicit commands, and in response, add the decisions, conclusions, stipulations, or points of agreement to meeting notes, minutes and/or transcripts for the current electronic meeting. For example, meeting intelligence apparatus 102 may recognize a spoken or written command "add conclusion" or "point of agreement," and add a following conclusion statement or point of agreement to a meeting record for the current electronic meeting. In addition, the electronic meeting application may display, for example on electronic meeting screen 212, a visual confirmation for the meeting participants indicating that the decision, conclusion, stipulation, or point of agreement was added for the current electronic meeting. Explicit commands to establish decisions, conclusions, stipulations, or points of agreement may be pre-specified and meeting intelligence apparatus 102 may be configured to detect the pre-specified commands in first meeting content data 302.

According to an embodiment, meeting intelligence apparatus 102 is configured to recognize implicit decisions, conclusions, stipulations, or points of agreement and add corresponding information to a meeting record for the electronic meeting. Implicit decisions, conclusions, stipulations, or points of agreement may be recognized in first meeting content data 302 based upon words that, based upon an artificial intelligence analysis, indicate a desire by one or more meeting participants to establish a decision, conclusion, stipulation, or point of agreement, even though a pre-specified command was used by a meeting participant. For example, a meeting participant may state, "It appears that we have reached a consensus on this point." Based upon the use of artificial intelligence, meeting intelligence apparatus 102 determines that the intent of one or more meeting participants was to establish a conclusion or point of agreement, without using a pre-specified command for doing so. As previously described herein with respect to action items, message window 224 may be used to display a possible decision, conclusion, stipulation, or point of agreement, along with controls for confirming or canceling. Message window 224 may also be used to display detected explicit or implicit requests to create a new meeting, along with controls for confirming or canceling.

i. Sentiment Analysis

As previously described herein, new meetings may be created based upon the results of sentiment analysis that indicates that a new meeting may be appropriate or helpful in a particular situation, for example if significant disagreement and/or hostility exists between participants in a meeting. The results of sentiment analysis may also be used to initiate other actions to address the detected sentiment, e.g., to diffuse detected hostility between meeting participants. For example, a proposal to create an action item may be generated and displayed in message window 224, e.g., "Create action item for current topic?" As another example, a proposal to create a follow-up meeting may be generated and displayed in message window 224, e.g., "Create follow-up meeting for current topic?" As yet another example, a proposal to defer the current agenda item and move to the next agenda item may be displayed in message window 224, such as "Defer current agenda item and move to next agenda item?" This allows a meeting participant, such as the meeting owner to diffuse the detected hostility by stopping discussion on the current agenda item and moving to another agenda item. Furthermore, the suggestion of the alternative actions by meeting intelligence apparatus 102 may depersonalize the intervention because it is done by meeting intelligence apparatus 102 in combination with the electronic meeting application, rather than a meeting participant. This may provide a more favorable user experience.

FIG. 4B is a block diagram that depicts an arrangement for performing sentiment analysis with respect to an ongoing discussion 402. Referring to FIG. 4B, meeting intelligence apparatus 102 includes sentiment analysis logic 404 that performs sentiment analysis on first meeting content data 302 related to ongoing discussion 402. For example, meeting intelligence apparatus 102 may detect an angry tone or sentiment that is a cue 304 for meeting intelligence apparatus 102 to generate intervention data 310 indicating that another electronic meeting has been automatically scheduled for continuing ongoing discussion 402. In the example of FIG. 4B, second meeting content data 312 includes JSON that can be used by an electronic meeting application to make decisions about a current electronic meeting.

B. Information Retrieval

According to one embodiment, an electronic meeting application, in conjunction with meeting intelligence apparatus 102, provides information retrieval services for electronic meetings. This capability allows a user to formulate and submit natural language queries for processing, and view the results of processing the natural language queries during an electronic meeting. This provides a more favorable user experience than requiring users to be able to formulate queries in more formal formats or a computer language, such as Structured Query Language (SQL).

FIG. 4C is a block diagram that depicts an arrangement for retrieving requested information using natural language queries. A user specifies a natural language query to an electronic meeting application executing, for example, on node 106A. For example, FIG. 2K depicts a natural language query via query window 272 of electronic meeting screen 212 that allows a user to enter a natural language query. The electronic meeting application generates and transmits a natural language request 406 to meeting intelligence apparatus 102. Natural language request 406 may be included in first meeting content data 302, or may be transmitted separately. In the example depicted in FIG. 4C, natural language request 406 includes the question "Where did we leave off at the last meeting?" Note that natural language request 406 may include a question, a statement, a command, or any other type of request for information.

Speech or text recognition logic 400 parses and interprets first meeting content data 302 to detect natural language request 406, which is a cue 304 for meeting intelligence apparatus 102 to generate intervention data 310 to be sent to at least node 104A during an electronic meeting. For example, speech or text recognition logic 400, alone or in combination with sentiment analysis logic 404, may detect inflected speech and/or keywords indicative of an information request, such as "who", "what", "when", "where", "why", or "how". Meeting intelligence apparatus 102 can interpret these and other keywords as commands to perform requested functions, such as data retrieval.

In the example of FIG. 4C, meeting intelligence apparatus 102 may interpret the question as a command to search and analyze prior meeting data to determine an answer to the question. Determining the answer to the question may involve analyzing meeting content data related to an ongoing meeting and/or a prior meeting, thereby increasing the relevance of the answer to the question. For example, the question "Where did we leave off at the last meeting?" may be analyzed using contextual data (e.g., metadata) from the current meeting, such as the identities of participants 108A-N, the topic of the current discussion, etc. Meeting intelligence apparatus 102 may search the meeting data repository for information that most closely matches the contextual data from the current meeting. For example, meeting intelligence apparatus 102 may search the meeting data repository for any prior meetings that included some or all of the participants 108A-N of the current meeting and rank the results. Meeting intelligence apparatus 102 may then determine that the "last meeting" refers to the top result and may search for the last agenda topic in the prior meeting that corresponds to the top result.

Intervention data 310 that is generated in response to natural language request 406 includes stored information

410 that meeting intelligence apparatus 102 retrieves in response to natural language request 406. Meeting intelligence apparatus 102 includes data retrieval logic 408, which performs a search for stored information 410 that is responsive to natural language request 406. For example, data retrieval logic 408 may search a meeting data repository and/or external data sources, such as websites on the Internet. In the example of FIG. 4C, meeting intelligence apparatus 102 generates second meeting content data 312 that includes stored information 410 retrieved from a meeting data repository. The stored information 410 includes the answer to the question about a different meeting.

In an embodiment, meeting intelligence apparatus 102 processes natural language request 406 and researches a particular topic or otherwise search for information that is unrelated to a particular meeting. For example, natural language request 406 may be the statement "We need to figure out how to get source code from the app." In response, meeting intelligence apparatus 102 may retrieve information from various websites that address natural language request 406. As shall be described in greater detail hereafter, this can be a particularly useful feature for participants 108A-N who wish to collaborate, during an electronic meeting, to create a presentation, a report, or any other document. Results of processing natural language queries are displayed by the electronic meeting application, for example, via message window 224.

C. Meeting Content Supplementation

According to one embodiment, an electronic meeting application, in conjunction with meeting intelligence apparatus 102, provides content supplementation services for electronic meetings. These services provide supplemental information for electronic meetings, including additional information about agenda items, electronic meeting content, and meeting participants, and translation information.

According to one embodiment, meeting intelligence apparatus 102 analyzes agenda items and electronic meeting content and provides supplemental information that is displayed by an electronic meeting application, for example, via message window 224. The supplemental information may pertain to one or more agenda items displayed in agenda window 218 or content 214 displayed in agenda window 213. The supplemental information may be obtained by identifying one or subjects or topics in agenda items or content, and then performing searches on those subjects or topics. The searches may be performed as a background task to a current electronic meeting and may be automatically initiated and then re-run when changes to agenda items or content occur. Results of the searches may be displayed in message window 224 and/or one or more other search results windows. This may include specialized search results windows, for example, a search results window for search results pertaining to agenda items and a search results widow for search results pertaining to electronic meeting content, such as an ongoing meeting or conversation. The information in the search results windows may be continuously updated to reflect changes in the agenda and the content of an electronic meeting. For example, as an electronic meeting is conducted, first meeting content data 302 is provided to and processed by meeting intelligence apparatus 102 to identify topics or subjects to be searched, the identified topics or subjects are searched and search results provided to and displayed by an electronic meeting application. As the electronic meeting switches from topic to topic, the search results displayed by the electronic meeting application are dynamically updated. This allows meeting participants to have access to supplemental information for an electronic meeting. According to one embodiment, data items in search results are selectable, via a pointing device or voice commands, and when a data item is selected, a subsequent search is conducted for the selected data item and the results displayed. This allows meeting participants to seamlessly acquire additional information about topics or subjects discussed during an electronic meeting.

According to an embodiment, the supplemental information includes information about one or more meeting participants. For example, meeting intelligence apparatus 102 may analyze first meeting content data 302 to identify one or more meeting participants, and then transmit participant identification data one or more electronic meeting applications.

FIG. 4D is a block diagram that depicts an arrangement for supplementing meeting content with participant identification data. Referring to FIG. 4D, meeting intelligence apparatus 102 includes voice or face recognition logic 412, which performs voice or face recognition on first meeting content data 302 to detect a voice or a face. The voice or face is a cue 304 for meeting intelligence apparatus 102 to generate intervention data 310 to be sent to at least node 104A during an electronic meeting. In response to detecting the cue 304, meeting intelligence apparatus 102 determines one or more participants 108A-N and generates participant identification data that identifies the one or more participants 108A-N. Meeting intelligence apparatus 102 generates and transmits second meeting content data 312 that includes the participant identification data. When processed at one or more nodes 104A-N, second meeting content data 312 causes the participant identification data to be presented at the one or more nodes 104A-N.

According to one embodiment, the supplemental information includes translation information. Meeting intelligence apparatus 102 may cause a language translation or format conversion of first meeting content data 302 to be presented at one or more nodes 104A-N. In an embodiment, meeting intelligence apparatus 102 performs speech or text recognition on first meeting content data 302 to detect a particular language, which may be a cue 304 for meeting intelligence apparatus 102 to generate second meeting content data 312 that includes a translation of first meeting content data 302 into a different language. For example, meeting intelligence apparatus 102 may translate English content into Japanese content. Second meeting content data 312 may replace or supplement first meeting content data 302. For example, second meeting content data 312 may cause Japanese dubbing of first meeting content data 302, may cause Japanese subtitles to be added to first meeting content data 302, or for Japanese content to be provided separate from the original English content. Embodiments are described herein the context of translation from English to Japanese for explanation purposes only, and translations may be provided from any source language into any target language. According to one embodiment, different translations may be provided for different nodes 104A-N participating in an electronic meeting. For example, suppose that an electronic meeting is initiated at a first node in a first language, and that second and third nodes are participating in the electronic meeting. At the second node, meeting content may be translated from the first language to a second language, and at the third node, meeting content may be translated from the first language and/or the second language to a third language. The translations may be provided in real-time, for example, via message window 224 and/or via one or more other windows. Users at each participating node may specify a language for their node, for example via meeting controls 222, which may be used as a default language for that node. Users may also specify a preferred language in their user profile, or in association with their user credentials, to allow an electronic meeting application to automatically default to the preferred language for a meeting participant. This translation approach allows multiple participants to participate in an electronic meeting with other participants in multiple other languages, greatly enhancing the user experience and the effectiveness of electronic meetings.

In an embodiment, meeting intelligence apparatus 102 can detect input from an input/output mechanism, and the input may be a cue 304 for meeting intelligence apparatus 102 to convert the input into a different format. For example, the input/output mechanism may be an electronic whiteboard that receives as input first meeting content data 302 in the form of handwritten notes or hand-drawn illustrations. Based on optical character recognition (OCR), vector graphics, and/or any other data conversion tool, meeting intelligence apparatus 102 may convert first meeting content data 302 into second meeting content data 312 in the form of machine-lettering or a machine-drawn image. When processed at one or more nodes 104A-N, second meeting content data 312 may cause the machine-lettering or the machine-drawn image to be provided as output on the electronic whiteboard.

Cue detection logic 306, data generation logic 308, speech or text recognition logic 400, sentiment analysis logic 404, data retrieval logic 408, and voice or face recognition logic 412 may be implemented on meeting intelligence apparatus 102 as part of artificial intelligence service 110, or separate from meeting intelligence service 110. In addition, these elements may be implemented by computer hardware, computer software, or any combination of computer hardware and computer software.

D. Meeting Content Metadata Generation

FIGS. 4A-D each depict second meeting content data 312 that includes a variety of meeting content metadata. Meeting intelligence apparatus 102 generates the meeting content metadata based on internal and/or external information. Internal information includes information readily accessible to meeting intelligence apparatus 102 even in the absence of a network connection. For example, if meeting intelligence apparatus 102 is a computer, the system date and time are internal information. In contrast, external information includes information accessible to meeting intelligence apparatus 102 via a network connection. For example, information retrieved from external data sources are external information.

FIGS. 4A-D each depict sending meeting content metadata to one or more nodes 104A-N during an electronic meeting. However, some meeting content metadata may remain un-transmitted throughout the duration of the electronic meeting. For example, some meeting content metadata may remain stored in meeting intelligence apparatus 102 for an internal use, such as generating a report. As shall be described in greater detail in FIG. 6C, a notable example of such meeting content metadata is a label that identifies a key meeting point, such as an action item, a task, a deadline, etc.

V. Post-Meeting Processing

According to one embodiment, an electronic meeting process, in conjunction with meeting intelligence apparatus 102, may provide a wide variety of post-meeting processing services, based upon analyzing meeting content. As used herein, the term "meeting content" refers to any information pertaining to one or more electronic meetings. Examples of meeting content include, without limitation, meeting scheduling and agenda information, meeting participant information, content shared during an electronic meeting, and all actions and functions performed during one or more electronic meetings.

Meeting content may be analyzed at any time relative to an electronic meeting, i.e., before, during or after an electronic meeting, as soon as at least some meeting content is available. Certain types of processing, such as participant analysis described in more detail hereinafter, may benefit from being able to process meeting data from one or more completed electronic meetings. For example, after an electronic meeting ends, meeting intelligence apparatus 102 may analyze stored meeting content data and generate reports based on analyzed meeting content data. Alternatively, meeting intelligence apparatus 102 may analyze meeting content data during an electronic meeting and may generate, after the electronic meeting ends, a report based on analyzed meeting content data. Reports may include any type and amount of data, including any number of documents, a meeting agenda, a meeting summary, a meeting transcript, a meeting participant analysis, a slideshow presentation, etc. As previously described herein, post meeting processing results may be used for other electronic meetings. For example, post meeting processing results may be used to determine suggested meeting participants for other electronic meetings. This may be repeated to improve the quality of suggested meeting participants over time.

Figure 5:
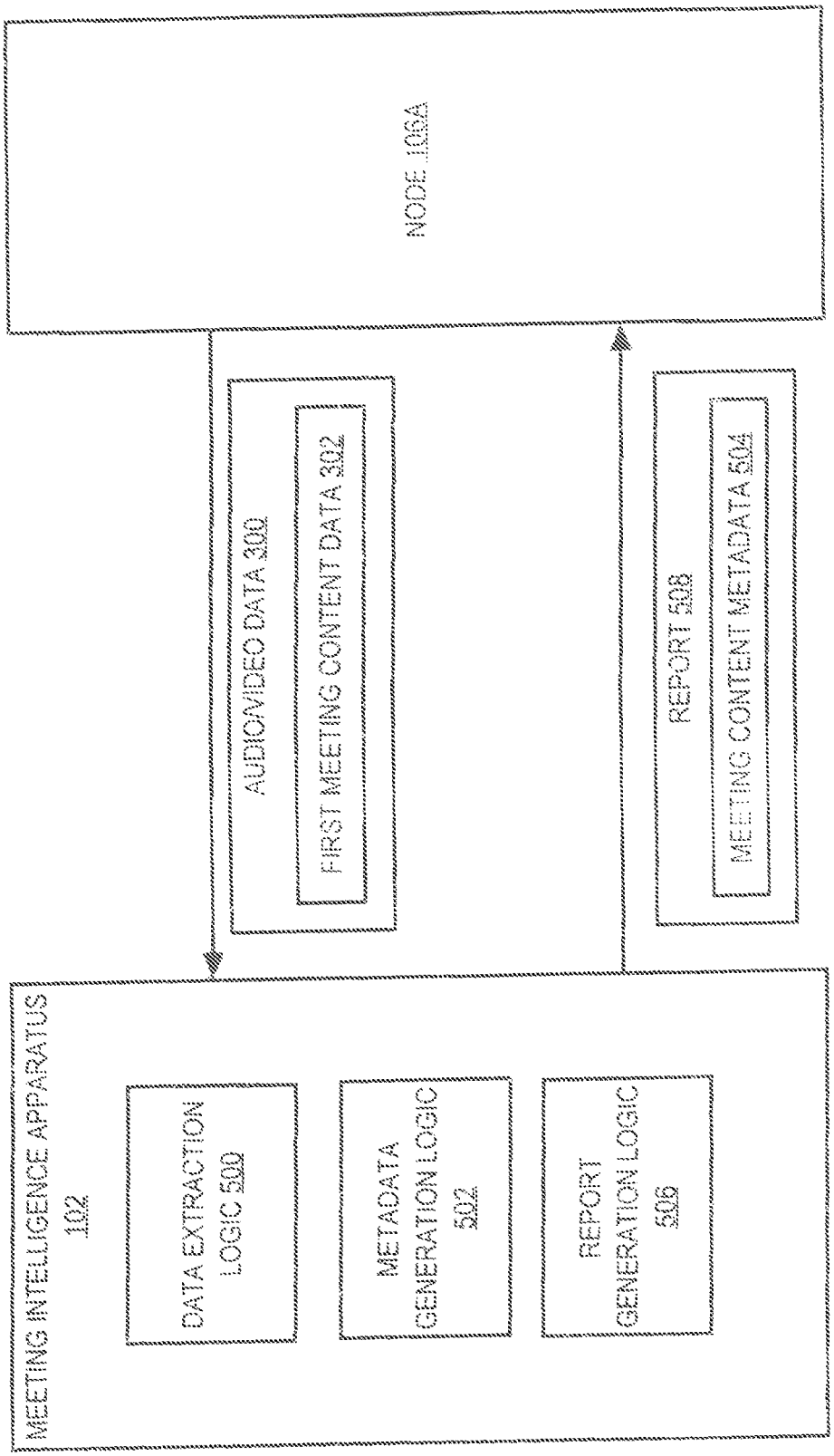
FIG. 5 is a block diagram that depicts an arrangement for generating a report.

FIG. 5 is a block diagram that depicts an arrangement for processing meeting content and generating a report. Referring to FIG. 5, meeting intelligence apparatus 102 receives, from node 104A, audio/video data 300 that includes first meeting content data 302. Meeting intelligence apparatus 102 includes data extraction logic 500, metadata generation logic 502, and report generation logic 506. Data extraction logic 500 causes first meeting content data 302 to be extracted from audio/video data 300. Meeting intelligence apparatus 102 analyzes first meeting content data 302 and uses metadata generation logic 502 to generate meeting content metadata 504. Report generation logic 506 causes meeting content metadata 504 to be included in report 508. This processing may occur on a continuous basis, or in response to a request to perform the processing.

Meeting intelligence apparatus 102 may perform various functions based upon report 508. For example, meeting intelligence apparatus 102 may store report 508 in a meeting data repository or provide report 508 to one or more nodes 104A-N associated with participants 108A-N of an electronic meeting. Thus, meeting intelligence apparatus 102 may generate report 508 in an offline mode and/or an online mode. Electronic meeting applications may also process and store report 508, as well as other data generated in response to an analysis of meeting content.

A. Meeting Content Analysis

Figure 6B:
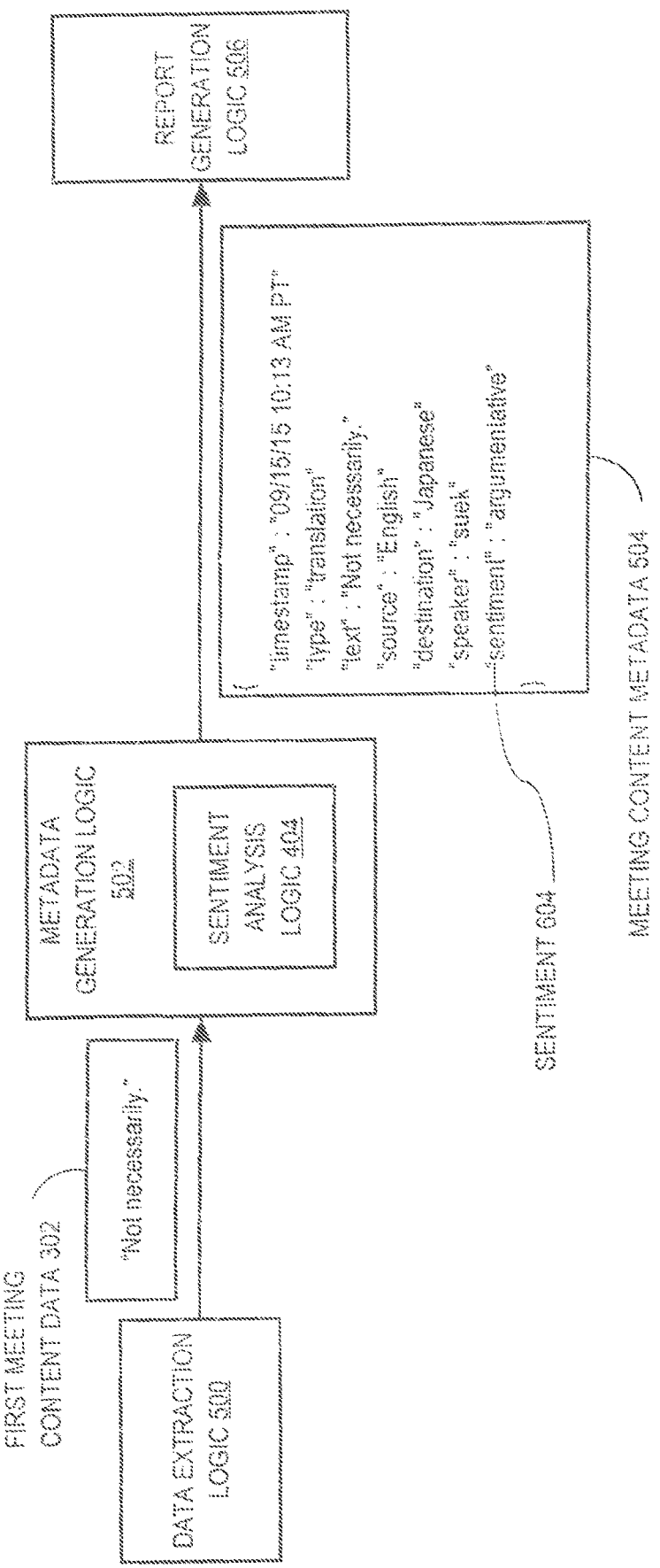
FIG. 6B is a block diagram that depicts an arrangement for generating meeting content metadata that includes a sentiment detected in first meeting content data.
Figure 6C:
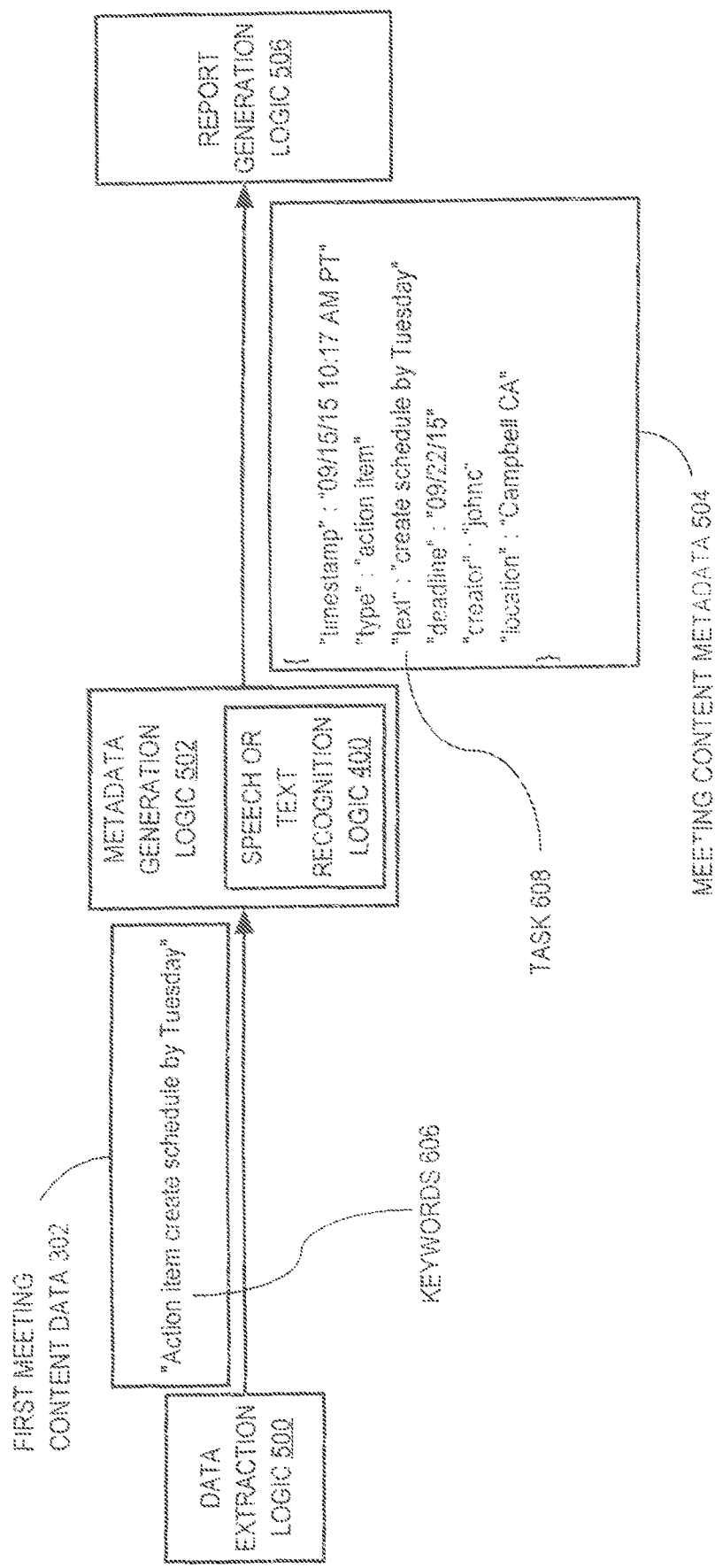
FIG. 6C is a block diagram that depicts an arrangement for generating meeting content metadata that includes a label to identify a key, i.e., important, meeting point.

In an embodiment, meeting intelligence apparatus 102 generates meeting content metadata 504 during an electronic meeting. For example, data generation logic 308 may include metadata generation logic 502, and second meeting content data 312 may include meeting content metadata 504. FIGS. 6A-C depict examples of meeting content metadata 504 that can be generated during an electronic meeting.

FIG. 6A is a block diagram that depicts an arrangement for generating meeting content metadata 504 that includes participant identification data 602. Referring to FIG. 6A, data extraction logic 500 extracts and provides first meeting content data 302 to metadata generation logic 502. In the example of FIG. 6A, metadata generation logic 502 includes voice or face recognition logic 412, which performs voice or face recognition on first meeting content data 302 to identify one or more participants 108A-N in an electronic meeting. Metadata generation logic 502 generates meeting content metadata 504 that includes participant identification data 602 for the one or more participants 108A-N. Metadata generation logic 502 provides meeting content metadata 504 to report generation logic 506.

FIG. 6B is a block diagram that depicts an arrangement for generating meeting content metadata 504 that includes a sentiment detected in first meeting content data 302. Referring to FIG. 6B, data extraction logic 500 extracts first meeting content data 302 that includes the statement "Not necessarily." Metadata generation logic 502 includes sentiment analysis logic 404, which performs sentiment analysis on first meeting content data 302 to determine a sentiment 604 of a participant in an electronic meeting. Sentiment analysis may be performed using a wide variety of sentiment processing algorithms that may vary depending upon a particular implementation. Metadata generation logic 502 generates meeting content metadata 504 that includes sentiment 604. In the example of FIG. 6B, meeting content metadata 504 also includes participant identification data 602 and information related to providing a translation of first meeting content data 302. Thus, metadata generation logic 502 may include a combination of sentiment analysis logic 404, voice or face recognition logic 412, and speech or text recognition logic 400.

FIG. 6C is a block diagram that depicts an arrangement for generating meeting content metadata 504 that includes a label to identify a key, i.e., important, meeting point. Referring to FIG. 6C, first meeting content data 302 includes the statement "Action item create schedule by Tuesday". Metadata generation logic 502 includes speech or text recognition logic 400, which performs speech or text recognition on first meeting content data 302 to recognize one or more keywords 606 in first meeting content data 302. One or more keywords 606 may indicate a task 608 to be completed after an electronic meeting. For example, the one or more keywords 606 may include a voice or text command to perform a particular task. In the example of FIG. 6C, the one or more keywords 606 are the label "Action item" followed by the command "create schedule by Tuesday." Metadata generation logic 502 generates meeting content metadata 504 that includes the one or more keywords 606 and/or task 608.

Meeting intelligence apparatus 102 may generate meeting content metadata 504 based on internal and/or external information, such as geolocation information or a meeting room availability schedule. In each of FIGS. 6A-C, report generation logic 506 includes meeting content metadata 504 in report 508. FIGS. 7A-B depict examples of report 508. Referring to FIGS. 7A-B, meeting intelligence apparatus 102 provides report 508 via a web-based participant interface. Meeting intelligence apparatus 102 may send report 508 to one or more nodes 104A-N at any of a number of times, such as upon demand, upon detecting a network connection, automatically after each electronic meeting, etc.

B. Meeting Results

Post-meeting processing may be performed in accordance with requirements and constraints specified for an electronic meeting, e.g., via a meeting rules template. For example, a meeting rules template may specify particular types of documentation to be created for an electronic meeting, such as meeting minutes, transcriptions, summaries, translations, etc. The types and form of documentation may be required to satisfy various organizational, governmental, judicial, and compliance requirements. The meeting rules template may also specify how the documentation is to be handled, e.g., stored in a particular location, distributed to meeting participants and others, etc. For example, a meeting rules template may specify that meeting results are to be stored on a particular file server and emailed to all of the meeting participants.

FIG. 7A depicts an example meeting reports screen 700 that provides access to meeting results data for a plurality of electronic meetings. Meeting reports screen 700 may be accessed, for example, by a user selecting the "Meeting Reports" control from controls 202 on electronic meeting screen 200 (FIG. 2A). Meeting reports screen allows a user to select a particular electronic meeting and view meeting results for the selected electronic meeting.

FIG. 7B depicts an example meeting results screen 710 for the Comet Design Review Meeting displayed, for example, in response to a user using a pointing device, such as a mouse, to select the "Comet Design Review Meeting" from meeting reports screen 700. Meeting results screen 710 displays meeting results for a selected electronic meeting. In the example depicted in FIG. 7A, the meeting results information is presented in the form of a meeting summary "dashboard," that includes many of the meeting content metadata 504 depicted in FIGS. 6A-C, but embodiments are not limited to this example and are applicable to any type of meeting results.

Meeting results, including a meeting summary, may include explicit data and/or implicit data. Explicit data includes information such as details about the electronic meeting (name, subject, date, location, etc.), meeting participants, meeting content data, such as documents, images, and/or any other data shared during an electronic meeting. In the example of FIG. 7B, explicit data includes the meeting agenda, a list of action items, and a list of documents. In this example, the meeting agenda is accessed via a link, but one or more portions of an electronic meeting agenda, including an entire agenda, may be included in meeting results screen 710.

Implicit data includes meeting content metadata 504, such as identifiers, translations, and/or any other data generated by meeting intelligence apparatus 102 after analyzing an electronic meeting. In the example depicted in FIG. 7B, meeting results screen 710 includes a link to a transcript of the electronic meeting, and a user may select a language for the transcript, irrespective of the language in which the electronic meeting was conducted. Multiple transcripts in different languages may be created. For example, for an electronic meeting conducted in English, both English and Japanese transcripts may be generated. Links are also provided to individual reports related to each participant which, as described in more detail hereinafter, may include various participant metrics.

In the example of FIG. 7B, the meeting results screen 710 also includes links to other reports, such as the meeting agenda, action items, and various documents generated during the electronic meeting. In this example, the electronic documents that were generated during the electronic meeting include "Whiteboard Notes" and "Draft Schedule," and these electronic documents were generated based on one or more input/output mechanisms. For example, the one or more input/output mechanisms may include an electronic whiteboard. Meeting intelligence apparatus 102 may convert handwritten notes or hand-drawn illustrations received as input on the electronic whiteboard into a machine-lettered or a machine-drawn image based on optical character recognition (OCR), vector graphics, and/or any other data conversion tool. For example, meeting intelligence apparatus 102 may perform OCR on handwritten notes to generate metadata that indicates which letters were detected. The metadata may then be used to generate the detected letters in a particular font or any other machine-lettering format.

According to an embodiment, post-meeting processing includes performing various statistical analyses, for example, to determine meeting efficiency. In the example of FIG. 7B, meeting results screen 710 includes a pie chart 712 that depicts an amount of time spent on each of two agenda items during an electronic meeting. In the present example, pie chart 712, along with the accompanying key, indicates that 25% of the meeting time was spent discussing the first agenda item, "Create schedule by Tuesday" and 75% of the meeting time was spent discussing the second agenda item, "Get feedback from Marketing." Similar approaches may be used for other aspects of an electronic meeting, such as action items, and information may be arranged by subject or topic. Embodiments are not limited to this example using pie charts, and any method of presenting statistical information on a computer user interface may be used.

Meeting results screen 710 also includes a statistic in the form of a meeting efficiency metric 714. In the example depicted in FIG. 7B, meeting efficiency is represented by the integer number "86" that is depicted on a scale from low to high, and relative to the meeting efficiency for all electronic meetings. A low efficiency may correspond to a meeting efficiency of 0, while high efficiency may correspond to a meeting efficiency of 100. Meeting efficiency may be calculated based upon a wide variety of criteria that may vary depending upon a particular implementation. Example criteria include, without limitation, the actual total amount of actual time required for an electronic meeting relative to a scheduled amount of time for the electronic meeting, an amount of time added to agenda items during the electronic meeting, an average amount of time per agenda item, a percentage of agenda items that were completed during the electronic meeting, a percentage of action items that were completed during the electronic meeting, etc. Meeting efficiency may be determined based upon any combination of these example criteria, or other criteria, and criteria may be weighted, depending upon a particular implementation. Meeting efficiency is just one example of statistical-based meeting results that may be presented to users, and other statistics may be used. A "Back" control is provided which, when selected by a user, returns control to meeting reports screen 700 of FIG. 7A.

In the prior examples, meeting results were determined and displayed for a particular electronic meeting selected by a user. According to one embodiment, aggregate meeting results are determined across multiple electronic meetings. This allows a user to view overall meeting statistics across multiple meetings with the organization. Examples of meeting statistics include, without limitation, meeting efficiency, average participant participation rate, action item completion rate, sentiment scores, average meeting time, average meeting time overrun, etc. Controls may allow a user to specify the electronic meetings for which statistics are to be determined and displayed. For example, controls may allow a user to select all electronic meetings with an organization, or select electronic meetings by division, group, department (sales & marketing, accounting, engineering, testing, etc.), project, team, user, meeting topic, meeting objective, etc. The statistical results for the selected entity may be displayed in an electronic meeting "dashboard" that allows a user to quickly and easily view the performance of multiple electronic meetings. The statistical results displayed on the electronic meeting "dashboard" may be dynamically updated as the user selects a different division, group, department (sales & marketing, accounting, engineering, testing, etc.), project, team, user, etc. For example, an executive within an organization may quickly and easily view the efficiency of electronic meetings conducted across each entity within the organization, which in some situations allows improvements to be made to how electronic meetings are conducted within the organization.

C. Participant Analysis

According to one embodiment, post-meeting processing includes participant analysis, which may include determining one or more statistics that are indicative of one or more attributes of the participation by meeting participants, such as the quality and/or quantity of participation. FIG. 7C depicts an example participant analysis report 720 that may be accessed by selecting a particular meeting participant from meeting results screen 710 in FIG. 7B, i.e., "John C.," "Sue K.," or "Mike B." In the present example, it is presumed that a user selected the meeting participant "Sue K." and participant analysis report 720 depicts a meeting participant profile for meeting participant "Sue K."

Controls, such as "+" and "–" allow a user to view the meeting participant's profile for a particular electronic meeting. In the example depicted in FIG. 7C, a user has selected the "+" control adjacent the "Comet Design Review Meeting" to view Sue K's meeting participant profile for this electronic meeting. As depicted in FIG. 7C, participant analysis report 720 depicts various participant metrics including a total participation time during the electronic meeting, a participation time for each agenda item discussed during the electronic meeting, a participation index, an action item completion rate, a role, and sentiment analysis results. The sentiment analysis results may vary depending upon the type of sentiment analysis used. For example, sentiment analysis results may indicate a polarity sentiment result, i.e., positive, negative or neutral. As another example, sentiment analysis results may include a sentiment score for a plurality of sentiments. In the example depicted in FIG. 7C, a sentiment score, on a scale of 0-100, is provided for each of six sentiments, where a score of 0 represents little or no detected presence of the corresponding sentiment, and a score of 100 represents a high presence of the corresponding sentiment. Sentiment analysis results may include other information, such as times during an electronic meeting where particular sentiments were detected. Multiple times may be indicated for particular sentiments that were detected at different times during an electronic meeting.

The participation index may be any measure, weighted or otherwise, of any aspect of the selected participant's contribution to the meeting. For example, "63/100" may indicate a proportion of the total meeting time during which the selected participant spoke. The action item completion rate indicates the past success of a meeting participant in completing action items assigned to the meeting participant. The action item completion rate may be calculated in a wide variety of ways that may vary depending upon a particular implementation. For example, the action item completion rate depicted in FIG. 7C indicates the number of actions items that are completed by a particular meeting participant relative to the total number of action items assigned to the particular participant. In the present example, meeting participant "Sue K." completed one action item out of a total of two action items. The action items may or may not have been assigned specifically to meeting participant "Sue K."

The role associated with the selected participant may indicate any of a number of categories that describe the selected participant relative to the current meeting and/or within a particular entity (e.g., a vice-president of a corporation). For example, "Active Presenter" may indicate that the selected participant did not merely respond to other participants, but also provided many of the topics for discussion. Other statistics may be determined for participants and vary depending upon a particular implementation.

Statistics for meeting participants may be determined based upon any number of electronic meetings. For example, statistics for meeting participants may be calculated based upon a single electronic meeting, or may be based upon aggregated data for multiple electronic meetings. Some statistics, such as the action item completion rate, may be more useful when determined over a large sample of electronic meetings, because the number of action items completed and assigned to any individual meeting participant in a single electronic meeting may be small.

According to one embodiment, participant analysis report 720 includes aggregate statistics 722 for meeting participants over multiple electronic meetings. In this example, aggregate statistics 712 for meeting participant "Sue K." are based upon 12 electronic meetings and include a participation index, an action item completion rate, and sentiment scores. The sentiment scores are determined for each of a plurality of sentiments over 12 electronic meetings and in this example indicate that meeting participant "Sue K." was often cheerful, rarely confused, often defensive and argumentative, sometimes pensive and not often confident.

According to one embodiment, aggregate statistics may be displayed for multiple meeting participants and sorted. For example, in FIG. 7C, participant analysis report 720 includes aggregate statistics for all participants 724, ranked by participation rate and by action item completion rate. This information may be useful in a wide variety of contexts. For example, aggregate statistics may be useful to meeting organizers when planning meetings, to meeting owners during meetings when, for example, assigning action items, and for performance evaluation purposes. Aggregate statistics may also be used by meeting intelligence apparatus 102 to determine suggested meeting participants, as previously described herein. Embodiments are not limited to the example aggregate statistics depicted in FIG. 7B and any aggregate statistics may be used. According to one embodiment, aggregate statistics may be determined and displayed for logical entities, such as projects, departments, groups, divisions, etc., within an organization. This allows users to view meeting participants performance on a per-logical entity basis. For example, a user may view meeting performance statistics for meeting participants of a particular project, and compare those statistics to meeting performance statistics for meeting participants of other projects within an organization. This greatly increases the usefulness of meeting performance statistics to management or other interested personnel. A "Back" control is provided which, when selected by a user, returns control to meeting results screen 710 of FIG. 7B.

According to one embodiment, translation services may be applied to meeting results and participant analysis. For example, meeting results screen 710 may include a language selection control that when selected, displays the contents of meeting results screen 710 in the selected language. The same approach may be applied to the electronic meeting "dashboard" previously described herein. Similarly, participant analysis report 720 may include a language selection control that when selected, displays the contents of participant analysis report 720 in the selected language.

D. Action Item Management

According to one embodiment, post-meeting processing includes action item management, which may include displaying action items for one or more electronic meetings and information for each action item, such as a description, responsible person, due date, current status, etc. Action items may be viewed on a per meeting basis, or across multiple meetings. For example, action items for an entire organization, department, team, project, user, due date, status, etc., may be viewed.

VI. Process Overview

FIGS. 8 and 9 are flow diagrams that depict various processes that can be performed by meeting intelligence apparatus 102. In an embodiment, FIG. 8 depicts a process that is performed with a network connection during an electronic meeting. In an embodiment, FIG. 9 depicts a process that can be performed, at least partially, with or without a network connection.

A. Generating Intervention Data

FIG. 8 is a flow diagram 800 that depicts an approach for generating intervention data 310. At block 802, a meeting intelligence apparatus 102 receives meeting content data for an electronic meeting that includes a plurality of participants 108A-N. The meeting content data may include, for example, audio/video data 300 that includes first meeting content data 302 for the electronic meeting. For example, meeting intelligence service 102 may receive a videoconference stream from a Ricoh UCS P3500 associated with a meeting participant Alice, who is making an offer to a meeting participant Bob during the electronic meeting. The meeting content data may include other data besides the actual audio/video data for the electronic meeting. For example, the meeting content data may include supporting documentation for the electronic meeting, as well as any type of information pertaining to other electronic meetings, as well as any other type of information.

At block 804, the meeting intelligence apparatus 102 determines that the meeting content data, e.g., audio/video data 300, includes a cue 304 for the meeting intelligence apparatus 102 to intervene in the electronic meeting. The meeting intelligence apparatus 102 may make this determination based on performing any of a number of analyses on the meeting content data, such as speech or text recognition, voice or face recognition, sentiment analysis, etc. For example, meeting intelligence apparatus 102 may extract and analyze first meeting content data 302 to detect poor eye contact by Alice. The poor eye contact may be a cue 304 for meeting intelligence apparatus 102 to respond by sending a recommendation to Bob.

At block 806, the meeting intelligence apparatus 102 generates intervention data 310 in response to detecting the cue 304. The intervention data 310 includes second meeting content data 312 that is different from the first meeting content data 302. For example, meeting intelligence apparatus 102 may generate a recommendation that advises Bob to make a counteroffer.

At block 808, the meeting intelligence apparatus 102 sends the intervention data 310 to one or more nodes 104A-N during the electronic meeting. The one or more nodes 104A-N are associated with at least one participant of the plurality of participants 108A-N. For example, meeting intelligence apparatus 102 may send the recommendation to Bob and withhold the recommendation from Alice.

B. Generating Reports

FIG. 9 is a flow diagram 900 that depicts an approach for generating a report 508. At block 902, a meeting intelligence apparatus 102 receives meeting content data for an electronic meeting that includes a plurality of participants 108A-N. For example, meeting intelligence apparatus 102 may receive an audioconference data packet from Charlie's smartphone, which is executing the Ricoh UCS app.

At block 904, meeting intelligence apparatus 102 analyzes the meeting content data. For example, meeting intelligence apparatus 102 may analyze audio/video data 300 for an electronic meeting and extract particular meeting content data from the audio/video data 300. This may include, for example, stripping out header data and analyzing the payload of audioconference data packets. Analyzing the payload may involve performing speech or text recognition, sentiment analysis, voice or face recognition, etc.

At block 904, meeting intelligence apparatus 102 generates meeting content metadata 504 based on analyzing the meeting content data. For example, meeting intelligence apparatus 102 may perform voice recognition on the meeting content data to identify Charlie as the person presenting at the electronic meeting. meeting intelligence apparatus 102 may generate JSON that includes "speaker: Charlie" among the name-value pairs.

At block 906, the meeting intelligence apparatus 102 includes at least part of the meeting content metadata 504 in a report 508 of the electronic meeting. For example, meeting intelligence apparatus 102 may generate a "Meeting Summary" report that includes "Charlie" among the participants 108A-N of the electronic meeting.

VII. Implementation Examples

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
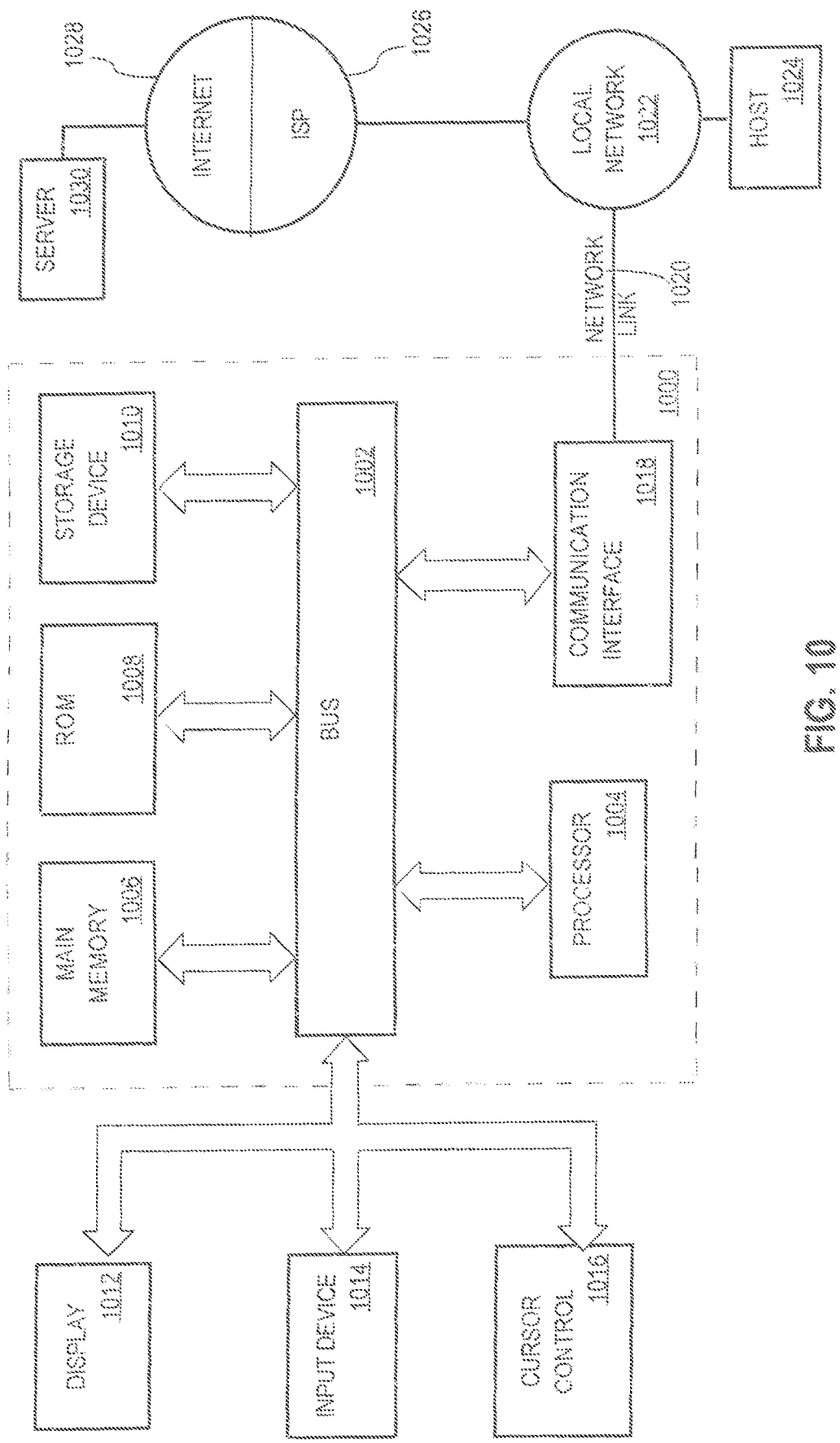
FIG. 10 depicts an example computer system upon which embodiments may be implemented.

For example, FIG. 10 is a block diagram that depicts a computer system 1000 upon which an embodiment may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A system comprising:
  an artificial intelligence service executing on a first apparatus that is external to a second apparatus;
  the second apparatus comprising:
    one or more processors; and
    one or more memories storing instructions which, when processed by the one or more processors, cause:
      an electronic meeting process executing on the second apparatus to:
  receive, over one or more communications networks from the artificial intelligence service, one or more suggested agenda items for a new electronic meeting, wherein the one or more suggested agenda items for the new electronic meeting comprise one or more action items from one or more prior electronic meetings, wherein each action item, from the one or more action items from the one or more prior electronic meetings, indicates one or more actions assigned for performance by one or more persons, wherein the artificial intelligence service executing external to the second apparatus determines the one or more suggested agenda items for the new electronic meeting by:
    determining one or more prior electronic meetings that are related to the new electronic meeting based upon one or more references to the one or more prior electronic meetings in a first set of one or more electronic documents for the new electronic meeting,
    analyzing a second set of one or more electronic documents for the one or more prior electronic meetings, and
    identifying, based upon the analyzing, the one or more action items from the one or more prior electronic meetings;
  display, on a user interface for selection by a user of the second apparatus for the new electronic meeting, the one or more suggested agenda items for the new electronic meeting that comprise the one or more action items from the one or more prior electronic meetings, and
  in response to a user selection of a particular suggested agenda item, from the one or more suggested agenda items, designating the particular agenda item for the new electronic meeting.

2. The system of claim 1, wherein:
the one or more suggested agenda items for the new electronic meeting include one or more uncompleted agenda items from the one or more prior electronic meetings, and
the one or more uncompleted agenda items from the one or more prior electronic meetings are determined based upon one or more of: electronic documents that specify the one or more uncompleted agenda items and that are both associated with the new electronic meeting and mention the one or more prior electronic meetings, or attributes of the new electronic meeting.

3. The system of claim 1, wherein:
the one or more action items from the one or more prior electronic meetings are determined based upon one or more of electronic documents that specify the one or more action items and that are both associated with the new electronic meeting and mention the one or more prior electronic meetings, or attributes of the new electronic meeting.

4. The system of claim 1, wherein:
a particular meeting rules template was specified for the new electronic meeting, wherein the particular meeting rules template is from a plurality of meeting rules templates, and the particular meeting rules template specifies one or more required agenda items for a particular type of electronic meeting, and the one or more suggested agenda items include the one or more required agenda items specified by the particular meeting rules template.

5. The system of claim 1, wherein the one or more suggested agenda items for the new electronic meeting include one or more data items related to the new electronic meeting.

6. The system of claim 5, wherein:
the new electronic meeting is a particular type of electronic meeting and is related to a particular subject, and
the one or more data items related to the new electronic meeting include one or more data items related to the particular type of electronic meeting or one or more data items related to the particular subject matter.

7. The system of claim 1, wherein:
the one or more suggested agenda items include two or more suggested agenda items,
processing of the instructions by the one or more processors further causes the electronic meeting application to:
receive a relevance score for each suggested agenda item from the two or more suggested agenda items, wherein the relevance score indicates a correspondence between the suggested agenda item and one or more attributes of the new electronic meeting, and
cause the relevance score for each suggested agenda item, from the two or more suggested agenda items, to be displayed on the user interface with its corresponding suggested agenda item.

8. One or more non-transitory computer-readable media storing instructions which, when processed by one or more processors, cause:
an electronic meeting process executing on an apparatus to:
receive, over one or more communications networks from an artificial intelligence service executing external to the apparatus, one or more suggested agenda items for a new electronic meeting, wherein the one or more suggested agenda items for the new electronic meeting comprise one or more action items from one or more prior electronic meetings, wherein each action item, from the one or more action items from the one or more prior electronic meetings, indicates one or more actions assigned for performance by one or more persons, wherein the artificial intelligence service executing external to the apparatus determines the one or more suggested agenda items for the new electronic meeting by:
determining one or more prior electronic meetings that are related to the new electronic meeting based upon one or more references to the one or more prior electronic meetings in a first set of one or more electronic documents for the new electronic meeting, and
analyzing a second set of one or more electronic documents for the one or more prior electronic meetings, and
identifying, based upon the analyzing, the one or more action items from the one or more prior electronic meetings;
display, on a user interface for selection by a user of the apparatus for the new electronic meeting, the one or more suggested agenda items for the new electronic meeting that comprise the one or more action items from the one or more prior electronic meetings, and
in response to a user selection of a particular suggested agenda item, from the one or more suggested agenda items, designating the particular agenda item for the new electronic meeting.

9. The one or more non-transitory computer-readable media of claim 8, wherein:
the one or more suggested agenda items for the new electronic meeting include one or more uncompleted agenda items from the one or more prior electronic meetings, and
the one or more uncompleted agenda items from the one or more prior electronic meetings are determined based upon one or more of: electronic documents that specify the one or more uncompleted agenda items and that are both associated with the new electronic meeting and mention the one or more prior electronic meetings, or attributes of the new electronic meeting.

10. The one or more non-transitory computer-readable media of claim 8, wherein:
the one or more action items from the one or more prior electronic meetings are determined based upon one or more of electronic documents that specify the one or more action items and that are both associated with the new electronic meeting and mention the one or more prior electronic meetings, or attributes of the new electronic meeting.

11. The one or more non-transitory computer-readable media of claim 8, wherein:
a particular meeting rules template was specified for the new electronic meeting, wherein the particular meeting rules template is from a plurality of meeting rules templates, and the particular meeting rules template specifies one or more required agenda items for a particulartype of electronic meeting, and
the one or more suggested agenda items include the one or more required agenda items specified by the particular meeting rules template.

12. The one or more non-transitory computer-readable media of claim 8, wherein the one or more suggested agenda items for the new electronic meeting include one or more data items related to the new electronic meeting.

13. The one or more non-transitory computer-readable media of claim 12, wherein:
the new electronic meeting is a particular type of electronic meeting and is related to a particular subject, and
the one or more data items related to the new electronic meeting include one or more data items related to the particular type of electronic meeting or one or more data items related to the particular subject matter.

14. The one or more non-transitory computer-readable media of claim 8, wherein execution of the instructions by the one or more processors further causes the electronic meeting application to:
receive a relevance score for each suggested agenda item from the two or more suggested agenda items, wherein the relevance score indicates a correspondence between the suggested agenda item and one or more attributes of the new electronic meeting, and
cause the relevance score for each suggested agenda item, from the two or more suggested agenda items, to be displayed on the user interface with its corresponding suggested agenda item.

15. A computer-implemented method comprising:
an electronic meeting process executing on an apparatus to receive, over one or more communications networks from an artificial intelligence service executing external to the apparatus, one or more suggested agenda items for an electronic meeting, wherein the one or more suggested agenda items for the electronic meeting comprise one or more action items from one or more prior electronic meetings, wherein each action item, from the one or more action items from the one or more prior electronic meetings, indicates one or more actions assigned for performance by one or more persons, wherein the artificial intelligence service executing external to the apparatus determines the one or more suggested agenda items for the new electronic meeting by:
  determining one or more prior electronic meetings that are related to the new electronic meeting based upon one or more references to the one or more prior electronic meetings in a first set of one or more electronic documents for the new electronic meeting, and
  analyzing a second set of one or more electronic documents for the one or more prior electronic meetings, and
  identifying, based upon the analyzing, the one or more action items from the one or more prior electronic meetings;
the electronic meeting process executing on the apparatus to display, on a user interface for selection by a user of the apparatus for the electronic meeting, the one or more suggested agenda items for the electronic meeting that comprise the one or more action items from the prior electronic meeting.

16. The computer-implemented method of claim 15, further comprising:
  the one or more suggested agenda items for the new electronic meeting include one or more uncompleted agenda items from the one or more prior electronic meetings, and
  the one or more uncompleted agenda items from the one or more prior electronic meetings are determined based upon one or more of: electronic documents that specify the one or more uncompleted agenda items and that are both associated with the new electronic meeting and mention the one or more prior electronic meetings, or attributes of the new electronic meeting.

17. The computer-implemented method of claim 15, wherein:
  the one or more action items from the one or more prior electronic meetings are determined based upon one or more of electronic documents that specify the one or more action items and that are both associated with the new electronic meeting and mention the one or more prior electronic meetings, or attributes of the new electronic meeting.

18. The computer-implemented method of claim 15, wherein:
  a particular meeting rules template was specified for the new electronic meeting, wherein the particular meeting rules template is from a plurality of meeting rules templates, and the particular meeting rules template specifies one or more required agenda items for a particular type of electronic meeting, and
  the one or more suggested agenda items include the one or more required agenda items specified by the particular meeting rules template.

19. The computer-implemented method of claim 15, wherein:
  the new electronic meeting is a particular type of electronic meeting and is related to a particular subject, and
  the one or more suggested agenda items for the new electronic meeting include one or more data items related to the particular type of electronic meeting or one or more data items related to the particular subject matter.

20. The computer-implemented method of claim 15, further comprising:
  the electronic meeting application receiving a relevance score for each suggested agenda item from the one or more suggested agenda items, wherein the relevance score indicates a correspondence between the suggested agenda item and one or more attributes of the new electronic meeting, and
  the electronic meeting application causing the relevance score for each suggested agenda item, from the one or more suggested agenda items, to be displayed on the user interface with its corresponding suggested agenda item.

* * * * *

UNITED STATES PATENT AND TRADEMARK OFFICE
CERTIFICATE OF CORRECTION

PATENT NO. : 11,307,735 B2
APPLICATION NO. : 15/290856
DATED : April 19, 2022
INVENTOR(S) : Steven A. Nelson, Hiroshi Kitada and Lana Wong It is certified that error appears in the above-identified patent and that said Letters Patent is hereby corrected as shown below:

In the Claims

Claim 11, Column 46, Line 34 delete "particulartype" insert --particular type--

Signed and Sealed this
Sixteenth Day of August, 2022

Katherine Kelly Vidal
*Director of the United States Patent and Trademark Office*